(12) United States Patent
Ebrahimi Afrouzi et al.

(10) Patent No.: US 12,070,847 B1
(45) Date of Patent: Aug. 27, 2024

(54) COLLABORATIVE INTELLIGENCE OF ARTIFICIAL INTELLIGENCE AGENTS

(71) Applicants: Ali Ebrahimi Afrouzi, Henderson, NV (US); Lukas Robinson, York (CA); Chen Zhang, Redmond, WA (US); Brian Highfill, Castro Valley, CA (US)

(72) Inventors: Ali Ebrahimi Afrouzi, Henderson, NV (US); Lukas Robinson, York (CA); Chen Zhang, Redmond, WA (US); Brian Highfill, Castro Valley, CA (US)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 17/867,023

(22) Filed: Jul. 18, 2022

Related U.S. Application Data

(63) Continuation of application No. 16/584,950, filed on Sep. 27, 2019, now abandoned, which is a continuation-in-part of application No. 15/981,643, filed on May 16, 2018, now abandoned.

(60) Provisional application No. 62/774,420, filed on Dec. 3, 2018, provisional application No. 62/772,026, filed on Nov. 27, 2018, provisional application No. 62/760,267, filed on Nov. 13, 2018, provisional application No. 62/756,896, filed on Nov. 7, 2018, provisional application No. 62/748,943, filed on Oct.
(Continued)

(51) Int. Cl.
*B25J 11/00* (2006.01)
*B25J 9/00* (2006.01)
*B25J 9/16* (2006.01)
*G05B 13/02* (2006.01)

(52) U.S. Cl.
CPC ......... *B25J 11/0085* (2013.01); *B25J 9/0003* (2013.01); *B25J 9/0084* (2013.01); *B25J 9/1664* (2013.01); *B25J 9/1684* (2013.01); *G05B 13/0205* (2013.01)

(58) Field of Classification Search
CPC .... B25J 11/0085; B25J 9/0003; B25J 9/0084; B25J 9/1664; B25J 9/1684; G05B 13/0205
See application file for complete search history.

(56) References Cited

U.S. PATENT DOCUMENTS

| | | | | |
|---|---|---|---|---|
| 6,122,798 A * | 9/2000 | Kobayashi | ............ | A47L 9/0483 15/387 |
| 2002/0153185 A1* | 10/2002 | Song | ............ | A47L 9/2894 180/167 |
| 2005/0000543 A1* | 1/2005 | Taylor | ............ | G05D 1/0274 134/18 |
| 2009/0198376 A1* | 8/2009 | Friedman | ............ | G08C 17/00 700/248 |

(Continued)

*Primary Examiner* — Kenneth M Lo
*Assistant Examiner* — Mohammed Shafayet

(57) ABSTRACT

A system for collaboration between a first robot and a second robot, including: an application of a communication device configured to receive at least one input designating an instruction for the first robot to execute a first task and an instruction for the second robot to execute a second task after the first robot completes the first task; the first robot, including a medium storing instructions that when executed by a processor of the first robot effectuates operations including: actuating the first robot to execute the first task; and actuating the first robot to dock at a charging station upon completion of the first task; and the second robot including a medium storing instructions that when executed by a processor of the second robot effectuates operations including actuating the second robot to execute the second task upon receiving a signal indicating the first task is complete by the first robot.

20 Claims, 10 Drawing Sheets

Related U.S. Application Data

22, 2018, provisional application No. 62/746,688, filed on Oct. 17, 2018, provisional application No. 62/740,573, filed on Oct. 3, 2018, provisional application No. 62/740,558, filed on Oct. 3, 2018, provisional application No. 62/740,580, filed on Oct. 3, 2018, provisional application No. 62/739,738, filed on Oct. 1, 2018, provisional application No. 62/737,576, filed on Sep. 27, 2018, provisional application No. 62/737,270, filed on Sep. 27, 2018, provisional application No. 62/610,633, filed on Dec. 27, 2017, provisional application No. 62/577,067, filed on Oct. 25, 2017, provisional application No. 62/535,736, filed on Jul. 21, 2017, provisional application No. 62/509,701, filed on May 22, 2017, provisional application No. 62/506,991, filed on May 16, 2017.

(56) References Cited

U.S. PATENT DOCUMENTS

| | | | |
|---|---|---|---|
| 2011/0035052 A1* | 2/2011 | McLurkin | G06N 3/008 901/1 |
| 2011/0264305 A1* | 10/2011 | Choe | G05D 1/0246 701/28 |
| 2014/0207280 A1* | 7/2014 | Duffley | A47L 9/2857 700/257 |
| 2016/0129592 A1* | 5/2016 | Saboo | G05D 1/0297 700/248 |
| 2017/0083005 A1* | 3/2017 | Hickman | A01N 25/10 |
| 2018/0050634 A1* | 2/2018 | White | G05D 1/0016 |
| 2018/0070787 A1* | 3/2018 | Gordon | A47L 9/2852 |
| 2018/0242806 A1* | 8/2018 | Haegermarck | G05D 1/024 |
| 2019/0217474 A1* | 7/2019 | Tang | A47L 9/2852 |
| 2019/0278269 A1* | 9/2019 | He | G05D 1/0088 |

* cited by examiner

COLLABORATIVE INTELLIGENCE OF ARTIFICIAL INTELLIGENCE AGENTS

CROSS-REFERENCE TO RELATED APPLICATIONS

This application is a Continuation of U.S. Non-Provisional patent application Ser. No. 16/584,950, filed Sep. 27, 2019, which is a Continuation in Part of U.S. Non-Provisional patent application Ser. No. 15/981,643, filed May 16, 2018, which claims the benefit of U.S. Provisional Patent Application Nos. 62/506,991, filed May 16, 2017, 62/509,701, filed May 22, 2017, 62/535,736, filed Jul. 21, 2017, 62/577,067, filed Oct. 25, 2017, and 62/610,633, filed Dec. 27, 2017, each of which is hereby incorporated by reference.

U.S. Non-Provisional patent application Ser. No. 16/584,950 also claims the benefit of U.S. Provisional Patent Application Nos. 62/746,688, filed Oct. 17, 2018, 62/740,573, filed Oct. 3, 2018, 62/740,580, filed Oct. 3, 2018, 62/740,558, filed Oct. 3, 2018, 62/737,270, filed Sep. 27, 2018, 62/739,738, filed Oct. 1, 2018, 62/748,943, filed Oct. 22, 2018, 62/756,896, filed Nov. 7, 2018, 62/772,026, filed Nov. 27, 2018, 62/774,420, filed Dec. 3, 2018, 62/760,267, filed Nov. 13, 2018, and 62/737,576, filed Sep. 27, 2018, each of which is hereby incorporated by reference.

In this patent, certain U.S. patents, U.S. patent applications, or other materials (e.g., articles) have been incorporated by reference. Specifically, U.S. patent application Ser. Nos. 15/272,752, 15/949,708, 16/277,991, 16/048,179, 16/048,185, 16/163,541, 16/163,562, 16/163,508, 16/185,000, 16/051,328, 15/449,660, 16/041,286, 16/422,234, 15/406,890, 14/673,633, 15/676,888, 16/163,530, 16/297,508, 16/418,988, 15/614,284, 15/955,480, 15/425,130, 15/955,344, 15/243,783, 15/954,335, 15/954,410, 15/257,798, 15/674,310, 15/224,442, 15/683,255, 15/048,827, 14/817,952, 15/619,449, 16/198,393, 15/981,643, 15/986,670, 15/444,966, 15/447,623, 15/951,096, 16/270,489, 14/948,620, 14/922,143, 15/878,228, 15/924,176, 16/024,263, 16/203,385, 15/462,839, 16/239,410, 16/440,904, 15/673,176, 16/058,026, 14/970,791, 16/375,968, 15/432,722, 16/238,314, 14/941,385, 16/279,699, 16/041,470, 15/410,624, 16/504,012, and 16/427,317 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The disclosure relates to collaboration of semi-autonomous and autonomous robots.

BACKGROUND

AI agents, such as robots, have become increasingly used for carrying out routine tasks. For a task to be completed more efficiently, a network of AI agents may share their intelligence with one another and collaborate to complete the task. AI agents may also share their intelligence to enhance their situational awareness in order to more effectively collaborate by, for example, delegating tasks in the most efficient manner. For example, two robotic floor cleaners operating within the same environment may autonomously communicate to divide an area to be cleaned between the two of them thereby reducing the time it takes to clean the area. In another example, two robots providing complimentary services in the same area may communicate to determine an order of providing the services and share status and progress of a task (e.g., robotic vacuum and robotic mop). A method for dynamic collaboration between multiple AI agents by transmitting, receiving, and processing wireless signals among one another may be advantageous.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Provided is a system for collaboration between a first robot and a second robot, including: an application of a communication device configured to receive at least one input designating an instruction for the first robot to execute a first task and an instruction for the second robot to execute a second task after the first robot completes the first task; the first robot, including: a plurality of sensors; and a tangible, non-transitory, machine readable medium storing instructions that when executed by a processor of the first robot effectuates operations including: actuating, with the processor of the first robot, the first robot to execute the first task; and actuating, with the processor of the first robot, the first robot to dock at a charging station upon completion of the first task; and the second robot, including: a plurality of sensors; and a tangible, non-transitory, machine readable medium storing instructions that when executed by a processor of the second robot effectuates operations including: actuating, with the processor of the second robot, the second robot to execute the second task upon receiving a signal indicating the first task is complete by the first robot.

Included is a method for collaboration between a first robot and a second robot, including: receiving, with an application of a communication device paired with the first robot and the second robot, at least one input designating an instruction for the first robot to execute a first task and an instruction for the second robot to execute a second task after the first robot completes the first task; actuating, with a processor of the first robot, the first robot to execute the first task; actuating, with the processor of the first robot, the first robot to dock at a charging station upon completion of the first task; and actuating, with a processor of the second robot, the second robot to execute the second task upon receiving a signal indicating the first task is complete by the first robot.

BRIEF DESCRIPTION OF THE DRA WINGS

DETAILED DESCRIPTION OF SOME EMBODIMENTS

Figure 1A:
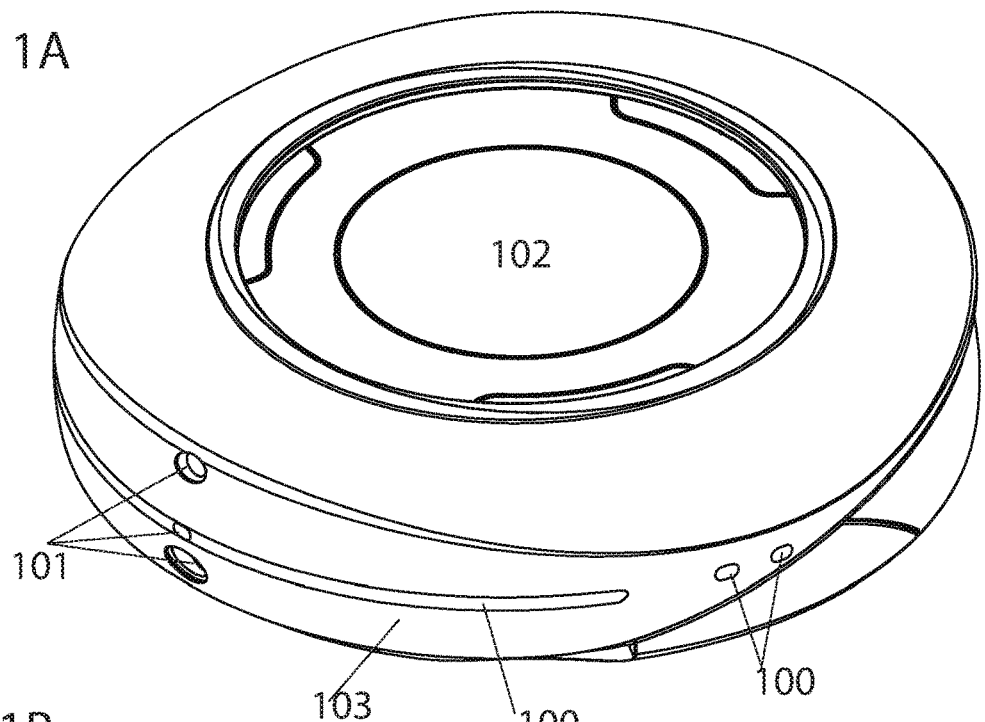
FIGS. 1A and 1B illustrate an example of a robotic vacuum, according to some embodiments.

The present techniques will now be described in detail with reference to a few embodiments thereof as illustrated in the accompanying drawings. In the following description, numerous specific details are set forth in order to provide a thorough understanding. It will be apparent, however, to one skilled in the art, that the present techniques may be practiced without some or all of these specific details. In other instances, well known process steps and/or structures have not been described in detail in order to not unnecessarily obscure the present techniques. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments include a robot including, but not limited to, wheels, motors, a power source, internal and external sensors, one or more processors, one or more controllers, a memory, and mapping, area division, localization, and path planning capabilities. In some embodiments, sensors include one or more of, but are not limited to, sonar sensors, light detection and ranging (LIDAR) sensors, laser detection and ranging (LADAR) sensors, cameras, stereo and structured light sensors, time-of-flight sensors, TSSP sensors, infrared (IR) sensors, tactile sensors, ultrasonic sensors, depth sensing sensors, optical flow sensors, light transmitters and receivers, odometry sensors, optical encoders, inertial measurement units (IMU), global positioning systems (GPS), structure from motion sensors, gyroscopes, floor sensors, debris sensors, motion sensors, electric current sensors, and acoustic sensors. The robot may further include edge detection sensors, such as those described in U.S. patent application Ser. Nos. 14/941,385, 16/279,699, and 16/041,470, the entire contents of which are hereby incorporated by reference. The robot may further include network capabilities such as Wi-Fi or Bluetooth capability. Other robots with other configurations may also be used.

In some embodiments, the wheels of the robot include a wheel suspension system. Examples of dual wheel suspension systems are described in U.S. patent application Ser. Nos. 15/951,096 and 16/270,489, the entire contents of which are hereby incorporated by reference. In some embodiments, the different wheel suspension systems may be used independently or in combination. In some embodiments, the wheels of the robot are mecanum wheels. In some embodiments, the wheels of the device are also expandable, as described in U.S. patent application Ser. Nos. 15/444,966 and 15/447,623, the entire contents of which are hereby incorporated by reference. In some embodiments, one or more wheels of the robot are driven by one or more electric motors. For example, a wheel may include a main wheel gear that may be driven by one or more output gears interfacing with the wheel gear, the one or more output gears powered by one or more electric motors. The processor of the robot may autonomously activate each of the one or more output gears independently of one another depending on the amount of torque required. In some embodiments, a brushless DC wheel motor may be positioned within a wheel of the robot. For example, the wheel with motor may include a rotor with magnets, a bearing, a stator with coil sets, an axle and tire each attached to a rotor.

In some embodiments, the robot includes a depth perceiving device. In one example, a depth perceiving device may include a laser light emitter, two image sensors, and an image processor. The image sensors simultaneously capture an image of a light point projected onto an object surface by the laser light emitter and the image processor superimposes the two images and extracts a distance between the lights points when superimposed. The image processor determines the distance to the object surface based on a relationship between a distance between the two light points and a distance to an object surface on which the light point is projected. In another example, a depth perceiving device includes a laser light emitter, an image sensor, and an image processor. The laser light emitter is positioned at an angle with respect to a driving surface of the robot. The image sensor captures an image of a laser line projected onto an object surface by the laser light emitter. The image processor extracts the laser line from the image and determines its position relative to an edge of the image. The processor determines the distance to the object surface based on a relationship between a position of a laser line relative to an edge of the image and a distance to an object surface on which the laser line is projected. In another example, a depth perceiving device includes an image sensor, an image processor, and at least two laser emitters positioned at an angle. The laser emitters project light points onto an object surface, which is captured by the image sensor. The image processor may extract geometric measurements (e.g., distance between light points or surface area within light points) and compare the geometric measurement to a preconfigured table that relates the geometric measurements with depth to the object surface onto which the light points are projected. Examples of depth perceiving devices that may be used to measure depth or collect data from which depth to object surfaces may be inferred are described in U.S. patent application Ser. Nos. 15/243,783, 15/954,335, 15/954,410, 15/257,798, 15/674,310, 15/224,442, and 15/683,255, the entire contents of which are hereby incorporated by reference. Various different configurations of a depth perceiving device, in terms of positioning of components and types of components included, may be used. For example, combinations including laser emitters and cameras may be used to estimate depth using methods such as those described above. Combinations including a camera and a TOF sensor or a camera and a gyroscope may be used to estimate depth using two different methods, the two methods, when used in combination, increasing the accuracy and confidence of the depth measured. Combinations including two cameras and a laser emitter may also improve accuracy as two cameras capture images of the environment, each camera providing images from which depth may be estimated. Depending on the arrangement of the cameras, in addition to improving accuracy, the second camera may increase the field of view (FOV) of the distance readings as well. For example, the first camera may be blind to a range of short distances when the projected light does not fall within the FOV of the first camera, however, the projected light may be seen with the field of view of the second camera because of the difference in the position between the two cameras. Also, the FOV of each camera may combined to provide double the FOV or provide overlap which serves for high accuracy. In embodiments, the components used in a depth perceiving device do not have to be in any particular arrangement so long as the arrangement of each component and geometry of the arrangement of the components are known by the software estimating the depth to object surfaces. In some embodiments, movement of the camera may be used to increase the FOV. In some embodiments, the camera or a separate software increases the FOV.

In some embodiments, the processor compares identified features in two images captured by the same camera consecutively to estimate depth, given that motion of the camera between images is measured by, for example, a gyroscope of the robot. In some embodiments, the processor determines the size of a feature using pixel intensity. The speed at which the feature increases or decreases in size may be proportional to the speed of movement of the robot and how far the feature is from the robot.

In some embodiments, depth is measured as a single measurement point without overlap. For example, the robot may include a sensor, such as a TOF flight sense sensor, capable of measuring the distance to a single point. In some embodiments, a sensor such as VL6180 or VL 53 from ST Micro may be used to capture one measurement to a point in the FOV of the camera. In some embodiments, the processor may extrapolate the measurement to infer depth measurements to all obstacles within the FOV. In some embodiments, the robot rotates 360 degrees while the sensor measures single point distance measurements. In some embodiments, a gyroscope or other movement measurement device may be used to measure the turning angle such that a distance measurement may be associated with each degree (or any other increment of degrees, such as 0.025, 0.5, 2, or 5 degrees) of rotation. In some embodiment, a higher resolution gyroscope may be used with a high sampling rate sensor (e.g., 50 readings per second). In some embodiments, as the robot rotates to complete a full turn, the robot may deviate, slipping and drifting. In such instances, the robot may not actually be located at the estimated location of the robot, resulting in erroneous distance measurements. In some embodiments, the robot may include an upward facing camera and at each measurement step may capture an image. In some embodiments, the processor adjusts for the slippage by comparing each image captured to the image expected after a predetermined number of degrees of rotation. In some embodiments, the difference between the actual and the expected image may be used by the processor to correct for slippage. In some embodiments, the processor determines the amount of rotation and translation required to align the captured image with the expected image and uses the measured adjustment to adjust the robot. In some embodiments, more than one TOF sensor may be used to improve depth measurements. In other cases, other configurations may be used to correct for deviation of the robot. For example, the processor may extract any feature in an image and observe its displacement or the displacement of a projected laser line or arrangement of laser points. In embodiments, the orientation of the camera may vary (e.g., forward facing and angled upwards, forward facing, back facing and angled downwards, etc.).

In some embodiments, one or more of the depth perceiving devices described above may be used for adjusting the heading of the robot. In some embodiments, the processor determines whether the image of a light pattern is distorted with respect to an expected image of the light pattern based on the heading of the robot. Depending on the results of the image analysis, the robot may take any of a variety of actions to maintain or correct its heading. In some embodiments, the processor extracts natural features of the environment (e.g., edges and corners) from captured images and determines asymmetry of one or more of those features to determine the heading adjustment. In some embodiments, the processor simply examines pixels of images captured in sequence to determine heading adjustment. Given that images captured in sequence at least partially overlap, the processor may examine the overlap of pixels between two consecutive images to determine if the pixels have moved asymmetrically from a first image captured to a second image captured consecutively. Further details of methods for adjusting the heading of a robot are described in U.S. patent application Ser. Nos. 15/410,624 and 16/504,012, the entire contents of which are hereby incorporated by reference.

Figure 1B:
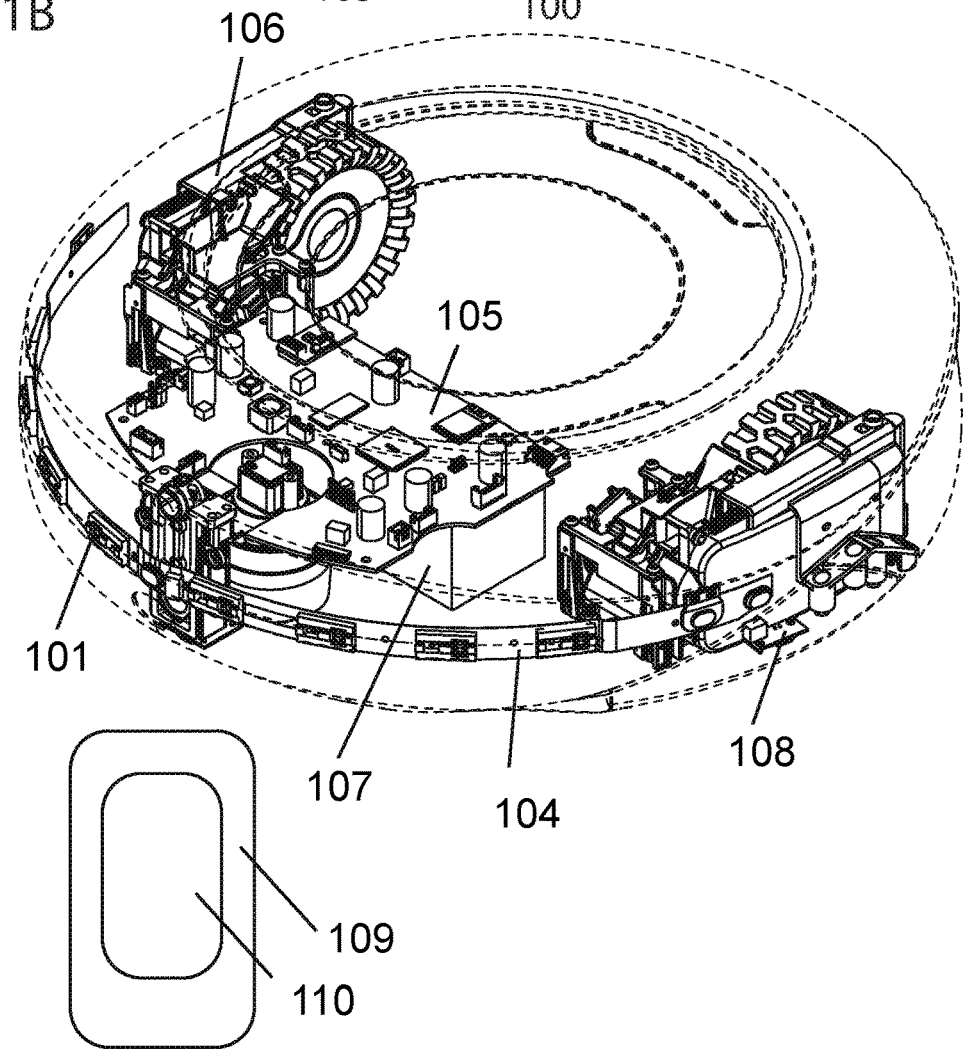

Various different types of autonomous robots, such as autonomous vehicles, autonomous mail deliverers, and autonomous food servers, may implement the methods and techniques described herein. For example, FIG. 1A illustrates a robotic vacuum including sensor windows 100 behind which sensors are positioned, sensors 101 (e.g., camera, laser emitter, TOF sensor, etc.), user interface 102, and bumper 103. FIG. 1B illustrates internal components of the robotic surface cleaner including sensors 101 of sensor array 104, PCB 105, wheels including suspension 106, battery 107, and floor sensor 108. Some embodiments additionally include a communication device 109 having a touchscreen 110 capable of executing a software application paired with the robot 100.

In some embodiments, a robotic surface cleaner, such as the robotic vacuum or robotic mop described above, may include a pair of counter-rotating brushes. In some embodiments, a brush may include at least one segmented blade. In some embodiments, segmented blades may be positioned equidistant from one another. In some embodiments, a brush may include at least one continuous blade fabricated from a single continuous piece of material. In some embodiments, a brush may include at least one segmented blade and at least one continuous blade. In some embodiments, each brush includes different types, number, and arrangement of blades. In some embodiments, a brush may include several blades, the blades alternating between segmented blades and continuous blades. In some embodiments, blades may be positioned along a path on a blade root and mechanically coupled therewith. In some embodiments, the path may be a spiral path. In some embodiments, the path of at least some of the blades of a brush may be parallel. In some embodiments, a brush may include a number of cut-outs extending along each blade, the cut-outs being sized and positioned to accommodate clearance of brush guard bars of a brush guard, resulting in a portion of the blade extending beyond the brush guard. In some embodiments, the brush guard may include a number of brush guard bars that may be positioned substantially perpendicular to an axis of a pair of counter-rotating brushes. In addition, in some embodiments, brush guards may further include a pair of retainers formed to capture a pair of counter-rotating brushes. In addition, in some embodiments, blade ends may be rounded, wherein the contact edge of each blade may be rounded or semi-rounded. In some embodiments, the blade root may include a hollow blade root defining a cylinder for receiving a drive axle. In order to mate hollow blade root embodiments with a drive axle, one or more keyways may be formed along an interior surface of a hollow blade root. Some embodiments may provide a housing to contain pairs of counter-rotating brushes including at least cradles for receiving a pair of counter-rotating brushes. Cradles may be positioned on one end of the housing. End caps may be positioned along an opposite end of the housing from the cradles. Cradles and end caps may be provided to maintain counter-rotating brush pairs in a substantially parallel position. In some embodiments, brushes may be manufactured from a material such as, a natural rubber, a polymeric compound, a siliconized polymeric compound, a flexible material, a semi-flexible material, or any combination thereof. In embodiments, various brush configurations are possible. For example, the two counter-rotating brushes may have different length, diameter, shape, blade paths, number of blades, shape of blades, size of blades, pattern of blades, material, etc. An example of counter-rotating brushes is provided in U.S. patent application Ser. No. 15/462,839, the entire contents of which is hereby incorporated by reference. In some embodiments, robotic surface cleaners may additionally include one or more side brushes. Examples of side brushes are described in U.S. patent application Ser. Nos. 15/924,176, 16/024,263, and 16/203,385, the entire contents of which are hereby incorporated by reference. In some embodiments, robotic surface cleaners may include a rotating assembly that rotates one or more cleaning tools in a plane parallel to the driving surface. An example of a spinning cleaning tool subsystem is described in U.S. patent application Ser. Nos. 14/922,143 and 15/878,228, the entire contents of which are hereby incorporated by reference.

In some embodiments, robotic surface cleaners may include a mop attachment. In some embodiments, the mop attachment includes a frame; a reservoir positioned within the frame, one or more drainage apertures positioned on the bottom of the mop attachment that allow liquid to flow out of the reservoir; a breathing aperture, which may allow air into the reservoir, positioned on an upper portion (or on another location in some cases) of the reservoir, and a pressure actuated valve positioned on an inner surface of the reservoir and under the breathing aperture, sealing the reservoir while in a closed position and opening when a certain amount of negative air pressure has built up inside the reservoir due to the draining of liquid, letting some air inside the reservoir through the breathing aperture which increases the air pressure inside the reservoir, allowing liquid to drain from the drainage apertures once again. In some embodiments, the cleaning liquid drains through drainage apertures onto a mopping cloth that may be attached to the underside of the mop attachment. In some embodiments, the pressure actuated valve includes a valve body, adapted for mounting on at least an air passage; a valve member connected to the valve body having at least a flexible element moveable relative to the valve body that forms a seal on the air passage when in a closed position, wherein a certain pressure difference between the two sides of the valve member moves the flexible element from the closed position to an open position letting air enter the air passage. In some embodiments, the drainage apertures may further include a flow reduction valve positioned on the drainage apertures to reduce the flow of liquid from the reservoir. In some embodiments, the mopping attachment may be removable. Further details of a mop attachment are described in U.S. patent application Ser. No. 16/440,904, the entire contents of which is hereby incorporated by reference.

In some embodiments, robotic surface cleaners include a fluid control mechanism for mopping. In some embodiments, the release of liquid by the control mechanism may be determined by the motion of the robotic surface cleaning device. For example, the release of liquid by the control mechanism may be determined by the rotary motion of one or more non-propelling wheels of the robotic surface cleaning device. In some embodiments, a rotatable cylinder with at least one aperture for storing a limited quantity of liquid may be connected to a non-propelling (or propelling) wheel of the robotic surface cleaning device such that cylinder rotation is controlled by rotation of the wheel. In some embodiments, the axle may turn the rotatable cylinder when the rotary motion of one or more non-propelling wheels of the robotic surface cleaning device occurs. In embodiments, the cylinder may be within or adjacent to a liquid reservoir tank. In some embodiments, there may be a passage below the cylinder and between the cylinder and a drainage mechanism. Each time at least one aperture is exposed to the liquid within the reservoir tank, it fills with liquid. As the wheel turns, the connected cylinder is rotated until the aperture is adjacent to the passage. Upon exposure to the passage, the liquid flows out of the aperture by means of gravity, passes through the passage, and enters the drainage mechanism, whereby the liquid is delivered onto the working surface or a mopping pad attached to the robot. In some embodiments, the drainage mechanism disperses liquid throughout a plane. For example, a drainage mechanism may include a hollow body with a perforated underside through which liquid may pass to surfaces below. In some embodiments, the fluid control mechanism for mopping is detachable. In some embodiments, additional cylinders are included.

In some embodiments, the rotatable cylinder with at least one aperture may be connected to a motor and the motor may rotate the rotatable cylinder. In some embodiments, a processor of the robotic surface cleaning device may control operation (e.g., speed, activation/deactivation, etc.) of the motor based on information received from, for example, an odometer or gyroscope providing information on movement of the robotic surface cleaning device (e.g., speed), optical encoder providing information on rotation of the wheels of the robotic surface cleaning device or its distance travelled, user interface, floor sensors, timer, debris sensor, sensors for detecting fluid levels or other types of sensors that may provide information that may be useful in controlling the operation of the motor and hence the release of cleaning fluid. In some embodiments, the processor may control the operation of the motor based on historical data such as historical data of areas covered (e.g., location, day, and time). Further details of a fluid control mechanism for mopping are provided in U.S. patent application Ser. Nos. 15/673,176 and 16/058,026, the entire contents of which are hereby incorporated by reference.

In some instances, robotic surface cleaners include a mopping module including at least a reservoir and a water pump driven by a motor for delivering water from the reservoir indirectly or directly to the driving surface. In some embodiments, the water pump autonomously activates when the robotic surface cleaner is moving and deactivates when the robotic surface cleaner is stationary. In some embodiments, the water pump includes a tube through which fluid flows from the reservoir. In some embodiments, the tube may be connected to a drainage mechanism into which the pumped fluid from the reservoir flows. In some embodiments, the bottom of the drainage mechanism includes drainage apertures. In some embodiments, a mopping pad may be attached to a bottom surface of the drainage mechanism. In some embodiments, fluid is pumped from the reservoir, into the drainage mechanism and fluid flows through one or more drainage apertures of the drainage mechanism onto the mopping pad. In some embodiments, flow reduction valves are positioned on the drainage apertures. In some embodiments, the tube may be connected to a branched component that delivers the fluid from the tube in various directions such that the fluid may be distributed in various areas of a mopping pad. In some embodiments, the release of fluid may be controlled by flow reduction valves positioned along one or more paths of the fluid prior to reaching the mopping pad.

Figure 2A:
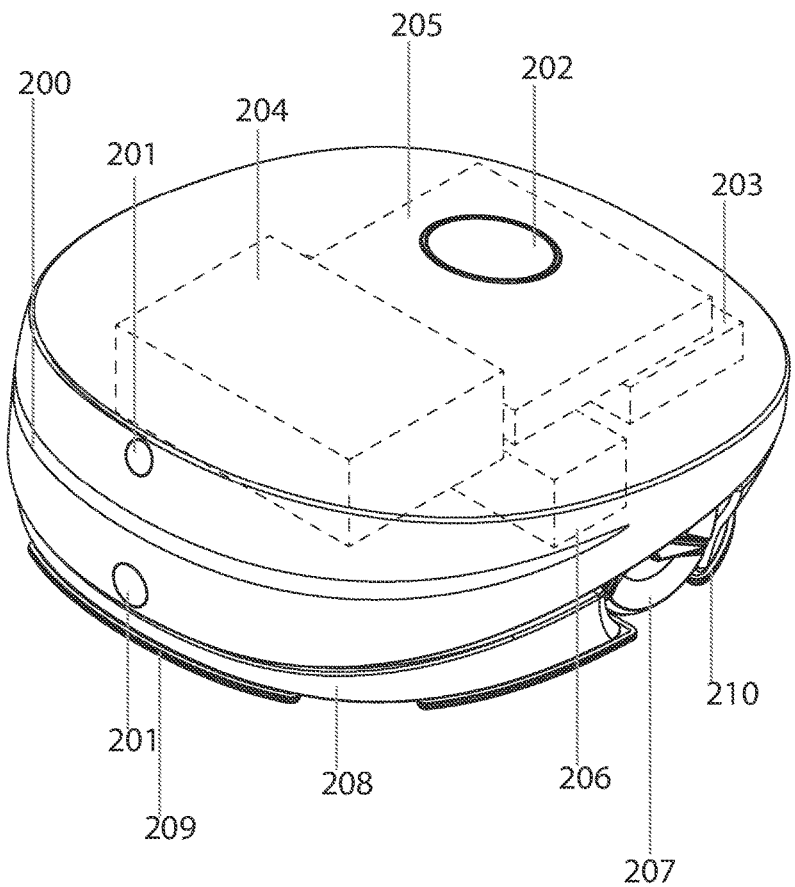
FIGS. 2A and 2B illustrate an example of a robotic mop, according to some embodiments.
Figure 2B:
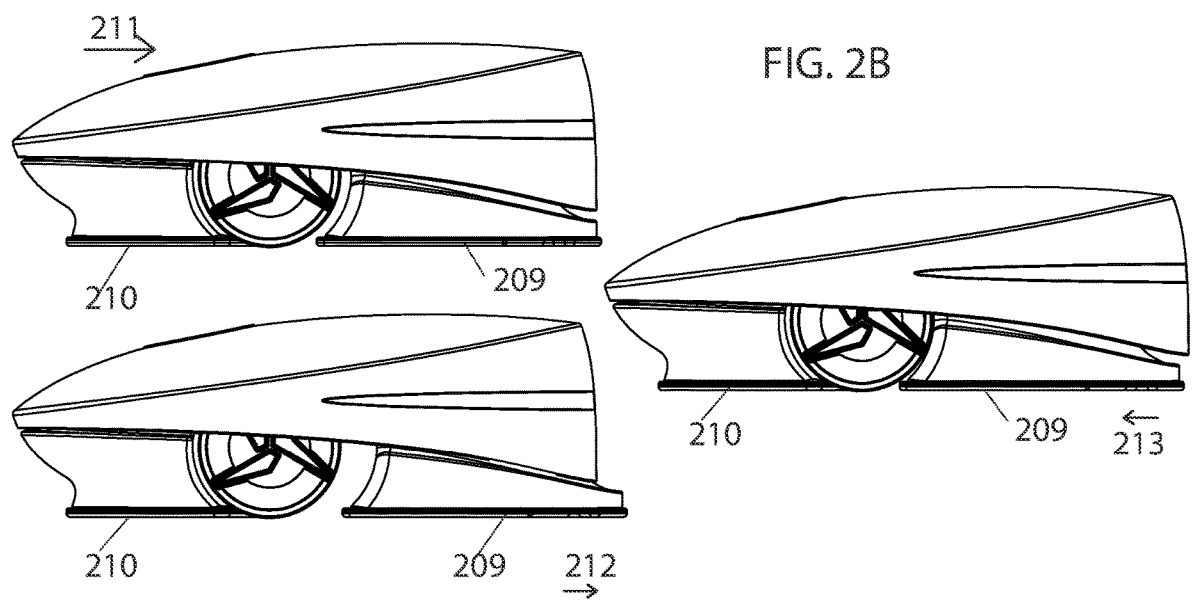

Some embodiments provide a mopping extension unit for robotic surface cleaners to enable simultaneous vacuuming and mopping of work surface and reduce (or eliminate) the need for a dedicated mopping robot to run after a dedicated vacuuming robot. In some embodiments, a mopping extension may be installed in a dedicated compartment of or built into the chassis of the robotic surface cleaning device. In some embodiments, the mopping extension may be detachable by, for example, activating a button or latch. In some embodiments, a cloth positioned on the mopping extension contact the driving surface as the robotic surface cleaning device drives through the area. In some embodiments, nozzles direct fluid from a fluid reservoir to the mopping cloth. In some embodiments, the nozzles continuously deliver a constant amount of cleaning fluid to the mopping cloth. In some embodiments, the nozzles periodically deliver predetermined quantities of cleaning fluid to the cloth. In some embodiments, a water pump delivers fluid from a reservoir to a mopping cloth, as described above. In some embodiments, the mopping extension includes a set of ultrasonic oscillators that vaporize fluid from the reservoir before it is delivered through the nozzles to the mopping cloth. In some embodiments, the ultrasonic oscillators vaporize fluid continuously at a low rate to continuously deliver vapor to the mopping cloth. In some embodiments, the ultrasonic oscillators turn on at predetermined intervals to deliver vapor periodically to the mopping cloth. In some embodiments, a heating system may alternatively be used to vaporize fluid. For example, an electric heating coil in direct contact with the fluid may be used to vaporize the fluid. The electric heating coil may indirectly heat the fluid through another medium. In other examples, radiant heat may be used to vaporize the fluid. In some embodiments, water may be heated to a predetermined temperature then mixed with a cleaning agent, wherein the heated water is used as the heating source for vaporization of the mixture. In some embodiments, water is placed within the reservoir and the water is reacted to produce hydrogen peroxide for cleaning and disinfecting the floor. In such embodiments, the process of water electrolysis is used to generate hydrogen peroxide. In some embodiments, the process includes water oxidation over an electrocatalyst in an electrolyte, that results in hydrogen peroxide dissolved in the electrolyte which may be directly applied to the working surface or mopping pad or may be further processed before applying it to the driving surface. In some embodiments, the surface cleaning robot includes a means for moving the mopping cloth (and a component to which the mopping cloth may be attached) back and forth (e.g., forward and backwards or left and right) in a horizontal plane parallel to the work surface during operation (e.g., providing a scrubbing action) such that the mopping cloth may pass over an area more than once as the robot drives. In some embodiments, the robot may pause for a predetermined amount of time while the mopping cloth moves back and forth in a horizontal plane, after which, in some embodiments, the robot may move a predetermined distance before pausing again while the mopping cloth moves back and forth in the horizontal plane again. In some embodiments, the mopping cloth may move back and forth continuously as the robot navigates within the environment. In some embodiments, the mopping cloth is positioned on a front portion of the surface cleaning robot. In some embodiments, a dry cloth is positioned on a rear portion of the surface cleaning robot. In some embodiments, as the robot navigates, the dry cloth contacts the driving surface and because of its position on the robot relative to the mopping cloth, dries the driving surface after the driving surface is mopped with the mopping cloth. For example, FIG. 2A illustrates a robot including sensor windows 200 behind which sensors are positioned, sensors 201 (e.g., camera, laser emitter, TOF sensor, etc.), user interface 202, a battery 203, a wet mop movement mechanism 204, a PCB and processing unit 205, a wheel motor and gearbox 206, wheels 207, a wet mop tank 208, a wet mop cloth 209, and a dry mop cloth 210. FIG. 2B illustrates the robot driving in a direction 211. While driving, or while pausing, wet mop cloth 209 moves back and forth in a forward direction 212 and backward direction 213, respectively. As the robot drives forward, dry cloth 210 dries the driving surface that has been cleaned by wet mop cloth 209. In some embodiments, the mopping extension includes a means to vibrate the mopping extension during operation (e.g., eccentric rotating mass vibration motors). In some embodiments, the mopping extension includes a means to engage and disengage the mopping extension during operation by moving the mopping extension up and down in a vertical plane perpendicular to the work surface. In some embodiments, engagement and disengagement may be manually controlled by a user. In some embodiments, engagement and disengagement may be controlled automatically by the processor based on sensory input. For example, the processor may actuate the mopping extension to move in an upwards direction away from the driving surface upon detecting carpet using sensor data. Further details of a mopping extension for robotic surface cleaners are provided in U.S. patent application Ser. Nos. 14/970,791 and 16/375,968, the entire contents of which are hereby incorporated by reference.

In some embodiments, robotic surface cleaners include a steam cleaning apparatus as described in U.S. patent application Ser. Nos. 15/432,722 and 16/238,314, the entire contents of which are hereby incorporated by reference. In some embodiments, robotic surface cleaners include a single module for mopping and vacuuming that, in some cases, may be removable from the robotic surface cleaner. The single mopping and vacuuming module may be used for dispensing water during mopping and collecting dust during vacuuming. In some embodiments, the mop may be engaged and disengaged such that the robot may drive over or vacuum carpeted areas without any risk of the mop wetting the carpeted floor. In some embodiments, the processor of a robotic surface cleaner may actuate at least a portion of the mop (e.g., a mopping pad) to move in an upwards direction away from the driving surface.

In another example, an outdoor robot may implement the methods and techniques described herein. In some embodiments, the outdoor robot includes at least a chassis, a set of wheels coupled to the chassis, a processor, a memory, a controller, and a plurality of sensors. In some embodiments, the outdoor robot may clean an outdoor environment using tools such as a sweeper tool, a blower tool, a suction tool, a brush tool, a sprayer tool, and the like. In some embodiments, the outdoor robot may be equipped with several tools and the processor may actuate one or more tools at a time depending on the type of cleaning required or the type of debris observed. For example, if a work environment includes leaves, a blower and a sweeper may be used. In some embodiments, the outdoor robot includes a bin. In some embodiments, the outdoor robot may sweep debris into the bin. In some embodiments, the processor determines decisions based on at least the season. For example, the processor may choose a cleaning tool, speed of the robot, etc. based on the season. In some embodiments, the processor determines decisions based on observations of the outdoor environment. For example, if a gardener is present, the robot may follow the gardener and collect any debris left behind by the gardener. In some embodiments, a control system manages a collection of outdoor robots and coordinates cleaning of the outdoor environment (e.g., a city) by the collection of outdoor robots. In some embodiments, a collection of outdoor robots collaborate with one another by sharing intelligence to coordinate cleaning of the outdoor environment. For example, if a cleaning service is needed urgently, a processor of a first robot may coordinate with a processor of a second robot to assist with the cleaning service. In another example, a processor of a first robot may coordinate with a processor of a second robot when the first robot encounters a debris type it cannot clean, but which the second robot can clean. In some embodiments, the outdoor robot may be able to empty its contents into, for example, a large outdoor refuse container such as a composting container or a yard waste container. In some embodiments, the processor determines a navigation route and order of cleaning based on debris data of the environment (e.g., areas of highest likelihood of debris accumulation, activity level in different areas). In some embodiments, the processor records debris data (e.g., size, shape, location, type, amount, etc.) while operating and uses debris data in making future decisions. In some embodiments, the processor of the outdoor robot receives a schedule of operations (e.g., day, time, and location to execute a particular function). In some embodiments, the processor receives user preferences (e.g., a suction power, a blowing power, a sweeper brush speed, light or detailed cleaning, day time or night time cleaning, etc.). In some embodiments, the processor receives a schedule or preferences from an application of a communication device paired with the robot. In some embodiments, the processor of the robot receives an image, determines a location captured within the image based on extracted features, and navigates to the location to perform a task. In some embodiments, the processor identifies an obstacle and executes an action based on the type of obstacle encountered. In some embodiments, the processor creates a map of the environment based on sensor data. In some embodiments, the map includes various data such as debris data, obstacle data, floor data, hazard data, and the like associated with different locations within the map. In some embodiments, the processor determines decisions (e.g., a movement path, travel speed, cleaning tool, division of the environments, etc.) based on at least some of the various data of the map (e.g., debris data and obstacle data). Further details of an outdoor robot are described in U.S. Patent Application No. 62/737,270, the entire contents of which is hereby incorporated by reference. In some embodiments, the outdoor robot may also water plants of an environment and outdoor robots may collaborate or may be managed by a control system to water plants of a city on a repeating basis.

In one example, a snow clearing robot may implement the methods and techniques described herein. In some embodiments, the snow clearing robot includes at least a chassis, a set of wheels coupled to the chassis, a processor, a memory, a controller, and a plurality of sensors. In some embodiments, the snow clearing robot ploughs snow and eliminates or reduces ice using tools such as a salt or sand spreader and a plough. In some embodiments, the snow clearing robot crushes ice using an ice crusher tool and ploughs the crushed ice. In some embodiments, the snow clearing robot compresses snow, such as snow on ski runs. In some embodiment, the snow clearing robot grooms ski runs using a snow rake. In some embodiments, the processor actuates a tool based on the desired function and the environment observed, wherein, for example, a different tool may be used for snow and ice or more than one tool may be used for both snow and ice. In some embodiments, the processor uses sensor data to observe the environment and records observations of snow and ice at different locations. In some embodiments, the processor determines decisions based on historical data of locations with snow and ice. In some embodiments, the processor of the robot receives weather forecasts (e.g., from a smart device such as a phone or home assistant) and executes an action based on the weather forecast. For example, upon receiving a weather forecast for heavy snowfall in the morning, the processor may actuate the robot to plough a driveway in the evening. In some embodiments, the processor receives an image from a camera monitoring outdoor weather and executes an action based on features extracted from the image data, wherein features may suggest ice or snow or other elements. In some embodiments, other sensors may be used to monitor the outdoor weather. In some embodiments, the snow clearing robot may additionally operate similar to the outdoor robot described in the example above, wherein debris may additionally include snow and ice. Furthermore, user preferences may additionally include those pertaining to the snow clearing robot, such as salt or sand spreading volume flow rate or ploughing speed. Additional details of a snow clearing robot are described in U.S. Patent Application No. 62/737,576, the entire contents of which is hereby incorporated by reference.

In another example, a first aid robot may implement the methods and techniques described herein. In some embodiments, the first aid robot provides medical services to individuals requiring medical assistance. In some embodiments, the first aid robot includes supplies such as a defibrillator, an epi-pen, insulin, a cauterizer, bandages, gauze, pain killers, syringes, a needle and thread, a blood transfusion module, blood, saline, a floatation device, an oxygen tank, a chest compression module, an x-ray, warming blankets, a fire extinguishing module, axe, a heat resistant suit, a stretcher, etc. In some embodiments, the first aid robot includes a refrigerator for maintaining a required temperature of fluids. In some embodiments, the first aid robot is heat resistant. In some embodiments, the first aid robot transports an individual requiring medical assistance to a medical facility. In some embodiments, the first aid robot autonomously administers one or more supplies to an individual or audibly and/or visually provides instructions for using one or more supplies to an operator. In some embodiments, a processor of the first aid robot is alerted of an individual that requires medical services or of another emergency by an electronic device such as, for example, a smart watch, an electronic health device, a fitness device, an implant, an application of a communication device, a remote control, or the like. In some embodiments, the processor is alerted of an individual that requires medical services or of another emergency by voice command. In some embodiments, the electronic device monitors vitals of the individual and upon detecting vitals indicative of a medical emergency, autonomously requests medical assistance from the first aid robot. In another example, a pacemaker of the individual may alert the processor of the first aid robot when the pacemaker malfunctions. In some embodiments, the alert received by the processor includes a location of where the medical services are required. In some embodiments, the processor of the first aid robot notifies paramedics (or other emergency medical services) of a medical emergency (e.g., when the medical emergency requires an ambulance or additional medical assistance). In some embodiments, the first aid robot includes one or more of a speaker, a microphone, a camera, and a graphical user interface that the individual may use to communicate with emergency medical services (e.g., paramedic, hospital, police, fire station, etc.) via a phone or video call. In some embodiments, the processor of the first aid robot transmits its location to emergency medical services. In some embodiments, the first aid robot is used in a residential setting (e.g., home) or community setting (e.g., neighborhood, city, etc.) or in a commercial setting (e.g., stadium, school, etc.). In some embodiments, the processor of the robot may receive medical assistance details (e.g., a location of the medical emergency, a type of medical assistance required, a type of medical emergency, etc.) from an application of a communication device with which it is paired. In some embodiments, a control system manages a collection of first aid robots, coordinating the provision of medical services throughout an environment (e.g., a city). In some embodiments, a collection of first aid robots collaborate with one another by sharing intelligence and coordinating the provision of medical services in an environment. For example, if a medical service is needed urgently, a processor of a first robot may coordinate with a processor of a second robot that is located closer to the medical service to provide the services as quick as possible. In another example, a processor of a first robot may coordinate with a processor of a second robot when the first robot encounters a medical emergency it cannot service, but which the second robot can. In some embodiments, the processor of the first aid robot receives a schedule for providing medical services (e.g., flu shot administration, attendance at large gatherings such as stadiums in case of emergency, etc.). In some embodiments, the processor of the first aid robot receives multiple requests for medical services. In some embodiments, the processor orders and responds to the requests for medical services based on, for example, most life threatening to least life threatening. In some embodiments, the processor communicates with a processor of another first aid robot and delegates some of the requests received. In some embodiments, the first aid robot is sanitized after providing medical services. In some embodiments, the processor may record the locations of different types of medical services provided and details thereof (e.g., duration of services, supplies used, etc.). In some embodiments, the processor determines decisions (e.g., parking location when idle) based on historical data of medical services (e.g., local and remote historical data). For example, first aid robots may position themselves within the environment based on likelihood of medical emergencies at different locations, occurrence of different types of medical emergencies at different locations, and medical service capabilities of the robot. In some embodiments, the first aid robot may include at least some of the methods and techniques described in the example above for the outdoor robot. Further details of a first aid robot are described in U.S. Patent Application No. 62/760,267, the entire contents of which is hereby incorporated by reference. Additional examples of different types of robots that may implement the methods and techniques described herein are disclosed in U.S. Patent Application Nos. 62/739,738, 62/756,896, 62/772,026, and 62/774,420, the entire contents of which are hereby incorporated by reference.

In some embodiments, two or more robots collaborate to generate a map of the environment. In some embodiments, the robots use sensors to measure the distance to objects (or to collect data from which distance to objects may be inferred) within the environment within their respective fields of view. A processor of each robot shares their respective distance measurements with all or a select group of other robots operating within the same environment. In some embodiments, other or additional sensor data is shared among the processors of the robots (e.g., odometry data, obstacle data, debris data, floor type data, localization data, status, tasks completed, upcoming tasks, movement path, weather data, etc.). In some embodiments, the processor of each robot adjusts the distance data received from a remote source based on the location of the remote source with respect to the location of the robot receiving the distance data. To form a larger field of view, the processor of each robot stores at least a portion of local and remote (i.e., from other robots) measurements and uses them to create a larger field of view of the map by combining overlapping measurements taken within separate fields of view, using overlapping readings as attachment points. In some embodiments, at least a portion of measurement are stored in temporary memory such that the measurements are only available during an operational session or in more permanent forms of memory such that the measurements are available at the next session or startup. In other embodiments, the processors store at least a portion of measurements remotely on an external device or the cloud. The method of sharing and combining local and remote readings taken by sensing devices mounted on various robots operating within the same environment is repeated, such that processors may construct an extended map of the environment by combining readings collected locally and remotely by multiple sensing devices positioned at different locations throughout the environment, allowing each robot to see beyond the surroundings it has discovered itself. In some embodiments, processors construct the map in a horizontal and/or vertical direction as measurements are combined. The direction in which the map expands depends on the field of view of the sensing devices by which the measurements to be combined were taken. In some embodiments, the map of the environment is constructed using data collected locally and/or remotely from at least one sensing device. In some embodiments, the at least one sensing device is of the same type or of different types. In some embodiments, the data is collected over a period of time. In some embodiments, processors of fixed sensing devices monitoring the environment (e.g., closed circuit television camera) and sensory devices that have previously operated within the same environment (e.g., data collected by sensors of a dump truck that previously worked within the environment six months ago) may also share their sensor readings. In some embodiments, a processor of one or more robots share data from a previously constructed map of the environment. In some embodiments, the processor of one robot constructs the map of the environment from local and/or remote data and shares the constructed map with processors of other robots. In some embodiments, the environment is represented by a map constructed of plotted measurements or an ordered list of readings. In another embodiment, the environment is represented by a matrix, wherein every cell within the matrix is a coordinate representing an area within the environment. Other suitable forms of representing the environment are used in other cases.

In some embodiments, the processor of a robot identifies overlap by comparing the measurements from a first field of view with measurements from a second field of view (e.g., evaluates a plurality of candidate overlaps between measurements taken within two fields of view). In some embodiments, the processor identifies overlap when a number of consecutive (e.g., adjacent in pixel or spatial space) measurements from the first and second fields of view are equal or close in value to within a tolerance range, by recognizing similar patterns, by detecting similar features, by detecting similar objects using thresholding, and/or by using a convolution. For instance, if two separate types of distance sensors from different sources measure similar distance to within a tolerance range, the processor infers that the distances measured were to the same objects and combines the two sets of measurements using the similar measurements as connecting points. In another example, if the processor identifies the same sequence of pixel values in two depth images, the processor infers that both images captured the same location within the environment and combines them at overlapping points. In some embodiments, the processor identifies patterns by taking the rate of change of measurements for both sets of data and comparing them to find similar patterns in the rate of change. For example, if the processor compares the color depth of two images and they are both observed to have the greatest rates of change in similar locations, the processor hypothesizes that the two images have overlapping data points and combines them. In another example, the processor identifies the area of overlap between two sets of readings by detecting a sudden increase then decrease in the values of two sets of measurements. Examples include applying an edge detection algorithm (like Haar or Canny) to measurements from the different fields of view and aligning edges in the resulting transformed outputs. Other patterns, such as increasing values followed by constant values followed by decreasing values or any other pattern in the values of the measurements, may also be used to estimate the area of overlap. In another example, if the processor detects a unique sign in two images the processor infers that both images were taken at the same place and overlap. In some embodiments, the processor uses features such as edges, circles, curves, lines or other shapes to identify overlap between features captured in images. In some cases, the processor uses a convoluted neural network to identify certain features in an image and connecting points between multiple images. This is particularly useful when, for example, images are captured from different distances causing the environment to appear differently in each of the images captured. In another example, the processor uses thresholding to identify the area of overlap between two sets of data by detecting similar areas or objects of interest within two images as areas or objects having high range of intensity may be separated from a background having low range of intensity wherein all pixel intensities below a certain threshold are discarded or segmented, leaving only the pixels of interest. In yet another example, the processor implements a kernel function that determines an aggregate measure of differences (e.g., a root mean square value) between some or all of a collection of adjacent measurements in one data set relative to a portion of the other data set to which the kernel function is applied, determines the convolution of the kernel function over the other data set (e.g., for images, in some cases with a stride of greater than one pixel value), and selects a minimum value of the convolution as an area of identified overlap that aligns the portion of the data set from which the kernel function was formed with the data set to which the convolution was applied. In some embodiments, the measured movement of the robot over one time step, as it moves from observing first field of view to observing second field of view, is used to estimate the area of overlap between distance measurements captured in the first and second fields of view of the same sensing device. In some embodiments, the processor identifies overlap using several different methods to increase the probability of a hypothesized overlap. In some embodiments, the processor uses each additional overlapping set of data to qualify or disqualify the hypothesized overlap between two sets of data. In some embodiments, the processor expands the area of overlap to include a number of data points immediately before and after (or spatially adjacent) the data points within the identified overlapping area.

In some embodiments, the processor of a robot uses a Jacobian and Hessian matrix to identify similarities between different sets of measurements. In some embodiments, the processor uses a metric, such as the Szymkiewicz-Simpson coefficient, to indicate how good of an overlap there is between two sets of data. In some embodiments, the processor uses the hamming distance between two sets of data to indicate confidence level of overlap between two sets of data. In some embodiments, the processor determines the confidence level of overlap between data collected from two separate sensing devices by considering the past confidence level of overlap between previous data collected from the two sensing devices and the rate of change of error between data collected from the two sensing devices over time. In some embodiments, the processor assigns a level of confidence to overlap between two sets of data from two different sensors, one set being from a first sensor and the other set being from a second sensor, the sensors being different sensing devices. Over time the sets of data combined change, but they remain from the same first and second sensors. A high confidence level indicates a high confidence in overlap between sets of data collected from the first and second sensors. In some embodiments, one set of data (X) collected from a first sensor and another set of data (Y) collected from a second sensor may be used by the processor. Given that both sets of data are of equal length, the processor may calculate the absolute difference between data X and data Y as the error. This provides the processor with an indication of the level of confidence for overlap between the two sets of data presently considered. In some embodiments, the processor considers previous levels of confidence in overlap between previous sets of data collected from the first and second sensors when determining the level of confidence for overlap between the present two sets of data by determining the error sum. In some embodiments, only a limited portion of the history is considered in determining the error sum. In some embodiments, the processor determines a derivative D=$\Delta$error/$\Delta$time and uses it in gauging the level of confidence in overlap between the two present sets of data considered, wherein a large rate of change in the error decreases the level of confidence in overlap. In some instances, the processor uses the derivative as a best estimate of the future trend of the error in the overlap between a set of data collected from the first sensor and a set of data collected from the second sensor given the current rate of change of the error.

In some embodiments, there may be discrepancies between the values of overlapping measurements from two fields of view due to measurement noise. In some embodiments, the processor of a robot calculates new measurements, or selects some of the measurements as more accurate than others. For example, the processor combines the overlapping measurements from two or more fields of view using a moving average (or some other measure of central tendency, like a median or mode) and adopts them as the new measurements for the area of overlap. In some embodiments, the processor uses minimum sum of errors to adjust and calculate new measurements for the overlapping area to compensate for the lack of precision between overlapping measurements. In some embodiments, the processor uses the minimum mean squared error to provide a more precise estimate of measurements within the overlapping area. In other embodiments, the processor uses other mathematical methods to further process the sensor data within the area of overlap, such as split and merge algorithm, incremental algorithm, Hough Transform, line regression, Random Sample Consensus, Expectation-Maximization algorithm, or curve fitting, for example, to estimate more accurate measurements within the overlapping area. In another embodiment, the processor uses the k-nearest neighbors algorithm where each new measurement is calculated as the average of the values of its k-nearest neighbors.

In some embodiments, the processor of a robot implements DB-SCAN on sensor data, e.g., in a vector space that includes both depths and pixel intensities corresponding to those depths, to determine a plurality of clusters, each corresponding to measurements of the same feature of an object. In some embodiments, the processor executes a density-based clustering algorithm, like DBSCAN, to establish groups corresponding to the resulting clusters and exclude outliers. To cluster according to, for example, depth vectors and related values like pixel intensity, some embodiments iterate through each of the depth vectors and designate a depth vector as a core depth vector if at least a threshold number of the other depth vectors are within a threshold distance in the vector space (which may be higher than three dimensional in cases where pixel intensity is included). In some embodiments, the processor then iterates through each of the core depth vectors and creates a graph of reachable depth vectors, where nodes on the graph are identified in response to non-core corresponding depth vectors being within a threshold distance of a core depth vector in the graph, and in response to core depth vectors in the graph being reachable by other core depth vectors in the graph, where two depth vectors are reachable from one another if there is a path from one depth vector to the other depth vector wherein every link and the path is a core depth vector and are within a threshold distance of one another. The set of nodes in each resulting graph, in some embodiments, may be designated as a cluster, and points excluded from the graphs may be designated as outliers that do not correspond to clusters. In some embodiments, the processor then determines the centroid of each cluster in the spatial dimensions of an output depth vector for constructing maps. In some cases, all neighbors have equal weight and in other cases the weight of each neighbor depends on its distance from the depth considered or (i.e., and/or) similarity of pixel intensity values.

In some embodiments, the processor of a robot uses a modified RANSAC approach where any two points, one from each data set, are connected by a line. The processor defines a boundary with respect to either side of the line. The processor considers any points from either data set beyond the boundary as outliers and excludes them. The processor repeats the process using another two points. The process is intended to remove outliers to achieve a higher probability of the measurement being true. Consider an extreme case where a moving object is captured in two frames overlapping with several frames captured without the moving object. The processor uses the approach described or RANSAC method to reject data points corresponding to the moving object. This method or a RANSAC method may be used independently or combined with other processing methods described above.

In some embodiments, the processor of a robot fixes a first set of measurements and uses it as a reference while transforming the second set of measurements, overlapping with the first set of measurements, to match the fixed reference. In one embodiment, the processor combines the transformed set of measurements with the fixed reference and uses the combination as the new fixed reference. In another embodiment, the processor only uses the previous set of measurements as the fixed reference. In some embodiments, the processor iteratively revises the initial estimation of a transformation function to align the newly read data to the fixed reference to produce minimized distances from the newly read data to the fixed reference. The transformation function may be the sum of squared differences between matched pairs from the newly read data and prior readings from the fixed reference. For example, in some embodiments, for each value in the newly read data, the processor finds the closest value among the readings in the fixed reference. In a next step, the processor uses a point to point distance metric minimization technique such that it best aligns each value in the new readings to its match found in the prior readings of the fixed reference. The processor may use a point to point distance metric minimization technique that estimates the combination of rotation and translation using a root mean square. The processor iterates the process to transform the newly read values using the obtained transformation information. In some embodiments, the processor uses these methods independently or combines them to improve accuracy. In one embodiment, the processor applies the adjustment applied to overlapping measurements to other measurements beyond the identified area of overlap, where the new measurements within the overlapping area are considered ground truth when making the adjustment.

In some instances where linear algebra is used, the processor of a robot implements Basic Linear Algebra Subprograms (BLAS) to carry out operations such as vector addition, vector norms, scalar multiplication, matrix multiplication, matric transpose, matrix-vector multiplication, linear combinations, dot products, cross products, and the like.

In some embodiments, wherein images of the environment are captured, the processor of a robot stitches images together at overlapping features or pixels of a pixmap of the images. In some embodiments, the processor preprocesses images before determining overlap. For example, the processor may infer an amount of displacement of a depth camera between two captured images, e.g., by integrating readings from an inertial measurement unit or odometer (in some cases after applying a Kalman filter), and then transform the origin for vectors in one image to match an origin for vectors in the other image based on the measured displacement, e.g., by subtracting a displacement vector from each vector in the subsequent image. In some embodiments, the processor reduces the resolution of images to afford faster matching, e.g., by selecting every other, every fifth, or more or fewer vectors, or by averaging adjacent readings to form two lower-resolution versions of the images to be aligned, then applies the resulting alignment to the two higher resolution images.

In some embodiments, the processor considers multiple variations of combinations when checking for overlap, each combination having different overlap, in order to filter through the data (local and/or remote), determine if and where there is overlap, and if so, the combination which results in measurements with the highest confidence level. In some embodiments, the confidence level of the measurements from a local source have higher confidence level than readings received from remote sources or vice versa. In some embodiments, the processor assigns readings from different sources different confidence levels. In some embodiments, the processor implements a combination which results in measurements with higher confidence level into the map, otherwise the processor stores the (local or remote) data for future combinations. For example, if the processor of a robot receives a set of readings from a remote source which has a number of consecutive readings with values similar to the same number of consecutive readings within its own map, the processor combines the readings and if their combination results in readings with a higher confidence level the processor implements the combination into the map. If a third set of readings happen to overlap with the two sets of readings as well, the processor considers multiple variations of combinations between the three sets of data, and if the processor finds a combination which results in readings with higher confidence level than what is currently in the map, the processor implements the combination into the map. In some embodiments, the processor calculates a probability of overlap between the two or more sets of data for multiple versions of combination between the two or more sets of data, each combination having a different area of overlap between the sets of data and uses the overlap with highest probability of overlap for stitching the two or more sets of data together. In some embodiments, two or more sets of data having a probability of overlap below a specified threshold are not combined.

In some embodiments, the processor replaces local measurements with low confidence level or noise with measurements observed remotely with higher confidence level and vice versa. For example, a processor replaces measurements of an area obstructed by a moving object by measurements from a fixed monitoring device, such as a CCTV camera, observing the same area as that captured in the obstructed frame. In some embodiments, the processor associates confidence level with resolution of a sensor, rate of capturing data, speed of transfer, time stamp, time-to-live, the number of hops of the information, etc.

In some embodiments, the processor assigns a weight to measurements taken by different sensing devices as certain sensing devices are more accurate than others under particular circumstances, such as weather conditions, geographical location, acoustic conditions, and the like. In some embodiments, the processor ignores readings if the weight of measurements taken by a specific sensing device is less than a predetermined threshold. For example, the readings from LIDAR sensors, cameras, and sonar sensors each have different weight depending on the environmental conditions. Assuming the processor determines the weight based on weather conditions and geographical location, data collected from cameras, for example, have a low weight under snowy conditions due to poor visibility while data collected from sonar sensors have a higher weight as sonar sensor measurements are not as affected by snow. Under thunderstorm conditions or in areas with poor acoustics, for example, data collected by sonar sensors have lower weight as their performance is affected. In some embodiments, the processor compares measurements from different sensors and considers measurements from a sensor to be an outlier if they are significantly different from measurements taken by the other sensors, and consequently ignores them. In other embodiments, the processor ignores all or some measurements from a sensor if multiple measurements taken by the same sensor are not consistent. In some embodiments, if similarity in measurements taken by different sensors is observed, the processor assigns those measurements a higher weight and considers them to be more accurate.

In some embodiments, the confidence level of measurements within the map fluctuate with measurements and movement. As the number of sets of overlapping measurements increases, the confidence level of overlapping measurements increases. However, since the confidence level of measurements decrease with motion, the confidence levels of the measurements within the map continuously fluctuate.

In some embodiments, the methods and techniques described herein do not assume an inherent superiority in locally collected data versus remotely collected data. In some embodiments, the methods and techniques described herein rely on the degree of alignment between sets of data, as opposed to the source of the data. Furthermore, in some embodiments, the methods and techniques described herein do not assume inherent superiority in the time stamp of collected data. For example, if a set of data collected by a remote sensor at time t produces higher confidence level than a set of data within the same field of view collected by a local sensor at some other time t', the processor replaces the data from the local sensor by those collected by the remote sensor. Some embodiments consider the time stamp of data as less important than the alignment between the data. In one embodiment, the processor combines time stamps with state space to form a space-time framework with a given origin.

In some embodiments, the processor of a robot uses raw data (e.g., sensed information from which distance has not been inferred), such as time required for a light or sound pulse to reflect off of an object or pixel intensity, directly (e.g., without first inferring distance) in creating a map of an environment, which is expected to reduce computational costs, as the raw data does not need to be first processed and translated into distance values, e.g., in metric or imperial units. By directly using raw data of a sensor extra steps are bypassed and raw values and relations between the raw values may be used to perceive the environment and construct the map without converting raw values to distance measurements with metric or imperial units, for example.

In some embodiments, maps are three dimensional maps, e.g., indicating the position of objects such as buildings, roads, walls, furniture, doors, and the like in an environment being mapped. In some embodiments, maps are two dimensional maps, e.g., point clouds or polygons or finite ordered list indicating objects at a given height (or range of height) above the driving surface. In some embodiments, the processor constructs two dimensional maps from two dimensional data or from three dimensional data where data at a given height above the driving surface is used and data pertaining to higher features are discarded. In some embodiments, maps may be encoded in vector graphic formats, bitmap formats, or other formats.

In some embodiments, the processor of a robot identifies one or more gaps in the map of the environment. In some embodiments, the robot navigates to the area in which the gap exists for further exploration, collecting new data while exploring. New data is collected by the sensors of the robot or another collaborating robot and combined with the existing map at overlapping points until the gap in the map no longer exists. In some embodiments, a gap is an opening in the wall. In some embodiments, the processor determines if the gap is a doorway using door detection methods described in U.S. Patent Application No. U.S. patent application Ser. Nos. 15/614,284 and 16/163,541, the entire contents of which is hereby incorporated by reference. In some embodiments, the processor uses doorways to segment the environment into two or more subareas. In some embodiments, the robot performs work in discovered areas while simultaneously mapping, thereby discovering previously undiscovered areas. In some embodiments, the robot performs work in newly discovered areas, repeating the process until mapping of the environment is complete.

In some embodiments, processors of robots operating within the same environment (either currently or in the past) share their maps with each other. In some embodiments, the processor of each robot merges two maps using different methods, such as the intersection or union of two maps. For example, in some embodiments, the processor of a robot applies the union of two maps to create an extended map of the environment with areas which may have been undiscovered in one of the two maps. In some embodiments, the processor of a robot creates a second map or places an existing (local or remote) map on top of a previously created map in a layered fashion, resulting in additional areas of the environment which may have not been recognized in the original map. Such methods may be used, for example, in cases where areas are separated by movable objects that may have prevented sensors from determining a portion of the map of the environment. In this case, the processor creates a second map or places a local or remote second map on top of the previously created first map in a layered fashion to add areas to the original map which may have not been previously discovered. The processor then recognizes (e.g., determines) the newly discovered area may be important (e.g., warrant adjusting a movement path based on) in completing an assigned task.

In some embodiments, the processor of a robot generates a local map and a global map. In some embodiments, the processor merges the local map and the global map. In some embodiments, the processor only observes a portion of the global map that is local relative to the location of the robot. In some embodiments, the processor superimposes one or more local maps on a global map in a layered fashion. In some instances, the processor combines two or more local maps to create a global map. In some instances, the processor generates a layered map including two or more layered maps. In some embodiments, the processor of a robot constructs the map of the environment based on local and/or remote sensor data and shares the map of the environment with processors of other robots. In some embodiments, the processors of other robots update the map of the environment constructed by the processor of another robot based on local and/or remote sensor data.

In some embodiments, the processors of robots use the constructed map to autonomously navigate the environment during operation, e.g., accessing the map to determine that a candidate movement path is blocked by an obstacle denoted in the map, to select a movement path with a movement path-finding algorithm from a current point to a target point, to determine optimal division of the environment, or the like. In some embodiments, the processors construct a new map at each use, or update an extant map based on newly acquired data (local or remote). Some embodiments reference previous maps during subsequent mapping operations. For example, embodiments apply Bayesian techniques to simultaneous localization and mapping and update priors in existing maps based on mapping measurements taken in subsequent sessions. Some embodiments reference previous maps and classify objects in a field of view as being moveable objects upon detecting a difference of greater than a threshold size.

Mapping methods that may be used are further described in U.S. patent application Ser. Nos. 16/048,179, 16/048,185, 16/163,541, 16/163,562, 16/163,508, and 16/185,000, the entire contents of which are hereby incorporated by reference, may be used in generating a spatial representation of the surroundings. For example, in some embodiments, the movement pattern of the robotic device during the mapping process is a boustrophedon movement pattern. This can be advantageous for mapping the environment. For example, if the robotic device begins in close proximity to a wall of which it is facing and attempts to map the environment by rotating 360 degrees in its initial position, areas close to the robotic device and those far away may not be observed by the sensors as the areas surrounding the robotic device are too close and those far away are too far. Minimum and maximum detection distances may be, for example, 30 and 400 centimeters, respectively. Instead, in some embodiments, the robotic device moves backwards (i.e., opposite the forward direction as defined below) away from the wall by some distance and the sensors observe areas of the environment that were previously too close to the sensors to be observed. The distance of backwards movement is, in some embodiments, not particularly large, it may be 40, 50, or 60 centimeters for example. In some cases, the distance backward is larger than the minimal detection distance. In some embodiments, the distance backward is more than or equal to the minimal detection distance plus some percentage of a difference between the minimal and maximal detection distances of the robot's sensor, e.g., 5%, 10%, 50%, or 80%.

The robotic device, in some embodiments, (or sensor thereon if the sensor is configured to rotate independently of the robot) then rotates 180 degrees to face towards the open space of the environment. In doing so, the sensors observe areas in front of the robotic device and within the detection range. In some embodiments, the robot does not translate between the backward movement and completion of the 180 degree turn, or in some embodiments, the turn is executed while the robot translates backward. In some embodiments, the robot completes the 180 degree turn without pausing, or in some cases, the robot may rotate partially, e.g., degrees, move less than a threshold distance (like less than 10 cm), and then complete the other 90 degrees of the turn.

References to angles should be read as encompassing angles between plus or minus 20 degrees of the listed angle, unless another tolerance is specified, e.g., some embodiments may hold such tolerances within plus or minus 15 degrees, 10 degrees, 5 degrees, or 1 degree of rotation. References to rotation may refer to rotation about a vertical axis normal to a floor or other surface on which the robot is performing a task, like cleaning, mapping, or cleaning and mapping. In some embodiments, the robot's sensor by which a workspace is mapped, at least in part, and from which the forward direction is defined, may have a field of view that is less than 360 degrees in the horizontal plane normal to the axis about which the robot rotates, e.g., less than 270 degrees, less than 180 degrees, less than 90 degrees, or less than 45 degrees. In some embodiments, mapping may be performed in a session in which more than 10%, more than 50%, or all of a room is mapped, and the session may start from a starting position, is where the presently described routines start, and may correspond to a location of a base station or may be a location to which the robot travels before starting the routine.

The robotic device, in some embodiments, then moves in a forward direction (defined as the direction in which the sensor points, e.g., the centerline of the field of view of the sensor) by some first distance allowing the sensors to observe surroundings areas within the detection range as the robot moves. The processor, in some embodiments, determines the first forward distance of the robotic device by detection of an obstacle by a sensor, such as a wall or furniture, e.g., by making contact with a contact sensor or by bringing the obstacle closer than the maximum detection distance of the robot's sensor for mapping. In some embodiments, the first forward distance is predetermined or in some embodiments the first forward distance is dynamically determined, e.g., based on data from the sensor indicating an object is within the detection distance.

The robotic device, in some embodiments, then rotates another 180 degrees and moves by some second distance in a forward direction (from the perspective of the robot), returning back towards its initial area, and in some cases, retracing its path. In some embodiments, the processor may determine the second forward travel distance by detection of an obstacle by a sensor, such moving until a wall or furniture is within range of the sensor. In some embodiments, the second forward travel distance is predetermined or dynamically determined in the manner described above. In doing so, the sensors observe any remaining undiscovered areas from the first forward distance travelled across the environment as the robotic device returns back in the opposite direction. In some embodiments, this back and forth movement described is repeated (e.g., with some amount of orthogonal offset translation between iterations, like an amount corresponding to a width of coverage of a cleaning tool of the robot, for instance less than 100% of that width, 95% of that width, 90% of that width, 50% of that width, etc.) wherein the robotic device makes two 180 degree turns separated by some distance, such that movement of the robotic device is a boustrophedon pattern, travelling back and forth across the environment. In some embodiments, the robotic device may not be initially facing a wall of which it is in close proximity with. The robotic device may begin executing the boustrophedon movement pattern from any area within the environment. In some embodiments, the robotic device performs other movement patterns besides boustrophedon alone or in combination.

In other embodiments, the boustrophedon movement pattern (or other coverage path pattern) of the robotic device during the mapping process differs. For example, in some embodiments, the robotic device is at one end of the environment, facing towards the open space. From here, the robotic device moves in a first forward direction (from the perspective of the robot as defined above) by some distance then rotates 90 degrees in a clockwise direction. The processor determines the first forward distance by which the robotic device travels forward by detection of an obstacle by a sensor, such as a wall or furniture. In some embodiments, the first forward distance is predetermined (e.g., and measured by another sensor, like an odometer or by integrating signals from an inertial measurement unit). The robotic device then moves by some distance in a second forward direction (from the perspective of the room, and which may be the same forward direction from the perspective of the robot, e.g., the direction in which its sensor points after rotating); and rotates another 90 degrees in a clockwise direction. The distance travelled after the first 90-degree rotation may not be particularly large and may be dependent on the amount of desired overlap when cleaning the surface. For example, if the distance is small (e.g., less than the width of the main brush of a robotic vacuum), as the robotic device returns back towards the area it began from, the surface being cleaned overlaps with the surface that was already cleaned. In some cases, this may be desirable. If the distance is too large (e.g., greater than the width of the main brush) some areas of the surface may not be cleaned. For example, for small robotic devices, like a robotic vacuum, the brush size typically ranges from 15-30 cm. If 50% overlap in coverage is desired using a brush with 15 cm width, the travel distance is 7.5 cm. If no overlap in coverage and no coverage of areas is missed, the travel distance is 15 cm and anything greater than 15 cm would result in coverage of area being missed. For larger commercial robotic devices brush size can be between 50-60 cm. The robotic device then moves by some third distance in forward direction back towards the area of its initial starting position, the processor determining the third forward distance by detection of an obstacle by a sensor, such as wall or furniture. In some embodiments, the third forward distance is predetermined. In some embodiments, this back and forth movement described is repeated wherein the robotic device repeatedly makes two 90-degree turns separated by some distance before travelling in the opposite direction, such that movement of the robotic device is a boustrophedon pattern, travelling back and forth across the environment. In other embodiments, the directions of rotations are opposite to what is described in this exemplary embodiment. In some embodiments, the robotic device may not be initially facing a wall of which it is in close proximity. The robotic device may begin executing the boustrophedon movement pattern from any area within the environment. In some embodiments, the robotic device performs other movement patterns besides boustrophedon alone or in combination.

In some embodiments, the memory of the robot may include an internal database of objects likely to be encountered within the environment. In some embodiments, an object encountered in the environment may be identified using various sensors to capture features of the object and the processor may determine the type of object based on the internal database. The processor may note the increased likelihood of that type of object being located in the region of the environment in which it was encountered. In some embodiments, the processor may determine and update a probability of encountering a type of object in different locations of the environment based on historical data including the locations of previous encounters with the object. In some embodiments, the processor may mark locations with high or low likelihood of encountering an object within the map. In one example, images sensors of the robot continuously capture images, the processor analyzes images, extracts features, compares the extracted features to those stored in an internal database of features associated with different object types (e.g., cord, remote, chair or table leg, cat, dog, blanket, pillow, couch, table, chair, toy, wall, etc.), and based on the comparison determines an object type of the object. The processor may mark the region in which the object was encountered within an internal map as a region with increased likelihood of encountering the particular object type. In some embodiments, the processor actuates the robot to execute an action based on the object type of the object. In some embodiments, the processor alters a movement path of the robot and actuates the robot to execute the altered movement path. In some embodiments, the action includes the robot driving around or over the object and continuing on a same movement path. In some embodiments, the action includes the robot executing an object type-specific movement path. In some embodiments, the action includes the robot picking up the object and transporting to a specified location. In other cases, other types of actions may be executed based on the object type of the object. In some embodiments, the processor notifies a user of the object type encountered and the location in which it was encountered using a noise or lights, displaying a message on an interface of the robot, or by transmitting a notification to an application of a communication device paired with the processor of the robot. In some embodiments, the processor of a robot notifies processors of other robots of the object type encountered and the location in which it was encountered. In some embodiments, the processor may further determine if the robot is capable of driving over an object encountered. If so, the robot may attempt to drive over the object. If, however, the robot encounters a large object, such as a chair or table, the processor may determine that the robot cannot overcome the object and may attempt to maneuver around the object and continue along a same movement path. In some embodiments, regions wherein objects are consistently encountered may be classified by the processor as a high object density area and may be marked within the map of the environment. In some embodiments, the processor may determine or alter a movement path of the robot such that it avoids high object density areas. In some embodiments, the processor may alert a user when an unanticipated object blocking the movement path of the robot is encountered, particularly when the robot may not overcome the object by maneuvering around or driving over the obstacle. The robot may alert the user by generating a noise, sending a message to an application of a communication device or any other device paired with the processor of the robot, displaying a message on a screen of the robot, illuminating lights, and the like.

To avoid false detection of an object, in some embodiments, each location within the map is assigned an object probability indicating the probability of an object existing in each respective location. The object probability assigned to a particular location increases each time an object is observed in the particular location, and the processor qualifies an object as existing in a particular location only when the object probability is greater than a predetermined threshold. For example, all locations in a map are initially set to an object probability of 0.25 (i.e., 25% chance that an object exists in each location). When an object is observed in a particular location, the object probability increases to 0.325, and if observed a second time in the same particular location the object probability increases to 0.3925, and so on. When the object probability assigned to a particular location is greater than 0.325, the processor qualifies an object as existing in the particular location.

In some embodiments, cliffs are marked as objects in the map. In some embodiments, the cliffs marked as objects in the map prevent the robot from visiting the cliff area more than one time. Without the cliffs marked as objects in the map, the robot may attempt to visit the cliff area multiple times. Although the cliffs are detected by the edge detection sensors and prevent the robot from moving past the cliff, the processor may not learn that the cliff area is off limits and may try to visit the cliff area multiple times. By adding cliffs to the map as objects, the robot may avoid returning to cliff area again during the same work session and in future work sessions if the map is saved.

In some embodiments, the processor of a robot localizes itself during mapping or during operation. In some embodiments, the processor of a robot localizes one or more other robots operating within the same environment based on remote sensor data collected by the one or more respective other robots. In some embodiments, the processor of a robot localizes one or more other robots operating within the same environment based on observing the one or more other robots within a field of view of one or more local sensors. In some embodiments, processors of robots share their localizations. In some embodiments, methods of localization are inherently independent from mapping and path planning but may be used in tandem with any mapping or path planning methods or may be used independently to localize a robot irrespective of the path or map of the environment.

In some embodiments, the processor of a robot localizes the robot within an environment represented by a phase space or Hilbert space. In some embodiments, the space includes all possible states of the robot within the space. In some embodiments, a probability distribution may be used by the processor of the robot to approximate the likelihood of the state of the robot being within a specific region of the space. In some embodiments, the processor of the robot determines a phase space probability distribution over all possible states of the robot within the phase space using a statistical ensemble including a large collection of virtual, independent copies of the robot in various states of the phase space. In some embodiments, the phase space consists of all possible values of position and momentum variables. In some embodiments, the processor represents the statistical ensemble by a phase space probability density function $\rho(p, q, t)$, q and p denoting position and velocity vectors. In some embodiments, the processor uses the phase space probability density function $\rho(p, q, t)$ to determine the probability $\rho(p, q, t)dq\,dp$ that the robot at time t will be found in the infinitesimal phase space volume dq dp. In some embodiments, the phase space probability density function $\rho(p, q, t)$ has the properties $\rho(p, q, t) \geq 0$ and $\int \rho(p,q, t)d(p, q)=1$, $\forall t \geq 0$, and the probability of the position q lying within a position interval a, b is $P[a \leq q \leq b] = \int_a^b \int \rho(p, q, t)dpdq$. Similarly, the probability of the velocity p lying within a velocity interval c, d is $P[c \leq q \leq d] = \int_c^d \int \rho(p, q, t)dqdp$. In some embodiments, the processor determines values by integration over the phase space. For example, the processor determines the expectation value of the position q by $\langle q \rangle = \int q\, \rho(p, q, t)d(p, q)$.

In some embodiments, the processor evolves each state within the ensemble over time t according to an equation of motion. In some embodiments, the processor models the motion of the robot using a Hamiltonian dynamical system with generalized coordinates q, p wherein dynamical properties are modeled by a Hamiltonian function H. In some embodiments, the function represents the total energy of the system. In some embodiments, the processor represents the time evolution of a single point in the phase space using Hamilton's equations $$\frac{dp}{dt} = -\frac{\partial H}{\partial q}, \frac{dq}{dt} = \frac{\partial H}{\partial p}.$$

In some embodiments, the processor evolves the entire statistical ensemble of the phase space density function ρ(p, q, t) under a Hamiltonian H using the Liouville equation $$\frac{\partial \rho}{\partial t} = -\{\rho, H\},$$

wherein {•,•} denotes the Poisson bracket and H is the Hamiltonian of the system. For two functions $f$, g on the phase space, the Poisson bracket is given by $$\{f, g\} = \sum_{i=1}^{N} \left( \frac{\partial f}{\partial q_i} \frac{\partial g}{\partial p_i} - \frac{\partial f}{\partial p_i} \frac{\partial g}{\partial q_i} \right).$$

In this approach, the processor evolves each possible state in the phase space over time instead of keeping the phase space density constant over time, which is particularly advantageous if sensor readings are sparse in time.

In some embodiments, the processor evolves the phase space probability density function ρ(p, q, t) over time using the Fokker-Plank equation which describes the time evolution of a probability density function of a particle under drag and random forces. In comparison to the behavior of the robot modeled by both the Hamiltonian and Liouville equations, which are purely deterministic, the Fokker-Planck equation includes stochastic behaviour. Given a stochastic process with $dX_t = \mu(X_t, t)dt + \sigma(X_t, t)dW_t$, wherein $X_t$ and $\mu(X_t, t)$ are M-dimensional vectors, $\sigma(X_t, t)$ is a M×P matrix, and $W_t$ is a P-dimensional standard Wiener process, the probability density ρ(x, t) for $X_t$ satisfies the Fokker-Planck equation $$\frac{\partial \rho(x, t)}{\partial t} =$$

$$-\sum_{i=1}^{M} \frac{\partial}{\partial x_i} [\mu_i(x, t)\rho(x, t)] + \sum_{i=1}^{M} \sum_{j=1}^{M} \frac{\partial^2}{\partial x_i \partial x_j} [D_{ij}(x, t)\rho(x, t)]$$

with drift vector μ=(μ$_1$, . . . , μM) and diffusion tensor D=1/2σσ$^T$. In some embodiments, the processor adds stochastic forces to the motion of the robot governed by the Hamiltonian H and determines the motion of the robot by the stochastic differential equation $$dX_t = \begin{pmatrix} dq \\ dp \end{pmatrix} = \begin{pmatrix} +\frac{\partial H}{\partial p} \\ -\frac{\partial H}{\partial q} \end{pmatrix} dt = \begin{pmatrix} 0_N \\ \sigma_N(p, q, t) \end{pmatrix} dW_t,$$

wherein σN is a N×N matrix and $dW_t$ is a N-dimensional Wiener process. This leads to the Fokker-Plank equation $$\frac{\partial \rho}{\partial t} = -\{\rho, H\} + \nabla_p \cdot (D\nabla_p \rho),$$

wherein $\nabla_p$ denotes the gradient with respect to position p, ∇·denotes divergence, and $$D = \frac{1}{2}\sigma_N \sigma_N^T$$

is the diffusion tensor.

In other embodiments, the processor incorporates stochastic behaviour by modeling the dynamics of the robot using Langevin dynamics, which models friction forces and perturbation to the system, instead of Hamiltonian dynamics. The Langevian equations are given by $$M\ddot{q} = -\nabla_q U(q) - \gamma p + \sqrt{2\gamma k_B T M} R(t),$$

wherein (−γp) are friction forces, R(t) are random forces with zero-mean and delta-correlated stationary Gaussian process, T is the temperature, $k_B$ is Boltzmann's constant, γ is a damping constant, and M is a diagonal mass matrix. In some embodiments, the Langevin equation is reformulated as a Fokker-Planck equation $$\frac{\partial \rho}{\partial t} = -\{\rho, H\} + \nabla_p \cdot (\gamma p \rho) + k_B T \nabla_p \cdot (\gamma M \nabla_p \rho)$$

that the processor uses to evolve the phase space probability density function over time. In some embodiments, the second order term $\nabla_p \cdot (\gamma M \nabla_p \rho)$ is a model of classical Brownian motion, modeling a diffusion process. In some embodiments, partial differential equations for evolving the probability density function over time may be solved by the processor of the robot using, for example, finite difference and/or finite element methods. In an example evolving the phase space probability density function over time, the Liouville equation incorporating Hamiltonian dynamics conserved momentum over time and initial density was only distorted in the q-axis (position). In comparison, equations accounting for stochastic forces also had diffusion along the p-axis (velocity). With the Fokker-Planck equation incorporating Hamiltonian dynamics, the density spread more equally as compared to the Fokker-Planck equation incorporating Langevin dynamics wherein the density remained more confined due to the additional friction forces.

In some embodiments, the processor of the robot may update the phase space probability distribution when the processor receives readings (or measurements or observations). Any type of reading that may be represented as a probability distribution that describes the likelihood of the state of the robot being in a particular region of the phase space may be used. Readings may include measurements or observations acquired by sensors of the robot or external devices such as a Wi-Fi camera. Each reading may provide partial information on the likely region of the state of the robot within the phase space and/or may exclude the state of the robot from being within some region of the phase space. For example, a depth sensor of the robot may detect an object in close proximity to the robot. Based on this measurement and using a map of the phase space, the processor of the robot may reduce the likelihood of the state of the robot being any state of the phase space at a great distance from an object. In another example, a reading of a floor sensor of the robot and a floor map may be used by the processor of the robot to adjust the likelihood of the state of the robot being within the particular region of the phase space coinciding with the type of floor sensed. In an additional example, a measured Wi-Fi signal strength and a map of the expected Wi-Fi signal strength within the phase space may be used by the processor of the robot to adjust the phase space probability distribution. As a further example, a Wi-Fi camera or a camera of other robots may observe the absence of the robot within a particular room. Based on this observation the processor of the robot may reduce the likelihood of the state of the robot being any state of the phase space that places the robot within the particular room. In some embodiments, the processor generates a simulated representation of the environment for each hypothetical state of the robot. In some embodiments, the processor compares the measurement against each simulated representation of the environment (e.g., a floor map, a spatial map, a Wi-Fi map, etc.) corresponding with a perspective of each of the hypothetical states of the robot. In some embodiments, the processor chooses the state of the robot that makes the most sense as the most feasible state of the robot. In some embodiments, the processor selects additional hypothetical states of the robot as a backup to the most feasible state of the robot.

In some embodiments, the processor of the robot may update the current phase space probability distribution $\rho(p, q, t_i)$ by re-weighting the phase space probability distribution with an observation probability distribution $m(p, q, t_i)$ according to $$\bar{\rho}(p, q, t_i) = \frac{\rho(p, q, t_i) \cdot m(p, q, t_i)}{\int \rho(p, q, t_i) m(p, q, t_i) d(p, q)}.$$

In some embodiments, the observation probability distribution may be determined by the processor of the robot for a reading at time ti using an inverse sensor model. In some embodiments, wherein the observation probability distribution does not incorporate the confidence or uncertainty of the reading taken, the processor of the robot may incorporate the uncertainty into the observation probability distribution by determining an updated observation probability distribution $$\hat{m} = \frac{1-\alpha}{c} + \alpha m$$

am that may be used in re-weighting the current phase space probability distribution, wherein a is the confidence in the reading with a value of $0 \leq \alpha \leq 1$ and $c = \iint dpdq$. At any given time, the processor of the robot may estimate a region of the phase space within which the state of the robot is likely to be given the phase space probability distribution at the particular time.

To further explain the localization methods described, examples are provided. In a first example, the processor uses a two-dimensional phase space of the robot, including position q and velocity p. The processor confines the position of the robot q to an interval [0, 10] and the velocity p to an interval [−5, +5], limited by the top speed of the robot, therefore the phase space (p, q) is the rectangle D=[−5,5]×[0, 10]. The processor uses a Hamiltonian function $$H = \frac{p^2}{2m},$$

with mass m and resulting equations of motion $\bar{p}=0$ and $\bar{q}=P$ to delineate the motion of the robot. The processor adds Langevin-style stochastic forces to obtain motion equations $$\dot{p} = -\gamma p + \sqrt{2\gamma m k_B T} R(t)$$

and $$\dot{q} = \frac{p}{m},$$

wherein R(t) denotes random forces and m=1. The processor of the robot initially generates a uniform phase space probability distribution over the phase space D. In this example, the processor of the robot evolves the phase space probability distribution over time according to Langevin equation $$\frac{\partial \rho}{\partial t} = -\{\rho, H\} + \left(\gamma \frac{\partial}{\partial p}\right) \cdot (p\rho) + \gamma k_B T \frac{\partial^2 \rho}{\partial p^2},$$

wherein $$\{\rho, H\} = p \frac{\partial \rho}{\partial q}$$

and m=1. Thus, the processor solves $$\frac{\partial \rho}{\partial t} = -p \frac{\partial \rho}{\partial q} + \gamma \left(\rho + p \frac{\partial \rho}{\partial p}\right) + \gamma k_B T \frac{\partial^2 \rho}{\partial p^2} \text{ for } t > 0$$

with initial condition $\rho(p, q, 0) = \rho_0$ and homogenous Neumann perimeter conditions. The perimeter conditions govern what happens when the robot reaches an extreme state. In the position state, this may correspond to the robot reaching a wall, and in the velocity state, it may correspond to the motor limit. The processor of the robot updates the phase space probability distribution each time a new reading is received by the processor based on an observation probability distribution. For example, odometry data may have a narrow Gaussian observation probability distribution for velocity p, reflecting an accurate odometry sensor, and uniform probability distribution for position q as odometry data does not indicate position. Or, a depth sensor may have a bimodal observation probability distribution for position q including uncertainty for an environment with a wall at q=0 and q=10. Therefore, for a distance measurement of four, the robot is either at q=4 or q=6, resulting in the bi-modal distribution. Velocity p is uniform as distance data does not indicate velocity. In some embodiments, the processor may update the phase space at periodic intervals or at predetermined intervals or points in time. In some embodiments, the processor of the robot may determine an observation probability distribution of a reading using an inverse sensor model and the phase space probability distribution may be updated by the processor by re-weighting it with the observation probability distribution of the reading.

The example described may be extended to a four-dimensional phase space with position q=(x, y) and velocity $p=(p_x, p_y)$. The processor solves this four dimensional example using the Fokker-Planck equation $$\frac{\partial \rho}{\partial t} = -\{\rho, H\} + \nabla_p \cdot (\gamma p \rho) + k_B T \nabla_p \cdot (\gamma M \nabla_p \rho)$$

with $M=I_2$ (2D identity matrix), $T=0.1$, $\gamma=0.1$, and $k_B=1$. In alternative embodiments, the processor uses the Fokker-Planck equation without Hamiltonian and velocity and applies velocity drift field directly through odometry which reduces the dimension by a factor of two. The map of the environment describes the domain for $q_1, q_2 \in D$. In this example, the velocity is limited to $p_1, p_2 \in [-1, 1]$. The processor models the initial probability density $\rho(p, q, 0)$ as Gaussian, wherein $\rho$ is a four-dimensional function. The evolution of $\rho$ is reduced to the $q_1, q_2$ space (i.e., the density integrated over $p_1, p_2$, $\rho_{red} = \iint \rho(p_1, p_2, q_1, q_2) dp_1 dp_2$). With increased time, the initial density reduced to the $q_1, q_2$ space focused in the middle of the map starts to flow into other rooms. The evolution of $\rho$ reduced to the $p_1, q_1$ space and to the $p_2, q_2$ space show velocity evolving over time with position. The four-dimensional example may be extended to include the addition of floor sensor data observations, wherein the map of the environment indicates different floor types with respect to $q_1, q_2$. Given that the sensor has no error, the processor may strongly predict the area within which the robot is located based on the measured floor type, at which point all other hypothesized locations of the robot become invalid. For example, the processor may use the distribution $$m(p_1, p_2, q_1, q_2) = \begin{cases} const > 0, & q_1, q_2 \text{ with the observed floor type} \\ 0, & \text{else} \end{cases}$$

If the sensor has an average error rate $\epsilon$, the processor may use the distribution $m(p_1, p_2, q_1, q_2) =$ $$m(p_1, p_2, q_1, q_2) = \begin{cases} c_1 > 0, & q_1, q_2 \text{ with the observed floor type} \\ c_2 > 0, & \text{else} \end{cases}$$

with $c_1, c_2$ chosen such that $\int_p \int_{D_{obs}} m d(q_1, q_2) d(p_1, p_2) = 1 - \epsilon$ and $\int_p \int_{D_{obs}^c} m d(q_1, q_2) d(p_1, p_2) = \epsilon$. $D_{obs}$ is the $q_1, q_2$ with the observed floor type and $D_{obs}^c$ is its complement. By construction, the distribution m has a probability $1-\epsilon$ for $q_1, q_2 \in D_{obs}$ and probability $\epsilon$ for $q_1, q_2 \in D_{obs}^c$. Given that the floor sensor measures a particular floor type, the processor updates the probability distribution for position. Next, Wi-Fi signal strength observations may also be considered. Given a map of the expected signal strength, the processor may generate a density describing the possible location of the robot based on a measured Wi-Fi signal strength. For wall distance measurements, a wall distance map may be used by the processor to approximate the area of the robot given a distance measured. For example, the processor evolves the Fokker-Planck equation over time and as observations are successively taken, the processor re-weights the density function with each observation wherein parts that do not match the observation are considered less likely and parts that highly match the observations relatively increase in probability. An example of observations over time may be, t=1: observe $p_2=0.75$; t=2: observe $p_2=0.95$ and Wi-Fi signal strength 0.56; t=3: observe wall distance 9.2; t=4: observe floor type 2; t=5: observe floor type 2 and Wi-Fi signal strength 0.28; t=6: observe wall distance 3.5; t=7: observe floor type 4, wall distance 2.5, and Wi-Fi signal strength 0.15; t=8: observe floor type 4, wall distance 4, and Wi-Fi signal strength 0.19; t=8.2: observe floor type 4, wall distance 4, and Wi-Fi signal strength 0.19.

In another example, the robot navigates along a long floor (e.g., x-axis, one-dimensional). The processor models the floor using Liouville's equation $$\frac{\partial \rho}{\partial t} = -\{\rho, H\}$$

with Hamiltonian $$H = \frac{1}{2}p^2$$

wherein $q \in [-10, 10]$ and $p \in [-5, 5]$. The floor has three doors at $q_0=-2.5$, $q_1=0$, and $q_2=5.0$m the processor of the robot is capable of determining when it is located at a door based on sensor data observed, and the momentum of the robot is constant, but unknown. Initially the location of the robot is unknown, therefore the processor generates an initial uniform state density. When the processor determines the robot is in front of a door, the possible location of the robot is narrowed down, but not the momentum and the processor may update the probability density to reflect that. The processor evolves the probability density, and after five seconds the uncertainty in the position space has spread out again given that the momentum is unknown. However, the evolved probability density keeps track of the correlation between position and momentum. When the processor determines the robot is in front of a door again, the probability density is updated to reflect that, wherein the density has significantly narrowed down, indicating a number of peaks representing possible location and momentum combinations of the robot. For the left door, there is equal likelihood for p=0, p=-0.5, and p=-1.5. These momentum values correspond with the robot travelling from one of the three doors in five seconds. This is also the case for the other two doors as well.

In some embodiments, the processor models motion of the robot using equations $\bar{x}=v \cos\omega$, $\bar{y}=v \sin\omega$, and $\bar{\theta}=\omega$, wherein $v$ and $\omega$ are translational and rotational velocities, respectively. In some embodiments, translational and rotational velocities of the robot are computed using observed wheel angular velocities $\omega_l$ or $\omega_r$ and or using $$\begin{pmatrix} v \\ \omega \end{pmatrix} = J \begin{pmatrix} \omega_l \\ \omega_r \end{pmatrix} = \begin{pmatrix} r_l/2 & r_r/2 \\ -r_l/b & r_r/b \end{pmatrix},$$

wherein J is the Jacobian, $r_l$ and $r_r$ are the left and right wheel radii, respectively and b is the distance between the two wheels. Assuming there are stochastic forces on the wheel velocities, the processor of the robot evolves the probability density $\rho=(x, y, \theta, \omega_l, \omega_r)$ using $$\frac{\partial \rho}{\partial t} = -\begin{pmatrix} v \cos\theta \\ v \cos\theta \\ \omega \end{pmatrix} \cdot \nabla_q \rho + \nabla_p \cdot (D \nabla_p \rho)$$

wherein $$D = \frac{1}{2} \sigma_N \sigma_N^T$$

is a 2-by-2 diffusion tensor, q=(x, y, θ) and p=($\omega_l$, $\omega_r$). In some embodiments, the domain is obtained by choosing x, y in the map of the environment, θ ∈ [0,2π), and $\omega_l$, $\omega_r$ as per the robot specifications. In some embodiments, solving the equation may be a challenge given it is five-dimensional. In some embodiments, the model may be reduced by replacing odometry by Gaussian density with mean and variance. This reduces the model to a three-dimensional density ρ=(x, y, θ). In some embodiments, independent equations may be formed for $\omega_l$, $\omega_r$ by using odometry and inertial measurement unit observations. For example, taking this approach reduces the system to one three-dimensional partial differential equation and two ordinary differential equations. The processor then evolves the probability density over time using $$\frac{\partial \rho}{\partial t} = -\begin{pmatrix} \bar{v}\cos\theta \\ \bar{v}\cos\theta \\ \bar{\omega} \end{pmatrix} \cdot \nabla \rho + \nabla \cdot (D\nabla \rho),$$

$$t>0 \text{ wherein } D = \begin{pmatrix} dv^2\cos^2\theta & dv^2\sin\theta\cos\theta & 0 \\ dv^2\sin\theta\cos\theta & dv^2\sin^2\theta & 0 \\ 0 & 0 & d\omega^2 \end{pmatrix},$$

$\bar{v}$, $\bar{\omega}$ represent the current mean velocities, and dv, dω the current deviation. In some embodiments, the processor determines $\bar{v}$, $\bar{\omega}$ from the mean and deviation of the left and right wheel velocities $\omega_L$ and $\omega_R$ using $$\begin{pmatrix} \bar{v} \\ \bar{\omega} \end{pmatrix} = J\begin{pmatrix} \omega_L \\ \omega_R \end{pmatrix}.$$

In some embodiments, the processor uses Neumann perimeter conditions for x, y and periodic perimeter conditions for 0.

In one example, the processor localizes the robot with position coordinate q=(x, y) and momentum coordinate p=($p_x$, $p_y$). For simplification, the mass of the robot is 1.0, the earth is assumed to be planar, and q is a position with reference to some arbitrary point and distance. Thus, the processor evolves the probability density ρ over time according to $$\frac{\partial \rho}{\partial t} = -p \cdot \nabla_q \rho + \nabla_p \cdot (D\nabla_p \rho),$$

(D$\nabla_p$φ, wherein D is as defined above. The processor uses a moving grid, wherein the general location of the robot is only known up to a certain accuracy (e.g., 100 m) and the grid is only applied to the known area. The processor moves the grid along as the probability density evolves over time, centering the grid at the approximate center in the q space of the current probability density every couple time units. Given that momentum is constant over time, the processor uses an interval [−15, 15]×[−15, 15], corresponding to maximum speed of 15 m/s in each spatial direction. The processor uses velocity and GPS position observations to increase accuracy of approximated localization of the robot. Velocity measurements provide no information on position, but provide information on $p_x^2+p_y^2$, the circular probability distribution in the p space, with |p|=10 and large uncertainty. GPS position measurements provide no direct momentum information but provides a position density. The processor further uses a map to exclude impossible states of the robot. For instance, it is impossible to drive through walls and if the velocity is high there is a higher likelihood that the robot is in specific areas. A map indicating low object density areas and high object density areas may be used by the processor, wherein the maximum speed in high object density areas is ±5 m/s. In combining the map information with the velocity observations, the processor determines that it is highly unlikely that with an odometry measurement of |p|=10 that the robot is in a position with high object density. In some embodiments, other types of information may be used to improve accuracy of localization. For example, a map to correlate position and velocity, distance to and probability density of other robots using similar technology, Wi-Fi map to extract position, and video footage to extract position. For example, the processor of the robot may receive phase space probability distributions of other robots and exclude or reduce the likelihood of the robot being located at positions that other robots have high likelihood of being positioned at.

In some embodiments, the processor uses finite differences methods (FDM) to numerically approximate partial differential equations of the form $$\frac{\partial \rho}{\partial t} = -\{\rho, H\} + \nabla_p \cdot (D\nabla_p \rho).$$

Numerical approximation has two components, discretization in space and in time. The finite difference method relies on discretizing a function on a uniform grid. Derivatives are then approximated by difference equations. For example, a convection-diffusion equation in one dimension and u(x, t) with velocity v, diffusion coefficient α, $$\frac{\partial u}{\partial t} = a\frac{\partial^2 u}{\partial x^2} - v\frac{\partial u}{\partial x}$$

on a mesh $x_0, \ldots, x_j$, and times $t_0, \ldots, t_N$ may be approximated by a recurrence equation of the form $$\frac{u_j^{n+1} - u_j^n}{k} = a\frac{u_{j+1}^n - 2u_j^n + u_{j-1}^n}{h^2} - v\frac{u_{j+1}^n - u_{j-1}^n}{2h}$$

with space grid size h and time step k and $u_j^n \approx u(x_j, t_n)$. The left hand side of the recurrence equation is a forward difference at time $t_n$, and the right hand side is a second-order central difference and a first-order central difference for the space derivatives at $x_j$, wherein $$\frac{u_j^{n+1} - u_j^n}{k} \approx \frac{\partial u(x_j, t_n)}{\partial t}, \frac{u_{j+1}^n - 2u_j^n + u_{j-1}^n}{h^2} \approx \frac{\partial^2 u(x_j, t_n)}{\partial x^2},$$

$$\text{and } \frac{u_{j+1}^n - u_{j-1}^n}{2h} \approx \frac{\partial u(x_j, t_n)}{\partial x}.$$

This is an explicit method, since the processor may obtain the new approximation $u_j^{n+1}$ without solving any equations. This method is known to be stable for $$h < \frac{2a}{v} \text{ and } k < \frac{h^2}{2a}.$$

The stability conditions place limitations on the time step size k which may be a limitation of the explicit method scheme. If instead the processor uses a central difference at time $$t_{n+\frac{1}{2}},$$

the recurrence equation is $$\frac{u_j^{n+1}-u_j^n}{k} = \frac{1}{2}\left(a\frac{u_{j+1}^{n+1}-2u_j^{n+1}+u_{j-1}^{n+1}}{h^2} - v\frac{u_{j+1}^{n+1}-u_{j-1}^{n+1}}{2h} + a\frac{u_{j+1}^n-2u_j^n+u_{j-1}^n}{h^2} - v\frac{u_{j+1}^n-u_{j-1}^n}{2h}\right),$$

know as the Crank-Nicolson method. The processor obtains the new approximation $u_j^{n+1}$ by solving a system of linear equations, thus, the method is implicit and is numerically stable if $$k < \frac{h^2}{a}.$$

In a similar manner, the processor may use a backward difference in time, obtaining a different implicit method $$\frac{u_j^{n+1}-u_j^n}{k} = a\frac{u_{j+1}^{n+1}-2u_j^{n+1}+u_{j-1}^{n+1}}{h^2} - v\frac{u_{j+1}^{n+1}-u_{j-1}^{n+1}}{2h},$$

which is unconditionally stable for a time step, however, the truncation error may be large. While both implicit methods are less restrictive in terms of time step size, they usually require more computational power as they require solving a system of linear equations at each time step. Further, since the difference equations are based on a uniform grid, the finite difference method places limitations on the shape of the domain.

In some embodiments, the processor uses finite element methods (FEM) to numerically approximate partial differential equations of the form $$\frac{\partial \rho}{\partial t} = -\{\rho, H\} + \nabla_p \cdot (D\nabla_p \rho).$$

In general, the finite element method formulation of the problem results in a system of algebraic equations. This yields approximate values of the unknowns at discrete number of points over the domain. To solve the problem, it subdivides a large problem into smaller, simpler parts that are called finite elements. The simple equations that model these finite elements are then assembled into a larger system of equations that models the entire problem. The method involves constructing a mesh or triangulation of the domain, finding a weak formulation of the partial differential equation (i.e., integration by parts and Green's identity), and deciding for solution space (e.g., piecewise linear on mesh elements). This leads to a discretized version in form of a linear equation. Some advantages over finite differences method includes complicated geometries, more choice in approximation leads, and, in general, to a higher quality of approximation. For example, the processor uses the partial differential equation.

$$\frac{\partial \rho}{\partial t} = L\rho,$$

with differential operator, e.g., $L=-\{\cdot, H\}+\nabla_p\cdot(D\nabla_p)$. The processor discretizes the abstract equation in space (e.g., by FEM or FDM)

$$\frac{\partial \bar{\rho}}{\partial t} = \bar{L}\bar{\rho},$$

wherein $\bar{\rho}$, $\bar{L}$ are the projections of $\rho$, L on the discretized space. The processor discretizes the equation in time using a numerical time integrator (e.g., Crank-Nicolson)

$$\frac{\bar{\rho}^{n+1}-\bar{\rho}^n}{h} = \frac{1}{2}(\bar{L}\bar{\rho}^{n+1}+\bar{L}\bar{\rho}^n),$$

leading to the equation $$\left(I-\frac{h}{2}\bar{L}\right)\bar{\rho}^{n+1} = \left(I+\frac{h}{2}\bar{L}\right)\bar{\rho}^n,$$

which the processor solves. In a fully discretized system, this is a linear equation. Depending on the space and discretization, this will be a banded, sparse matrix. In some embodiments, the processor employs alternating direction implicit (ADI) splitting to case the solving process. In FEM, the processor may discretize the space using a mesh, construct a weak formulation involving a test space, and solve its variational form. In FDM, the processor discretizes the derivatives using differences on a lattice grid of the domain. In some instances, the processor may implement FEM/FDM with backward differential formulation (BDF)/Radau (Marlis recommendation), for example mesh generation then construct and solve variational problem with backwards Euler. In other instances, the processor implements FDM with ADI, resulting in a banded, tri-diagonal, symmetric, linear system. The processor may use an upwind scheme if Peclet number (i.e., ratio of advection to diffusion) is larger than 2 or smaller than −2.

Perimeter conditions are essential in solving the partial differential equations. Perimeter conditions are a set of constraints that determine what happens at the perimeters of the domain while the partial differential equation describes the behaviour within the domain. In some embodiments, the processor uses one or more the following perimeter conditions: reflecting, zero-flux (i.e., homogenous Neumann perimeter conditions)

$$\frac{\partial \rho}{\partial \vec{n}} = 0$$

for p, q ∈ ∂D, $\vec{n}$ unit normal vector on perimeters; absorbing perimeter conditions (i.e., homogenous Dirichlet perimeter conditions) ρ=0 for p, q ∈ ∂D; and constant concentration perimeter conditions (i.e., Dirichlet) ρ=β₀ for p, q ∈ ∂D. To integrate the perimeter conditions into FDM, the processor modifies the difference equations on the perimeters, and when using FEM, they become part of the weak form (i.e., integration by parts) or are integrated in the solution space. In some embodiments, the processor uses Fenics for an efficient solution to partial differential equations.

In some embodiments, the processor uses quantum methods to localize the robot. In some embodiments, the processor of the robot may determine a probability density over all possible states of the robot using a complex-valued wave function for a single-particle system $\Psi(\vec{r}, t)$, wherein $\vec{r}$ may be a vector of space coordinates. In some embodiments, the wave function $\Psi(\vec{r}, t)$ is proportional to the probability density that the particle will be found at a position ř, i.e. $\rho(\vec{r}, t)=|\Psi'(\vec{r}, t)|^2$. In some embodiments, the processor of the robot normalizes the wave function which is equal to the total probability of finding the particle, or in this case the robot, somewhere. The total probability of finding the robot somewhere adds up to unity $\int |(\vec{r}, t)|^2 d\vec{r}=1$. In some embodiments, the processor of the robot may apply Fourier transform to the wave function $\Psi(\vec{r}, t)$ to yield the wave function $\Phi(\vec{p}, t)$ in the momentum space, with associated momentum probability distribution $\sigma(\vec{p},t)=\Phi|(\vec{p},t)|^2$. In some embodiments, the processor may evolve the wave function $\Psi(\vec{r}, t)$ using Schrödinger equation $$i\hbar \frac{\partial}{\partial t} \Psi(\vec{r}, t) = \left[-\frac{\hbar^2}{2m}\nabla^2 + V(\vec{r})\right]\Psi(\vec{r}, t),$$

wherein the bracketed object is the Hamilton operator $$\hat{H} = -\frac{\hbar^2}{2m}\nabla^2 + V(\vec{r}),$$

i is the imaginary unit, h is the reduced Planck constant, $\nabla^2$ is the Laplacian, and $V(\vec{r})$ is the potential. An operator is a generalization of the concept of a function and transforms one function into another function. For example, the momentum operator $\hat{p}=-i\hbar\nabla$, explaining why $$-\frac{\hbar^2}{2m}\nabla^2$$

corresponds to kinetic energy. The Hamiltonian function $H=p^2/2m+V(\vec{r})$ has corresponding Hamilton operator $$\hat{H} = -\frac{\hbar^2}{2m}\nabla^2 + V(\vec{r}).$$

For conservative systems (constant energy), the time-dependent factor may be separated from the wave function (e.g., $$\Psi(\vec{r}, t) = \Phi(\vec{r})e^{-\frac{iEt}{\hbar}}$$

giving the time-independent Schrodinger equation $$\left[-\frac{\hbar^2}{2m}\nabla^2 + V(\vec{r})\right]\Phi(\vec{r}) = E\Phi(\vec{r}),$$

or otherwise $\hat{H}\Phi=E\Phi$, an eigenvalue equation with eigenfunctions and eigenvalues. The eigenvalue equation provides a basis given by the eigenfunctions $\{\varphi\}$ of the Hamiltonian. Therefore, in some embodiments, the wave function is given by $\Psi(\vec{r}, t)=\Sigma_k c_k(t)\varphi_k(\vec{r})$, corresponding to expressing the wave function in the basis given by energy eigenfunctions. Substituting this equation into the Schrodinger equation, $$c_k(t) = c_k(0)e^{-\frac{iE_k t}{\hbar}}$$

wherein $E_k$ is the eigen-energy to the eigenfunction $\varphi_k$. For example, the probability of measuring a certain energy $E_k$ at time t is given by the coefficient of the eigenfunction $\varphi_k$, $$|c_k(t)|^2 = \left|c_k(0)e^{-\frac{iE_k t}{\hbar}}\right|^2 = |c_k(0)|^2.$$

Thus, the probability for measuring the given energy is constant over time. However, this is only true for the energy eigenvalues, not for other observables. Instead, the probability of finding the system at a certain position $\rho(\vec{r})=|\Psi(\vec{r}, t)|^2$ may be used.

The wave function $\psi$ is an element of a complex Hilbert space H, which is a complete inner product space. Every physical property is associated with a linear, Hermitian operator acting on that Hilbert space. A wave function, or quantum state, may be regarded as an abstract vector in a Hilbert space. In some embodiments, $\psi$ is denoted by the symbol $|\psi\rangle$ (i.e., ket), and correspondingly, the complex conjugate $\phi^*$ is denoted by $\langle\Phi|$ (i.e., bra). The integral over the product of two functions is analogous to an inner product of abstract vectors, $\int \phi^* \psi d\pi => \phi|. |\psi\rangle \equiv \langle\phi|\psi\rangle$. In some embodiments, $\langle\phi|$ and $|\psi\rangle$ are state vectors of a system and the processor determines the probability of finding $\langle\phi|$ in state $|\psi\rangle$ using $p(\langle\phi|, |\psi\rangle)=\equiv(\langle\phi|\psi\rangle|^2$. For a Hermitian operator $\hat{A}$ eigenkets and eigenvalues are denoted $A|\rangle=a_n|n\rangle$, wherein $|n\rangle$ is the eigenket associated with the eigenvalue an. For a Hermitian operator, eigenvalues are real numbers, eigenkets corresponding to different eigenvalues are orthogonal, eigenvalues associated with eigenkets are the same as the eigenvalues associated with eigenbras, i.e. $\langle n|A => n|a_n$. For every physical property (energy, position, momentum, angular momentum, etc.) there exists an associated linear, Hermitian operator $\hat{A}$ (called am observable) which acts on the Hilbert space H. Given A has eigenvalues $a_n$ and eigenvectors $|n\rangle$, and a system in state $|\phi\rangle$, the processor determines the probability of obtaining an as an outcome of a measurement of A using $p(a_n)=[\langle n|\phi\rangle|^2$. In some embodiments, the processor evolves the time-dependent Schrodinger equation using $$i\hbar \frac{\partial |\psi\rangle}{\partial t} = \hat{H}|\psi\rangle.$$

Given a state $|\phi\rangle$ and a measurement of the observable A, the processor determines the expectation value of A using $\langle A \rangle = \langle \phi | A | \phi \rangle$, corresponding to $$\langle A \rangle = \frac{\int \phi^* \hat{A} \phi d\tau}{\int \phi^* \phi d\tau}$$

for observation operator $\hat{A}$ and wave function $\phi$. In some embodiments, the processor updates the wave function when observing some observable by collapsing the wave function to the eigenfunctions, or eigenspace, corresponding to the observed eigenvalue.

As described above, for localization of the robot, the processor evolves the wave function $\Psi(\vec{r}, t)$ using the Schrödinger equation $$i\hbar \frac{\partial}{\partial t} \Psi(\vec{r}, t) = \left[ -\frac{\hbar^2}{2m} \nabla^2 + V(\vec{r}) \right] \Psi(\vec{r}, t).$$

In some embodiments, a solution is written in terms of eigenfunctions $\psi_n$ with eigenvalues $E_n$ of the time-independent Schrodinger equation $H\psi_n = E_n \psi_n$, wherein $\Psi(\vec{r}, t) = \Sigma_{c_n} c_n e^{-iE_n t/\hbar} \psi_n$ and $c_n = \int \Psi(\vec{r}, 0) \psi^*_n dr$. In some embodiments, the time evolution is expressed as a time evolution via a unitary operator U(t), $\Psi(\vec{r}, t) = U(t) \Psi(\vec{r}, 0)$ wherein $U(t) = e^{-iHt/\hbar}$. In some embodiments, the probability density may be updated by the processor of the robot each time an observation or measurement is received by the processor of the robot. For each observation with observation operator A the processor of the robot may perform an eigen-decomposition $A\omega_n = a_n \omega_n$, wherein the eigenvalue corresponds to the observed quantity. In some embodiments, the processor observes a value $\alpha$ with probability $0 \le p \le 1$. In some embodiments, wherein the operator has a finite spectrum or a single eigenvalue is observed, the processor of the robot may collapse to the eigenfunction(s) with corresponding probability $$\Psi(\vec{r}, t) \to \gamma \sum_{n=1}^{N} p(a_n) d_n \omega_n,$$

wherein $d_n = \int \omega^*_n \Psi dr$, $p(\alpha)$ is the probability of observing value $\alpha$, and $\gamma$ is a normalization constant. In some embodiments, wherein the operator has continuous spectrum, the summation may be replaced by an integration $\Psi(\vec{r}, t) \to \gamma \int p(\alpha) d_n \omega_n \, d\alpha$, wherein $d_n = \int \omega^*_n \Psi dr$.

For example, consider a robot confined to move within an interval $$\left[ -\frac{1}{2}, \frac{1}{2} \right].$$

For simplicity, the processor sets h=m=1, and an infinite well potential and the regular kinetic energy term are assumed. The processor solves the time-independent Schrodinger equations, resulting in wave functions $$\psi_n = \begin{cases} \sqrt{2} \sin\left(k_n \left(x - \frac{1}{2}\right)\right) e^{-i\omega_n t}, & -\frac{1}{2} < x < \frac{1}{2}, \\ 0, & \text{otherwise} \end{cases}$$

wherein $k_n = n\pi$ and $E_n = \omega_n = n^2 \pi^2$. In the momentum space this corresponds to the wave functions $$\phi_n(p, t) = \frac{1}{\sqrt{2\pi}} \int_{-\infty}^{\infty} \psi_n(x, t) e^{-ipx} dx = \frac{1}{\sqrt{\pi}} \frac{n\pi}{n\pi + p} \text{sinc}\left(\frac{1}{2}(n\pi - p)\right).$$

The processor takes suitable functions and computes an expansion in eigenfunctions. Given a vector of coefficients, the processor computes the time evolution of that wave function in eigenbasis. In another example, consider a robot free to move on an x-axis. For simplicity, the processor sets h=m=1. The processor solves the time-independent Schrodinger equations, resulting in wave functions $$\psi_E(x, t) = A e^{\frac{i(px - Et)}{\hbar}},$$

wherein energy $$E = \frac{\hbar^2 k^2}{2m}$$

and momentum p=hk. For energy E there are two independent, valid functions with $\pm p$. Given the wave function in the position space, in the momentum space, the corresponding wave functions are $$\phi_E(p, t) = e^{\frac{i(px - Et)}{\hbar}},$$

which are the same as the energy eigenfunctions. For a given initial wave function $\psi(x, 0)$, the processor expands the wave function into momentum/energy eigenfunctions $$\phi(p) = \frac{1}{\sqrt{2\pi\hbar}} \int \psi(x, 0) e^{-\frac{ipx}{\hbar}} dx,$$

then the processor gets time dependence by taking the inverse Fourier resulting in $$\psi(x, t) = \frac{1}{\sqrt{2\pi\hbar}} \int \phi(p) e^{\frac{ipx}{\hbar}} e^{-\frac{iEt}{\hbar}} dp.$$

An example of a common type of initial wave function is a Gaussian wave packet, consisting of momentum eigenfunctions multiplied by a Gaussian in position space $$\psi(x) = A e^{-\left(\frac{x}{a}\right)^2} e^{\frac{ip_0 x}{\hbar}},$$

wherein $p_0$ is the wave function's average momentum value and $\alpha$ is a rough measure of the width of the packet. In the momentum space, this wave function has the form $$\phi(p) = Be^{-\left(\frac{a(p-p_0)}{2\hbar}\right)^2},$$

which is a Gaussian function of momentum, centered on $p_0$ with approximate width $$\frac{2\hbar}{a}.$$

Note Heisenberg's uncertainty principle wherein in the position space width is $\sim\alpha$, and in the momentum space is $\sim 1/\alpha$. For example, consider a wave packet at a first time point for $\psi(x)$ and $\phi(p)$, with $x_0$, $p_0=0,2$, $h=0.1$, $m=1$, and $\alpha=3$. As time passes, the peak moves with constant velocity $$\frac{p_0}{m}$$

and the width of the wave packet in the position space increases. This happens because the different momentum components of the packet move with different velocities. In the momentum space, the probability density $|\phi(p, t)|^2$ stays constant over time.

When modeling the robot using quantum physics, and the processor observes some observable, the processor collapses the wave function to the subspace of the observation. For example, consider the case wherein the processor observes the momentum of a wave packet. The processor expresses the uncertainty of the measurement by a function $f(p)$ (i.e., the probability that the system has momentum p), wherein $f$ is normalized. The probability distribution of momentum in this example is given by a Gaussian distribution centered around $p=2.5$ with $\sigma=0.05$, a strong assumption that the momentum is 2.5. Since the observation operator is the momentum operators, the wave function expressed in terms of the eigenfunctions of the observation operator is $\phi(p, t)$. The processor projects $\phi(p, t)$ into the observation space with probability $f$ by determining $\bar{\phi}(p,t)=f(p)\phi(p,t)$. The processor normalizes the updated $\bar{\phi}$ and takes the inverse Fourier transform to obtain the wave function in the position space. In this example, the wave function in the position space concludes that the position has spread further out from the original wave function in the position space. This is unexpected after observing a very narrow momentum density, however, this effect is due to Heisenberg's uncertainty principle. With decreasing h this effect diminishes. Similar to observing momentum, position may also be observed and incorporated.

In quantum mechanics, wave functions represent probability amplitude of finding the system in some state. Physical pure states in quantum mechanics are represented as unit-norm vectors in a special complex Hilbert space and time evolution in this vector space is given by application of the evolution operator. Further, in quantum mechanics, any observable should be associated with a self-adjoint linear operator which must yield real eigenvalues, e.g. they must be Hermitian. The probability of each eigenvalue is related to the projection of the physical state on the subspace related to that eigenvalue and observables are differential operators. For example, a robot navigates along a one-dimensional floor that includes three doors at doors at $x_0=-2.5$, $x_1=0$, and $x_2=5.0$, the processor of the robot is capable of determining when it is located at a door based on sensor data observe, and the momentum of the robot is constant, but unknown. Initially the location of the robot is unknown, therefore the processor generates initial wave functions of the state. When the processor determines the robot is in front of a door, the possible position of the robot is narrowed down to three possible positions, but not the momentum. The processor evolves the wave functions with a Hamiltonian operator, and after five seconds the wave functions show that the position space has spread out again given that the momentum is unknown. However, the evolved probability density keeps track of the correlation between position and momentum. When the processor determines the robot is in front of a door again, the wave functions are updated, wherein the wave functions have significantly narrowed down, indicating a number of peaks representing possible position and momentum combinations of the robot. And in fact, if the processor observes another observation, such as momentum $p=1.0$ at $t=5.0$, the wave function in the position space also collapses to the only remaining possible combination, the location near $x=5.0$. The processor collapses the momentum wave function accordingly. Also, the processor reduces the position wave function to a peak at $x=5.0$. Given constant momentum, the momentum observation of $p=1.0$, and that the two door observations were 5 seconds apart, the position $x=5.0$ is the only remaining valid position hypothesis.

In some embodiments, the processor of the robot considers multiple possible scenarios wherein the robot is located in other likely locations in addition to the location estimated by the processor. As the robot moves within the environment, the processor gains information of its surroundings from sensory devices (local and/or remote) which it uses to eliminate less likely scenarios. For example, consider the processor of a robot estimating itself to be 100 cm away from a wall. To account for measurement noise the processor considers additional likely scenarios wherein the robot is, for example, 102, 101, 99 and 98 cm away from the wall. The processor considers these scenarios as possibly being the actual true distance from the wall and therefore reduces the speed of the robot after traveling 98 cm towards the wall. If the robot does not bump into the wall after traveling 98 cm towards the wall it eliminates the possibility of it having been 98 cm away from the wall and the likelihood of the robot being 99, 100, 101 and 102 cm away from the wall increases. This way as the robot travels within the environment, the processor adjusts its confidence of its location with respect to other robots and the environment based on observations and information gained of the surroundings. In some cases, such a method reduces collisions. In an alternative visualization of this approach the processor inflates the surface area occupied by the robot such that it is hypothesized that the robot occupies all state spaces falling within the borders of the inflated surface area. Since the error of perceived position of the robot increases with movement, the processor inflates the surface area occupied by the robot with every movement. The processor deflates the surface area occupied by the robot when occupancy of a hypothesized state space falling within the borders of the surface area is proven to be false, thereby reducing the number of state spaces and hence area occupied by the robot. In this example, wherein the surface area occupied by the robot is equivalent to the integral of all state spaces falling within the borders of the surface area, the occupancy of all state spaces is uniformly distributed. In some embodiments, the inflation and deflation is not the same in all directions. In some embodiments, the amounts of inflation and deflation in different directions depends on the type of motion, noise, sensors, etc. In some embodiments, the processor adjusts the shape of the area within which the robot is assumed to be located within based on deviation between the measured and true heading and translation of the robot as it moves. In some embodiments, the processor uses information on linear and angular undershoot and overshoot to help determine the shape of the area within which the robot is assumed to be located within. Force is needed to cause linear and angular acceleration and a given amount of force can either be spent on linear overshooting or angular overshooting. If the robot overshoots linearly it undershoots angularly and vice versa.

In some embodiments, wherein the state of the robot within a space is initially unknown, the processor of the robot may generate a uniform probability distribution over the space. In other instances, any other probability distribution may be generated depending on the information known about the state of the robot and the certainty of the information. Over time and as more measurements and observations are received by the processor of the robot, the probability distribution over all possible states of the robot in the space evolves.

In some embodiments, the processor uses quantum refining. In some embodiments, the processor simulates multiple robots located in different possible locations within the environment. In some embodiments, the processor may view the environment from the perspective of each different simulated robot. In some embodiments, the collection of simulated robots form an ensemble. In some embodiments, the processor evolves the location of each simulated robot or the ensemble over time. In some embodiments, the processor evolves the ensemble according to an equation of motion as described above. In some embodiments, the range of movement of each simulated robot may be different. In some embodiments, the processor may view the environment from the FOV of each simulated robot, each simulated robot having a slightly different map of the environment based on their simulated location and FOV. In some embodiments, the collection of simulated robots form an approximate region within which the robot is truly located. In some embodiments, the true location of the robot is one of the simulated robots. In some embodiments, when a measurement of the environment is taken, the processor checks the measurement of the environment against the map of the environment of each of the simulated robots. In some embodiments, the processor predicts the robot is truly located in the location of the simulated robot having a map that best matches the measurement of the environment. In some embodiments, the simulated robot which the processor believes to be the true robot may change or may remain the same as new measurements are taken and the ensemble evolves over time. In some embodiments, the ensemble of simulated robots remain together as the ensemble evolves over time. In some embodiments, the overall energy of the collection of simulated robots remains constant in each timestamp, however the distribution of energy to move each simulated robot forward during evolution may not be distributed evenly among the simulated robots. For example, in one instance a simulated robot may end up much further away than the remaining simulated robots or too far to the right or left, however in future instances and as the ensemble evolves, may become close to the group of simulated robots again. In some embodiments, the ensemble evolves to most closely match the sensor readings, such as a gyroscope or optical sensor. In some embodiments, the evolution of the locations of simulated robots is limited based on characteristics of the physical robot. For example, a robot may have limited speed and limited rotation of the wheels, therefor it would be impossible for the robot to move two meters, for example, in between time steps. In another example, the robot may only be located in areas of an environment where objects do not exist. In some embodiments, this method of quantum refining may be used to hold back certain elements or modify the overall understanding of the environment. For example, when the processor examines a total of ten simulated robots one by one against a measurement, and selects one simulated robot as the true robot, the processor filters out nine simulated robots, thus filtering ten quanta to one quantum.

In some embodiments, the FOV of each simulated robot may not include the exact same features as one another. In some embodiments, the processor saves the FOV of each of the simulated robots in memory. In some embodiments, the processor combines the FOV of each simulated robot to create a FOV of the ensemble using methods such as least squares methods. This method is described above for creating a map by aligning sensor data to create one representation of the environment, which may be more accurate than each individual FOV. In some embodiments, the processor tracks the FOV of each of the simulated robots individually and the FOV of the entire ensemble. In some embodiments, other methods may be used to create the FOV of the ensemble (or a portion of the ensemble). For example, a classifier AI algorithm may be used, such as Naive Bayes classifier, least squares support vector machines, k-nearest neighbor, decision trees, and neural networks. In some embodiments, more than one FOV of the ensemble may be generated and tracked by the processor, each FOV created using a different method. For example, the processor may track the FOV of ten simulated robots and ten differently generated FOVs of the ensemble. At each measurement timestamp, the processor may examine the measurement against the FOV of the ten simulated robots and/or the ten differently generated FOVs of the ensemble and may choose any of these 20 possible FOVs as the ground truth. In some embodiments, the processor may examine the 20 FOVs instead of the FOVs of all the simulated robots and choose a derivative as the ground truth. The number of simulated robots and/or the number of generated FOVs may vary. During mapping for example, the processor may take a first field of view of the camera and calculate a FOV for the ensemble or each individual observer (simulated robot) within the ensemble and combine it with the second field of view captured by the camera or the FOV of the ensemble or each individual observer within the ensemble. In some embodiments, the processor switches between the FOV of each observer (e.g., like multiple CCTV cameras in an environment that an operator may switch between) and/or one or more FOVs of the ensemble and chooses the FOVs that are more probable to be close to ground truth. At each time iteration, the FOV of each observer and/or the ensemble evolves into being closer to ground truth.

In some embodiments, simulated robots may be divided in two or more classes. For example, simulated robots may be classified based on their reliability, such as good reliability, bad reliability, or average reliability or based on their speed, such as fast and slow. Classes that move to a side a lot may be used. Any classification system may be created, such as linear classifiers like Fisher's linear discriminant, logistic regression, Naive Bayes classifier and perceptron, support vector machines like least squares support vector machines, quadratic classifiers, kernel estimation like k-nearest neighbor, boosting (meta-algorithm), decision trees like random forests, neural networks, and learning vector quantization. In some embodiments, each of the classes evolve differently. For example, for fast speed and slow speed classes, each of the classes moves differently wherein the simulated robots in the fast class will move very fast and will be ahead of the other simulated robots in the slow class that move slower and fall behind. For example, given a gyroscope that shows two meters of movement and classes X, Y, and Z, at each evolution over time, class X moves the fastest, and hence furthest, as it belongs to the fastest speed class. In other words, when a force is applied at each time stamp to evolve the classes over time, the force moves class X more than the rest of the classes. This may be due to class X being lighter than the rest of the simulated robots. The kind and time of evolution may have different impact on different simulated robots within the ensemble. The evolution of the ensemble as a whole may or may not remain the same. The ensemble may be homogenous or non-homogenous.

In some embodiments, samples are taken from the phase space. In some embodiments, the intervals at which samples are taken may be fixed or dynamic or machine learned. In a fixed interval sampling system, a time may be preset. In a dynamic interval system, the sampling frequency may depend on factors such as speed or how smooth the floor is and other parameters. For example, as the speed of the robot increases, more samples are taken. Or more samples are taken when the robot is traveling on rough terrain. In a machine learned system, the frequency of sampling may depend on predicted drift. For example, if in previous timestamps the measurements taken indicate that the robot has reached the intended position fairly well, the frequency of sampling is reduced. In some embodiments, the above explained dynamic system may be equally used to determine the size of the ensemble. If, for example, in previous timestamps the measurements taken indicate that the robot has reached the intended position fairly well, a smaller ensemble may be used to correct the knowledge of where the robot is. In some embodiments, the ensemble is regenerated at each interval. In some embodiments, a portion of the ensemble is regenerated. In some embodiments, a portion of the ensemble that is more likely to depict ground truth may be preserved and the other portion regenerated. In some embodiments, the ensemble may not be regenerated but one of the observers (simulated robots) in the ensemble that is more likely to be ground truth is chosen as the most feasible representation of the true robot. In some embodiments, observers (simulated robots) in the ensemble take part in becoming the most feasible representation of the true robot based on how their individual description of the surrounding fits with the measurement taken.

In some embodiments, the processor generates an ensemble of hypothetical positions of various simulated robots within the environment. In some embodiments, the processor generates a simulated representation of the environment for each hypothetical position of the robot from the perspective corresponding with each hypothetical position. In some embodiments, the processor compares a measurement (e.g., from a local or remote source) against each simulated representation of the environment (e.g., a floor type map, a spatial map, a Wi-Fi map, etc.) corresponding with a perspective of each of the hypothetical positions of the robot. In some embodiments, the processor chooses the hypothetical position of the robot that makes the most sense as the most feasible position of the robot. In some embodiments, the processor selects additional hypothetical positions of the robot as a backup to the most feasible position of the robot. In some embodiments, the processor nominates one or more hypothetical positions as a possible leader or otherwise a feasible position of the robot. In some embodiments, the processor nominates a hypothetical position of the robot as a possible leader when the measurement fits well with the simulated representation of the environment corresponding with the perspective of the hypothetical position. In some embodiments, the processor defers a nomination of a hypothetical position to other hypothetical positions of the robot. In some embodiments, the hypothetical positions with the highest numbers of deferrals are chosen as possible leaders. In some embodiments, the process of comparing measurements to simulated representations of the environment corresponding with the perspectives of different hypothetical positions of the robot, nominating hypothetical positions as possible leaders, and choosing the hypothetical position that is the most feasible position of the robot may be iterative. In some cases, the processor selects the hypothetical position with the lowest deviation between the measurement and the simulated representation of the environment corresponding with the perspective of the hypothetical position as the leader. In some embodiments, the processor stores one or more hypothetical positions that are not elected as leader for another round of iteration after another movement of the robot. In other cases, the processor eliminates one or more hypothetical positions that are not elected as leader or eliminates a portion and stores a portion for the next round of iteration. In some cases, the processor chooses the portion of the one or more hypothetical positions that are stored based on one or more criteria (e.g., amount of deviation between the measurement and representation of the environment). In some cases, the processor chooses the portion of hypothetical positions that are stored randomly and based on one or more criteria. In some cases, the processor eliminates some of the hypothetical positions of the robot that pass the one or more criteria. In some embodiments, the processor evolves the ensemble of hypothetical positions of the robot similar to a genetic algorithm. In some embodiments, the processor uses a Markov Decision Process (MDP) to reduce the error between the measurement and the representation of the environment corresponding with each hypothetical position over time, thereby improving the chances of each hypothetical position becoming or remaining leader. In some cases, the processor applies game theory to the hypothetical positions of the robots, such that hypothetical positions compete against one another in becoming or remaining leader. In some embodiments, hypothetical positions compete against one another and the ensemble becomes an equilibrium wherein the leader following a policy (e.g., policy a in a MDP) remains leader while the other hypothetical positions maintain their current positions the majority of the time.

The multi-dimensionality in quantum localization described above provides robustness that may be useful in various applications. In some embodiments, the processor uses localization for controlling the operation, settings, and functionality of the robot. For example, the processor uses localization to control the behavior of the robot in different areas, where for instance, certain functions or settings are desired for different environments. These functions or settings may be triggered once the processor has localized the robot against the environment. For example, it may be desirable to run the motor at a higher speed when moving over rough surfaces, such as soft flooring as opposed to hardwood, wherein localization against floor type or against a room may trigger the motor speed. As a further example, localization may also be used in controlling the movement of the robot. If the processor localizes the robot against a perimeter, for example, it may choose to select a path along the perimeter or it may trigger a polymorphic or other type of path planning algorithm. Or, localizing the robot against a perimeter may trigger a path planning algorithm.

In some embodiments, the processor of a robot may fail in a localization capacity and may not recognize where the robot located in the environment. In some embodiments, if localization fails, the robot may begin a new mapping of the environment, operating in a new functional and mapping capacity, visiting each area, such as, each room, and mapping these areas beginning with the area in which localization first failed. In some embodiments, the failure of localization may include the loss of data pertaining to the location of the robot's initial navigational starting point, such as the location of a charging station of the robot to which the robot returns following each work session. In some embodiments, when localization fails the processor of the robot may immediately begin to search for the charging station. In some embodiments, when localization fails the robot may operate and the processor may map areas while simultaneously searching for the charging station. In some embodiments, when localization fails the robot may complete a work session while the processor maps the environment, and return to each area after the work session to search for the charging station. In some embodiments, the processor of the robot may search for the charging station by searching for an IR light emitted by a transmitter of the charging station to be received by the robot which will signal the robot to return to the charging station. In some embodiments, the processor of the robot may search for a charging station by rotating in 360 degrees in each area until a signal from the charging station is received by the robot. In some embodiments, if the robot does not detect a signal from the charging station in an area, the robot may automatically navigate to a different area. In some embodiments, if the robot detects a signal from the charging station in an area, the robot may automatically cease operations and navigate directly to the charging station. In some embodiments, if the robot detects a signal from the charging station in an area, the robot may navigate to a new area before navigating back to the charging station. In some embodiments, if the charging station is detected by the processor of the robot, and the robot thereafter navigates to a new area, a path plan may be set by the processor for navigating back to the charging station. In some embodiments, if a first robot's localization fails, a processor of the first robot may communicate with a centralized control system, a charging station, or processors of other robots or devices to assist with the processor recovering a localization capacity. For example, if a first robot's localization fails, a processor of the first robot may send out, for example, a distress signal indicating that it has lost localization, and a processor of a second robot, may share data such as maps or other beneficial data with the processor of the first robot to assist with recovering some form of a localization capacity. In an additional example, if the localization capacity of the processor of the robot fails, the processor may communicate with a centralized control system, charging station, or processors of other robots or devices to attempt to recover data such as maps or other beneficial data to assist the with recovering some form of a localization capacity. In some embodiments, when localization fails, the robot may detect and mark obstacles encountered in the environment within a new map generated during the work session as the robot navigates in the environment. In some embodiments, features of the charging station may be used by the processor of the robot to distinguish the charging station when searching for the charging station (e.g., unique angles, physical characteristics, printing, painting, patterns, and the like). Further details describing embodiments of localization failure and actions triggered as a result are disclosed in U.S. Patent Application No. 62/740,558, the entire contents of which is hereby incorporated by reference.

Further details of localization methods that may be used independently or in combination are described in U.S. Patent Application Nos. 62/746,688, 16/297,508, 62/740,573, 62/740,580, 62/748,943, Ser. Nos. 15/955,480, 15/425,130, 15/955,344, and 16/427,317, the entire contents of which are hereby incorporated by reference.

The techniques described herein, e.g., such as localization, mapping, and depth perceiving techniques, may be implemented in software, in hardware, in a system on a chip, a module, a combination with other hardware on a PCB, in a single silicon chip, a combination of software and one or more silicon chips, a combination of software and a multipurpose chip, or a specific application chip with built in mapping capabilities. In some embodiments, the implementations may include built-in circuitry for easier and faster processing and GPUs and TPUs capabilities. In some embodiments, a localization chip or a processing chip with a localization processing unit may be used. In some embodiments, a localization and mapping chip or a processing chip such as a CPU or MCU with a localization and mapping processing unit may be used.

In some embodiments, the processor of a robot determines a movement path of the robot based on the map of the environment. For example, in some embodiments, the processor implements a path planning method that is responsive to stimulus from an observed environment. In some embodiments, the processor divides the environment into zones and then dynamically adjusts a movement path within each of those zones based on sensed attributes of the environment. In some embodiments, the processor represents a movement path using a topological graph, wherein the movement path is described with a set of vertices and edges, the vertices being linked by edges. Vertices may be represented as distinct points while edges may be lines, arcs or curves. The properties of each vertex and edge may be provided as arguments at run-time based on real-time sensory input of the environment. In some embodiments, the topological graph may define the next actions of the robot as it follows along edges linked at vertices. While executing the movement path, in some embodiments, the processor may assign rewards as the robot executes actions to transition between states (e.g., such as in a MDP). In some embodiments, the processor uses the net cumulative reward to evaluate a particular movement path comprised of actions and states. In some embodiments, the processor may iteratively calculate a state-action value function during execution of the movement path based on the current reward and maximum future reward at the next state. In some embodiments, a goal is to find optimal state-action value function and optimal policy by identifying the highest valued action for each state. As different topological graphs including vertices and edges with different properties are executed over time, the number of states experienced, actions taken from each state, and transitions increase. The movement path devised by the processor iteratively evolves to become more efficient by choosing transitions that result in most favorable outcomes and by avoiding situations that previously resulted in low net reward. After convergence, the evolved movement path is determined to be more efficient than alternate movement paths that may be devised using real-time sensory input of the environment. Detailed examples of path planning methods are described in U.S. patent application Ser. Nos. 16/041,286, 16/422,234, 15/406,890, and 16/163,530, the entire contents of which are hereby incorporated by reference. For example, in embodiments, the route plan is devised within an area smaller than the total area perceived. A margin with respect to the perimeter of the working environment is set and the route plan is devised within the area bounded by the set margins. In embodiments, the margins are set by the processor of the robotic device based on observed input of the environment while in another embodiment the size of margins are predetermined. In another embodiment, the margins are set by the user through a graphical user interface (GUI), such as those noted above. Margins minimize disruption during execution of route plans that may arise due to inaccuracies in measurements or measurements collected by low resolution devices where the perceived perimeter may not be exact. If the route plan happens to intersect with the true perimeter, the route plan is disrupted. Margins also help accommodate irregularities in the shape of the environment, where, for example, it would be hard to accommodate a boustrophedon pattern if there is small alcove located along one of the walls of the room. In such a case where margins are used, the small alcove would be left out of the covered area. In embodiments, after the route plan devised within the area bordered by the margins is complete, the robotic device covers the areas between the perimeter and margins thereby coverings areas previously left out. This ensures the robotic device cleans in a methodical way while covering all areas. Without margins, it is difficult to find a non-repeating and optimal route plan, while with margins a repeating route plan may be executed within the margins followed by coverage along the perimeter.

In some embodiments, the processor of a robot divides the environment into zones and orders them for coverage to improve efficiency. In some embodiments, the processor divides the map of the environment into a plurality of cells wherein each cell corresponds to a different location of the environment. In some embodiments, the processor divides the map into a plurality of zones, each zone having a subset of the plurality of cells. In some embodiments, the processor determines a sequence of the zones among a plurality of candidate sequences based on an effect of the sequence on a cost of a cost function that is based on travel distance of the robot through the sequence. In some embodiments, the robot traverses the zones in the determined sequence. In some embodiments, the cost function is based on other variables, such as actual surface coverage, repeat coverage, and total coverage time.

In some embodiments, the processor represents the map of the environment by a plurality of cells, each cell representing a different location of the environment. In some embodiments, each cell is defined by an ordered pair representing an angle and a distance from an origin of a coordinate system. In some embodiments, each cell of the environment can only belong to a single zone, and overlap between zones is avoided by construction. In some embodiments, entries in the matrices of zones have a value of zero if the cell is empty or a value of one if the cell is occupied by an object (e.g., wall or furniture). In some embodiments, the processor executes the following iteration for each zone of a sequence of zones, beginning with the first zone to optimize division of zones: expansion of the zone if neighbor cells are empty, movement of the robot to a point in the zone closest to the current position of the robot, addition of a new zone coinciding with the movement path of the robot from its current position to a point in the zone closest to the robot if the length of travel from its current position is significant, execution of a movement path within the zone, and removal of any uncovered cells from the zone.

In another embodiment, the processor determines optimal division of the environment by minimizing a cost function. In some embodiments, the cost function depends on distance travelled between zones, coverage, and coverage time. In some embodiments, the cost function is minimized by removing, adding, shrinking, expanding, moving and switching the order of coverage of the zones. In some embodiments, the processor uses gradient descent to compute the division of zones that results in minimal cost by iteratively modifying division of zones based on a partial derivative of the cost function with respect to each respective parameter defining the zones. In some embodiments, this is repeated until the cost is below a predetermined threshold.

In yet another embodiment, the processor determines optimal division of zones by modeling zones as emulsions of liquid. Behaviors of emulsions of liquid, such as minimization of surface tension and surface area and expansion and contraction of the emulsion driven by an internal pressure, are used by the processor in modeling the zones. In some embodiments, the processor represents the environment using a grid map divided into zones. In some embodiments, the processor converts the grid map into a routing graph consisting of nodes connected by edges. In some embodiments, the processor represents a zone by a set of nodes, wherein the nodes are connected and represent an area on the grid map. In some embodiments, the processor assigns a zone a set of boundary edges wherein a boundary edge connects two nodes. The set of boundary edges define the set of boundary nodes and give information about which are just inside and outside a zone. In some embodiments, the processor may expand or reduce a zone by adding or removing nodes. In some embodiments, the processor determines a numerical value assigned to each node. In some embodiments, the value of each node indicates whether to add or remove the node from a zone. In some embodiments, the numerical value computed is dependent on growth and decay of the zone, distance of the node from the center of the zone, order of zone coverage, and a surface smoother score. In some embodiments, the processor determines an order score for each node to determine order of coverage based on the distance between the boundary node of interest and the closest boundary node in the next zone to be covered, the distance between the closest boundary nodes between the current zone and the next zone to be covered, and the distance between the furthest boundary nodes between the current zone and the next zone to be covered. Further details of methods for dividing an environment into subareas are described in U.S. patent application Ser. Nos. 14/673,633, 15/676,888, 14/817,952, 15/619,449, and 16/198,393, the entire contents of which are hereby incorporated by reference.

In some embodiments, processors of robots collaborate by sharing intelligence to accomplish one or more tasks. Examples of collaborative methods are described in U.S. patent application Ser. Nos. 16/418,988, 15/981,643, 15/986,670, 15/048,827, 14/948,620, and 16/185,000, the entire contents of which is hereby incorporated by reference. In some embodiments, processors of robots employ collaborative intelligence and artificial intelligence. In some embodiments, collaborative intelligence includes robots learning from one another and artificial intelligence includes the processor of a robot learning from the environment (e.g., user feedback). For instance, a processor of a home control unit capable of learning preferences of a user (e.g. home temperature, music genre, cleaning schedule, alarm setting, etc.) based on their actions over time may be an example of artificial intelligence. Based on the preferences of the user learned over time, the processor of the home control unit may therefore, play a specific genre of music or set the shower to a specific temperature. If a second home control unit was introduced into the home, the processor of the first home control unit may share its intelligence with the processor of the second home control unit such that the processor of the second home control unit may learn the preferences of the user from the processor of the first home control unit, which may be considered collaborative intelligence. In some embodiments, the processor of each robot operating within the environment may learn from the environment (e.g., user feedback) and in some embodiments, may share their learned intelligence with the processors of other robots to complete tasks more efficiently. For example, the processor of the second home control unit may learn from the processor of the first home control unit that the user prefers playing jazz music in the evening while the processor of the first home control unit may learn from the processor of the second home control unit what time the user prefers to wake up. In some embodiments, the processors of robots may autonomously split tasks. For example, the processor of one home control unit may control home temperature while the processor of the other home control unit may control lighting in the home. In another example, a processor of a first surface cleaning robot shares its intelligence (e.g., user preferences learned, a map of the environment, the location of obstacles, etc.) with a processor of a second surface cleaning robot and vice versa. In particular, the processor of the first surface cleaning robot may share with the processor of the second surface cleaning robot that the user likes the house cleaned at 8:00 AM on Monday and Thursday. In one example, the processor of a first robot learns that user A prefers a home temperature of 75°F while the processor of a second robot learns that a user B prefers the home temperate at 73°F. The processors of the robots may autonomously share intelligence and collaborate and may infer based on shared intelligence that a home temperature of 74°F is best when both users are present and to set the temperature to the preferred temperature of each individual user when they are only present. In other instances, a processor of a robot may receive one or more settings and may share the one or more settings with processors of other robots. In some embodiments, the processor of a robot receives the one or more settings from an application of a communication device, by voice command, by input on a graphical user interface of the robot, a remote control, a home assistant, etc. For example, processors of two cleaning robots introduced into a same environment and with separate user preferences stored may share their respective stored user preferences with one another however a user may choose the new preferences if preferences chosen by the collaborating robots are not desired. The processors of the robots may then learn the new user preferences for the future.

In some embodiments, a processor of a first robot transmits a signal to the processor of a second robot (or vice versa) before, during, or after completing a task. In some embodiments, the transmitted signal may include one or more of an instruction to execute an action or a task, a movement path of the first or second robot, actions previously executed by the first or second robot, current or upcoming actions of the first or second robot, a map of an environment, zones of an environment, order of zone coverage by the first or second robot, areas within which a task is to be executed or within which a task was executed by the first or second robot, progress of a task executed by the first or second robot, a schedule for executing a task by the first or second robot, cleaning preferences (e.g., suction power, number of passes of an area, robot speed, detailed or light cleaning, brush speed, etc.) for the first or second robot, capabilities of the first or second robot, debris data, floor type data, object (or obstacle) data, distance readings, road conditions, weather conditions, traffic conditions, power level, status (e.g., task being executed, charging, etc.), etc. In some embodiments, the receipt of a signal triggers the robot to execute one or more actions. In some embodiments, the one or more actions is a new task, a continuation of a task executed by the robot from which the signal was received, or is a second part of a task of which the first part is executed by the robot from which the signal was received. For example, a processor of a robotic vacuum may transmit a signal to a processor of a robotic mop before, during, or after vacuuming at least a portion of an environment, the receipt of the signal by the processor of the robotic mop triggering the robotic mop to mop at least a portion the environment. The areas vacuumed and mopped may be the same or may be different or may partially overlap. The processor of the robotic vacuum and robotic mop may strategically plan the order of coverage of areas such that overlapping areas for cleaning by both the robotic vacuum and mop are first vacuumed and then mopped. In another example, the processor of a robotic vacuum transmits a signal to a processor of a robotic mop before beginning vacuuming at least a portion of the environment, the receipt of the signal by the processor of the robotic mop triggering the robotic mop to mop while following along the same movement path of the robotic vacuum. In some cases, the robotic mop follows behind the robotic vacuum by a predetermined distance, immediately mopping vacuumed areas. In one example, a processor of a first robotic vacuum transmits a signal to the processor of a second robotic vacuum during execution of a task when the power level of the first robotic vacuum is below a predetermined threshold (or when the bin is above a predetermined threshold), the signal triggering the second robotic vacuum to complete the remainder of the task. The first robotic vacuum may navigate to a charging station to recharge. In some embodiments, the processor of a robot transmits a signal to search for a robot capable of executing a particular function. In some embodiments, the particular function may be complementary to the function of the robot transmitting the signal. For example, a processor of a robotic vacuum may transmit a signal in search of a robotic mop within the vicinity of the robotic vacuum to mop areas that may or may not be vacuumed by the robotic vacuum. In some embodiments, processors of the robots with complementary tasks collaborate to divide tasks within the environment. For example, the processor of a robotic vacuum and a robotic mop may collaborate to clean an environment. The processors divide the cleaning tasks such that the robotic vacuum cleans areas with carpet and the robotic mop cleans areas with hard flooring simultaneously. In some embodiments, the robot autonomously navigates to a charging station upon completion of a task or when a power level is below a predetermined threshold. In some embodiments, the robot may resume a task after recharging a power source. In some embodiments, two or more robots share a charging station, a bin emptying station, a cleaning fluid replenishment station, etc. In other embodiments, the robotic vacuum and robotic mop used in these examples may be replaced with other types of robots and are solely used for illustration purposes. In some embodiments, processors of robots transmit signals to one another to autonomously collaborate. In some embodiments, the transmitted signals may include a movement path, actions or tasks previously executed, current and upcoming actions or tasks, a map of an environment, zones of an environment, order of zone coverage, areas within which a task is to be executed or within which an task was executed, progress of a task, delegation of a task, a schedule for executing a task, cleaning preferences (e.g., suction power, number of passes of an area, robot speed, detailed or light cleaning, brush speed, etc.), capabilities of the robot, debris data, floor type data, object (or obstacle) data, distance readings, road conditions, weather conditions, traffic conditions, power level, status (e.g., task being executed, charging, etc.), etc. In some embodiments, processors of robots collaborate by dividing a task. For example, processors of two robotic vacuums may collaborate to clean an area by determining which areas each robot is to clean and by sharing areas covered in real-time with one another to avoid repeat coverage during execution of the task. In another example, a processor of a robot transmits traffic conditions to processors of nearby robots with whom a connection has been established such that the nearby robots can avoid the high trafficked area. In one example, a processor of a robot unable to complete garbage pickup of an area due to low battery level communicates with a processor of another nearby robot capable of performing garbage pickup, providing the robot with current progress of the task and a map of the area such that it may complete the task. In some embodiments, processors of robots exchange intelligence relating to the environment (e.g., traffic data, object data, etc.) or results of historical actions such that individual processors can optimize actions at a faster rate.

In some embodiments, the processor of a robot may make inferences from shared intelligence. For instance, a processor of a robotic coffee machine may learn that a user typically gets home from a jog every morning at 5:00 AM and to therefore brew a cup of the coffee preferred by the user at 5:00 AM. If one day at 4:45 AM the processor of a collaborating robotic vacuum cleaner detects the front door opening, it may share this data with the processor of the robotic coffee machine and the processor of the robotic coffee machine may infer that the user is home early from their jog and may therefor brew a cup of coffee earlier than usual. The processor of the robotic coffee machine may then adjust the likelihood of the user arriving home at 5:00 AM. In another example, the processor of a robotic tooth brush may collaborate with the processor of a robotic coffee maker, such that operation of the robotic tooth brush in the morning may be shared with the processor of the robotic coffee maker. The robotic coffee maker may therefore infer the user is awake and brew a cup of the preferred coffee of the user before the user reaches the kitchen. If there are two users within the home, the processor of the robotic coffee machine may infer the user based on probabilities and statistics (e.g., toothbrush settings, length of toothbrush operation, the toothbrush from which the signal was received, etc.) of information in order to maximize comfort without wasting energy. For instance, if the processor of the robotic coffee machine infers both users are awake it may brew a medium roast in order to appease both users if one prefers light roast and the other dark roast. In some embodiments, processors of robots may share data of multiple users in order to learn to make decisions benefiting all present users. For example, if two users prefer a robot to clean at 8:00 AM but one prefers mopping while the other prefers sweeping, the processor of the robot may decide to clean at 8:00 AM using both cleaning functionalities to benefit both users. In another example, an AI system that suggests movies based on learned movie preferences of a user may compile movie preferences of all present users in order to suggest movies that all users may enjoy.

In some embodiments, the processor of a robot may provide suggestions to a user based on learned preferences of the user. For example, a processor of a robot may combine music preferences of a large group of individuals attending an event and suggest songs to play. In another example, processors of housekeeping robots working at separate locations of a hotel chain may learn room preferences of an individual that often travels for work and stays within the same hotel chain and may prepare the room for the individual based on statistical information and probabilities from shared data collected by sensors of the housekeeping robots (e.g., pillow type preference, lighting preference, alarm settings, etc.) or may provide suggestions to the user. For instance, the processor of a robot may decide to turn on a warm shower for the user at 6:15 AM based on previous intelligence on the time the user woke up and the temperature of the shower the user used. Or the processor of the robot may provide the user with a suggestion to set the alarm for 6:15 AM based on previous intelligence on the time the user woke up.

In some embodiments, the processor of a robot may connect with various electronic devices within the environment, including static and mobile devices. In some embodiments, the processor of the robot may be pre-paired with particular electronic devices. In some embodiments, the processor of the robot may search for one or more electronic devices with which it may establish a connection. In some embodiments, a user may be notified if the processor is unable to establish a connection with a particular electronic device. In some embodiments, a user may provide commands to the robot and the processor of the robot may process the commands, and if applicable relay the commands to the paired electronic devices to which the commands are directed. In some embodiments, the commands are relayed using RF, Bluetooth, Wi-Fi, or other wireless transmission method. For example, a user may provide an instruction to wash the laundry to a robot. Although the robot does not have the ability to wash the laundry, the processor of the robot may connect with a control unit of a robotic washing machine and may transmit the instruction provided by the user to the control unit of the robotic washing machine. In another example, a user may provide an instruction to vacuum and mop the floors of an environment to a robotic vacuum. A processor of the robotic vacuum may connect with a processor of a robotic mop and after finishing vacuuming may transmit a signal to the processor of the robotic mop notifying the robotic mop to begin mopping the environment. In another case, the processor of the robotic vacuum may transmit a signal to the processor of the robotic mop prior to beginning vacuuming, instructing the robotic mop to follow along a movement path of the robotic vacuum while mopping and remaining a predetermined distance behind the robotic vacuum. In some cases, the robotic mop follows a predetermined distance behind the robotic vacuum by detecting a signal transmitted from the robotic vacuum. In other examples, more than two robots may collaborate in completing complementary tasks. For example, a robotic sweeper may move along a path while sweeping, a robotic mop may follow along the same path immediately behind the robotic sweeper and mop the floors, and a robotic floor polisher may follow along the same path immediately behind the robotic mop while polishing the floors. In other cases, different complementary tasks may be executed by different types of robots. In one example, a user may instruct a robot to turn a shower on ten minutes prior to an alarm sounding. A processor of the robot may connect to a control unit of both the alarm and the shower and may determine a time that the alarm is set to sound and may therefore provide the required instructions to the control unit of the shower. In another example, a user may request a robot to water the lawn. A processor of the robot may connect to a control unit of the sprinklers and transmit the instructions thereby actuating the sprinklers to turn on. In one example, a user may ask a robot to dim, turn off, or turn on, lights in a particular room. A processor of the robot may connect with a control unit of the lights and may transmit the instruction to dim, turn off, or turn on to the control unit of the lights. In some cases, the processor of the robot may connect with a control system of a home, wherein the control system of the home may control light settings, fan settings, blind settings, alarm settings, shower settings, bath settings, surface cleaning robot settings, temperature settings, coffee maker settings, laundry machine settings, oven settings, stove settings, refrigerator settings, microwave settings, sprinkler settings, security system settings, and other settings of the home. A user may request the robot to adjust one of these settings and the processor of the robot may transmit the instruction to the control system of the home. The above are provided as examples, however many possibilities are available. In some embodiments, a user may be notified when a task or action is completed or incomplete. In some embodiments, the notification is provided to the user through an application of a communication device, a user interface of the robot, audio, etc.

In some embodiments, the processor of a robot may interact with the user or another device by answering an asked question or asking a question (e.g., what is the weather outside?), providing particular information when asked or asking for particular information (e.g., provide a joke, play music or a particular song, etc.), playing a game, and by other ways. In some embodiments, the processor of a robot uses information stored internally to respond to an interaction provided by a user or another device. In some embodiments, the robot connects with the internet and searches the internet to respond to an interaction provided by a user or another device. In some embodiments, the robot may follow a user around the environment when not executing an intended function (e.g., cleaning) such that the user may relay commands from any location within the environment. In some embodiments, a user remotely provides instructions to the processor of the robot using a user interface of an application of a communication device. In some embodiments, the processor of robot may understand speech of a user, formulate sentences that a user may understand, and communicate using a computer simulated voice.

Some embodiments include one or more of: broadcasting a signal by a transmitter of a first robot, detecting the signal by a receiver of a second robot, sending a second robot identifier by a transmitter of the second robot, receiving the second robot identifier by a receiver of the first robot, sending confirmation of receipt of the second robot identifier and sending a first robot identifier by the transmitter of the first robot, receiving the first robot identifier by the receiver of the second robot, sending confirmation of receipt of the first robot identifier by the transmitter of the second robot, establishing a data transfer channel (DTC) link between the first and second robots by a processor of the first robot and a processor of the second robot, transferring information (e.g., by transmitting signals) between robots through the DTC link by the processor of the first robot and the processor of the second robot and, performing an action by at least one robot based on the transferred information. The DTC link may be, for example, a secure wireless connection (e.g. Wi-Fi, Bluetooth, or RF) between the first and second robot. In some embodiments, collaborating robots, are actuators that take action or observers that observe the surroundings. In some embodiments, the DTC link is between two actuators, two observers or an actuator and an observer. In some embodiments, the processor of a robot establishes more than one DTC link. Different configurations of connections between collaborating robots may exist. For example, connection between two robots, connection from one robot to multiple robots, connection from multiple robots to one robot, etc. In some embodiments, DTC links are one-way connections wherein transfer of information is unidirectional, are two-way wherein information is bidirectional, or are more complex. In some embodiments, the processor of a robot assigns a measure of strength to a DTC link with another collaborating robot. In some embodiments, the processor adjusts the measure of strength based on the outcome of the collaboration. For example, if shared intelligence between two surface cleaning robots results in reduced time to clean an area, the respective processors increase the measure of strength of the DTC link. In some embodiments, the measure of strength of the DTC link is a probability of the action resulting in a maximum reward. In some embodiments, the DTC link is a vector with magnitude and direction. In some embodiments, the absolute value of the magnitude denotes the strength of the link and represents a probability between 0 and 1 of the action or collaboration resulting in a maximum reward, wherein a value of 1 signifies a very strong link. In some embodiments, if the collaboration between robots is useful for both robots, then the respective processors increase the measure of strength of the DTC link as well as the level of confidence in the information received from the collaborating robot. If the exchange of information is useless to the collaborating robots, the respective processors reduce the measure of strength of DTC link and, if collaboration is repeatedly useless, the shared information may eventually be discarded and the DTC link terminated by the respective processors. For example, if sensor measurements of the environment from a first robot indicate a hallway that allows a second robot to reach a room faster and the second robot with whom the information has been shared travels to the hallway and finds it is blocked, then the exchange of information was not helpful and the processor of the second robot decreases the measure of strength of the DTC link as well as the level of confidence of the information received from the first robot.

In some embodiments, a reward may be assigned by the processor of each collaborating robot or may be assigned by the processor of one robot and back propagated to the other based on the outcome of the collaborative action. In some embodiments, the reward assigned to each robot may be unproportioned. In some embodiments, one goal may be to preform actions that maximize the reward. In some embodiments, the processor of a robot may form, strengthen, weaken or terminate DTC links with other robots, with the goal of forming coalitions that maximize the reward. For example, for a DTC link between an observer and actuator, the strength of the DTC link may be reinforced by the processor when $\exists o(t) \in O \land \exists \alpha(t) \in A, \alpha(t)|o(t-1) \Rightarrow P[r^*(t) > r(t)]$, wherein $o(t)$ is an observation within the set of observations $O$, $\alpha(t)$ is an action within the set of actions $A$, and $r^*(t)$ is the optimal reward compared to all rewards in $\{r\}, \forall r \in \{r\} | P[r^* > r]$. For two actuators with actions $\alpha_1$ □ and $\alpha_2$, $\exists \alpha_1(t) \in U \land \exists \alpha_2(t) \in A$ maximum reward may be assigned by the processor by, for example, saving time. The sum of the reward of $r_1$ and $r_2$ at time t is larger than the sum of $r_1$ at time t and $r_2$ at time t+1, i.e., $(r_1+r_2)(t)|(\alpha_1+\alpha_2)(t) > r_1(t)+r_2(t+1)|(\alpha_1(t)+\alpha_2(t+1))$. For two observers, maximum reward may be assigned by the processor for, for example, useful information gain. This may be quantified by the processor using conditional entropy $H(O_1|O_2)=H(O_1|O_2)-H(O_1)+H(O_2)$, wherein the combination of observations $O_1$ and $O_2$ should reduce the entropy H of observation $O_1$ given its combination with observation $O_2$ for useful information gain. For example, the data captured from a sensor of a first robot and a sensor of a second robot may be combined with one another to produce a higher resolution image or portion of an image. In some embodiments, the DTC link may be terminated by the processor if the strength of the DTC link is below a predetermined threshold. In some embodiments, one goal is to form relationships that provide the most reward and hence have the strongest DTC links.

In some embodiments, a MDP may be used by the processor of a robot to learn with which robots a strong DTC link may be formed and hence with which robots may the most useful coalitions be formed. A MDP consists of a sequence of states and actions followed by rewards. For example, an action may be to combine sensor data from one robot with sensor data from a second robot. If the action of combining the sensor data results in readings with higher confidence level, a reward with greater value may be assigned as compared to the value of the reward assigned if the combination of sensor data results in readings with lower confidence level. A greater reward assigned by the processors of collaborating robots as a result of collaboration between the robots may translate to a stronger DTC link between the two. For example, the magnitude of a DTC link between an observer and actuator with an absolute value of one may signify a strong link and that the actions taken by the actuator given the observations from the observer generate maximum reward with a probability of one. In some embodiments, actions may be taken by a robot to transition from one state to another and after transitioning to each new state the processor may assign a reward to the robot. For two collaborating robots, for example, both may transition to a new state after taking an action to collaborate. The reward may be assigned to both collaborators by their respective processors in one embodiment or may be assigned to one robot by its processor and back propagated to the other robot. In some embodiments, the reward may be divided unevenly between collaborating robots.

In embodiments, a MDP includes a sequence of observed states s and actions a followed by rewards r, i.e., $s_t$, $\alpha_t$, $r_{t+1}$, $s_{t+1}$, $\alpha_{t+1}$, $r_{t+2}$, $s_{t+2}$, $\alpha_{t+2}$, $r_{t+3}$, ... $\alpha_T$, $r_T$, $s_T$. The goal of the robot is to maximize the net reward $R_T$ to be expected in the future. The net reward $R_T = r_{t+1} + \gamma^1 r_{t+2} + \ldots + \gamma^{T-t-1} r_T$ is the sum of the rewards received for the sequence of states and actions experienced beginning from state $s_t$ and ending with terminal state $s_T$, wherein $\gamma$ is a discount factor applied with value $0 \leq \gamma < 1$. In some embodiments, the processor may solve the MDP by using Q-learning, a method based on estimating the expected total net reward in the future of each state-action pair. In some embodiments, the expected net reward for the execution of a sequence of states and actions may be given by a state-action value function. In some embodiments, one goal is for the processor to find an optimal state-action value function by identifying the sequence of states and actions with highest net reward. Since multiple actions may be taken from each state, over time as the number of states experienced, actions, and transitions increase, a goal of the processor is to also find an optimal policy which includes the action from each state with highest reward value. The value of a state-action pair $Q(s,\alpha) = E[R_T|s_t=s, \alpha_t=\alpha]$, also known as the Q-function, may be defined as equivalent to the expected net reward $R_T$ for the sequence of states and actions beginning with state $s_t$ and action at and ending with terminal state $s_T$. By finding the sequence of states and actions which maximize the state-action value function $Q(s, \alpha)$, the processor may identify the optimal value function $Q^*(s, \alpha) = \max E[R_T|s_t=s, \alpha t=\alpha]$. In some embodiments, the processor may derive the optimal policy for each state $\pi^*(s) = \text{argmax } Q^*(s, \alpha)$ by identifying the highest valued action that may be taken from each state. To iteratively calculate the state-action value function for a given state s and action $\alpha$, the processor may apply the Bellman Optimality equation. The optimal value function obeys Bellman Optimality equation $Q^*(s, \alpha) = E[r + \gamma \max_\alpha Q^*(s', \alpha')]$. The equation expresses that the value for a given state s and action $\alpha$ is dependent on the current reward r observed at state s and the maximum discounted $\gamma$ future reward for the next state s' the robot would end up in. The processor may use the equation to iteratively determine the state-action value for a given state s and action $\alpha$ using $Q_{i+1}(s, \alpha) = E[r + \gamma \max Q_i(s', \alpha')]$ as the sequence of states and actions are executed, wherein i is the iteration number beginning at i=0, with $Q_0(s', \alpha')$ being initially guessed. In this particular context, the sequence of states and actions may correspond to the states visited and actions taken (e.g., collaborative actions or individual actions) during a work session or over some time period. Over time, as more states are visited and different actions from each state are evaluated by the processor, the system converges to find the most optimal action to take from each state thereby forming an optimal policy. Further, as different sequences of states and actions are evaluated over time, the system converges to the most optimal sequence of states and actions.

In some embodiments, the processor uses Hebbian Learning to measure the strength of the DTC link W using $W'(OA, AA) = W + \eta(R' - R)$, wherein W is the strength of the link before collaboration, W' is the strength of the link after collaboration, n is the learning rate, R' is the reward received as a result of collaboration and R is an integration of previous rewards or the expected reward had collaboration between robots not occurred.

In some embodiments, the processor of a robot determines a probability of termination of a DTC link using the Gittins index. In some embodiments, the Gittins index may be a value associated to the state of a stochastic process with a reward function and probability of termination. In some embodiments, the Gittins index may be a measure of the reward that may be achieved by a random process with a termination state and evolving from its present state, with the option of terminating the process at every later stage with the accrual of the probabilistic expected reward from that stage up to the termination state.

In some embodiments, there may be noise in the data of the observer and the action taken by the actuator. In some embodiments, the processor determines conditional entropy of two events $H(AA|OA) = \Sigma_{ij} p(OA_i, AA_j) \log p(OA_i)/p(OA_i, AA_j)$, wherein $p(OA_i, AA_j)$ is the probability that $AA=AA_j$ and $Y=OA_i$. The entropy may be interpreted as the amount of randomness in the outcome of the action executed by the actuator based on the sensory input provided by the observer. For example, there may be a chance that the observation of the observer is the wrong observation or that the action taken by the actuator is not executed as expected. Therefore, in some embodiments, the processor determines a probability $$P(AA|OA) = \frac{P(OA|AA)P(AA)}{P(OA)}$$

for the accuracy of observation of the observer (OA) and the action of the actuator (AA) when determining the expected reward. P(OA|AA) is the probability of the observer making an observation given that the actuator executes a particular action, P(AA) is the probability of the actuator taking a particular action independent of the observation, and P(OA) is the probability of the observer having made an observation.

In some embodiments, the processor balances exploration of new DTC links and exploitation of existing DTC links. For example, actuators may be encouraged to find better sources of information, such as robots with better sensors or ideally positioned sensors, and observers may be encouraged to find actuators that have better use of their information. In some embodiments, the processor uses a regret analysis when determining exploration or exploitation. For example, the processor may determine a regret function $$\rho = T\mu^* - \sum_{t=1}^{T} r_t$$

which is the difference between the reward sum associated with an optimal policy and the sum of the collected rewards, wherein ρ is the regret after T rounds, $r_t$ is the reward in round t, and μ* is the maximum reward mean. In some embodiments, the processor minimizes the regret by defining a cost $$C(w, b) \equiv \frac{1}{2n}\sum_{x} \|y(x) - a\|^2,$$

function, for example and minimizing the cost function using gradient descent. In this way, at each state, the processor chooses a policy that has a state-action value function at least equal to the previous state. In some embodiments, the processor uses a multi-armed bandit model wherein in a finite and countable state space and action space, the strategy is based on starting the sampling process on a uniform basis over a set of available actions and progressively focuses on the best actions according to previously observed rewards. Given k arms, n rounds with n≥k, and unknown probability distributions P(R|α) for each action, the processor chooses action $a_t \in \{1, 2, \ldots, k\}$ and provides reward $R_t$ according to P(R|α). Given Q(α)=E [R|α], one goal is to maximize the cumulative reward while equivalently minimizing the regret function $\rho = \Sigma_t(Q^* - Q(\alpha_t))$. The regret function quantifies the exploration and exploitation dilemma of a multi-armed bandit problem in the search for the most optimal connections. In fact, regret is an integration of all small unearned rewards. Therefore, the data type is the same as the reward which is a multivariate function. In some cases, the processor solves the squared error of the cost function using stochastic gradient descent to minimize the regret. This ensures at each state a policy that has a value function at least equal to the previous state is chosen.

In some embodiments, the processor uses Monte Carlo Tree Search (MCTS) to maximize the reward. MCTS uses a statistics tree comprised of nodes connected by branches wherein value of nodes are given. Nodes of highest value are of top priority. Nodes may represent different states. The tree begins at the root node, then connects to child nodes and further onwards leaf nodes. The path from the root to a leaf node may represent, for example, states visited and actions taken to transition between states. There are four main steps in MCTS comprising selection, expansion, play-out, and backpropagation. In some embodiments, the processor may iteratively choose different paths and determine associated rewards. In some embodiments, the processor may use Lehmer random number generator to randomize actions chosen. In some embodiments, the processor may backpropagate the result of each path in the tree to reflect the outcome of the actions taken. In some embodiments, the processor may simulate possible actions from a state and choose the action that results in a reward equal to or greater than the previous states.

In some embodiments, collaborative robots may have active or passive status, wherein during active status the transmitter of the robot may broadcast its presence and capabilities to other robots and during passive status the receiver of the robot may monitor broadcasts while the transmitter responds to broadcasts from other robots. In some embodiments, active and passive statuses are not mutex. For example, robots may alternate between active and passive statuses, wherein robots may be active or passive at different times or robots may become active when DTC links weaken or robots may become passive or active depending on the number of DTC links that have been formed. In some embodiments, active and passive mat have different statuses for in-bound DTC links and out-bound DTC links. In some embodiments, there may be a maximum number of links set. In some embodiments, there may be a threshold from which point on the robot transitions from active to passive.

In some embodiments, information shared between processors of robots may be time stamped and contain a header with an identifier of the robot sharing the information. In some instances, wherein the information is passed between processors of multiple robots, the processor of each robot sharing the information may add their identifier to the header. This may be used to prevent information looping, wherein the processor of a robot may disregard incoming information if the header contains their identifier. In some embodiments, processors of intermediary robots may be bypassed. For example, the processor of an actuator robot connected to a processor of an observer robot directly and also indirectly through a processor of an intermediary observer robot may discard the indirect connection with the intermediary observer robot. As a further example, a processor of an actuator robot connected indirectly to a processor of a first observer robot through the processor of an intermediary second observer robot may initiate a broadcast and request direct connection to the processor of the first observer robot in instances where, for example, the processor of the actuator robot is often receiving useful information from the processor of the first observer robot.

In some embodiments, the processor of the robot may keep track of the other robots within their vicinity or with which a DTC link is established, including information on the model, type, functionality, capability, role, status, operating system, security privileges, and approximate proximity of the other robots. In some embodiments, robots may be distributed over a network, such as a network in the cloud, wherein robots may be present at various locations. In such cases of remote collaboration, the processor may account for parameters such as latency. For example, latency may be considered when using satellite images to locate a moving vehicle. In some embodiments, there may be a threshold latency time after which the processor may render the information useless.

In some embodiments, as multiple robots interact with each other, the processor of each robot may establish a different level of trust with each robot it may interact with. In some embodiments, the level of trust may increase or decrease with each interaction depending on the outcome of the interaction. In some embodiments, information shared with the processor of a robot may be ranked at different levels of priority depending on the source of the information, the type of information, and the level of trust established with the source at the time. For example, a processor of a robot receiving information from processors of multiple robots may rank the priority of information received based on the level of trust established with each robot. As a further example, a processor of a robot receiving conflicting information from processors of two separate robots may give higher priority and importance to the information received from the processor of the robot with higher level of trust.

In some embodiments, processors of robots collaborate to generate a map of the environment, localize themselves within the environment, and make decisions (e.g., tasks to be assigned to each robot based on factors such as battery level, physical characteristics such as size, specifications such as maximum speed, functional capabilities, etc.). In some embodiments, the simultaneous collaboration, localization, and mapping is otherwise known as Quantum SLAM. For example, consider the environment of robotic vacuums K and L represented by a grid world and described by a m×n matrix G comprising all state spaces available to the robotic vacuums. In a two-dimensional world, each entry of the matrix may represent a cell of the grid world and have a value (x, y). Robotic vacuum K may be considered an observer while robotic vacuum L may be considered an actuator. Robotic vacuums K and L may understand the environment based on environment matrices $G_k$ and $G_L$, respectively. Coverage matrices $C_k$ and $C_L$ may correspond to environment matrices $G_k$ and $G_L$, respectively, and may be used to indicate coverage of the environment. Each entry of a coverage matrix C may correspond to an entry of an environment matrix G such that each time a cell of the environment in matrix G is covered, a corresponding entry in the coverage matrix C is increased by a value of 1, with all entries of the coverage matrix initially having a value of 0. As such, the coverage matrices may allow the processors of the robotic vacuums to keep track of covered areas of the environment. Initially, each robotic vacuum may begin cleaning the environment individually. At some point, robotic vacuums K and L may meet and establish a DTC link such that the processor of robotic vacuum K, the observer, may share its coverage matrix $C_k$ with the processor of robotic vacuum L, the actuator. The processor of robotic vacuum L may convolve coverage matrices $C_k$ and $C_L$ to combine areas already covered by both robotic vacuums. Since this is an example of cooperative game theory, the processor of robotic vacuum L may devise a policy that distributes coverage of the remaining uncovered cells among the two robotic vacuums considering the maximum reward it may receive itself and the maximum reward it may leave for robotic vacuum K to collect. In some embodiments, wherein the DTC is a two-way link between robots, messages may be exchanged back and forth to ensure the reward function, accounting for the reward received by both robots, is maximized. The uncovered cells of the environment, when divided for coverage by robotic vacuums K and L, may reduce cleaning time of the environment and thereby increase the reward received, assuming the reward is dependent on cleaning time. Further, if total cleaning time of the environment is reduced as a result of collaboration with robotic vacuum K, the processor of robotic vacuum L may reinforce the measure of strength of the DTC link with robotic vacuum K. In some embodiments, wherein non-cooperative game theory is applied and the processors of robotic vacuums K and L each attempt to maximize their own reward individually at the expense of one another, Nash equilibrium may apply. When each robotic vacuum has chosen a strategy and no robotic vacuums can benefit by changing strategies while all other robotic vacuums keep their strategies unchanged, then the current set of strategies and corresponding payoffs constitute a Nash equilibrium. For example, robotic vacuums K and L are in Nash equilibrium if the processor of robotic vacuum K chooses the best strategy to execute for coverage of the environment, taking into account the policy chosen by the processor of robotic vacuum L and the processor of robotic vacuum L chooses the best policy to execute for coverage of the environment, taking into account the strategy chosen by the processor of robotic vacuum K. Since our case is an instance of cooperative Game Theory, the processor of robotic vacuum L may calculate a heuristic policy, calculating the path of robotic vacuum K from its current location to its base location (as well as its own path) and devises a policy that distributes the remaining work among them considering that maximum reward it would get and the maximum reward it would leave for robotic vacuum K to collect. If this was a two-way link, the processors of both robots may exchange a few messages to achieve arg max $(R_L+R_K)$, wherein $R_L$, $R_K$ are the rewards. If robotic vacuum L finishes the task earlier, thus receiving a reward with less cost (i.e., time is a penalty), it reinforces its link to robotic vacuum K with a W factor (Hebbian Learning) proportional to the probability of earning more rewards the next round. In in this example robotic surface cleaners collaborate to cover an area for cleaning more efficiently by dividing the surface area for cleaning and avoiding repeat coverage by sharing their respective coverage matrices. This same example may be applied to various types of collaborating robots.

For two or more robots, the problem of reinforcement learning (RL) may become more complex. In some embodiments, RL such as Q-learning, may be combined with deep learning (DL). RL may be used to define the objectives while DL may learn the complex representations to achieve such objectives. DL is a general framework for learning the representation of complex models and may be composed of linear transformations, convolution operations, non-linear activation functions, such as ReLU, and loss functions such as, mean square error (MSE) and log likelihood. The combination of RL and DL may be known as Deep Reinforcement Learning (DRL). In instances wherein Q-learning is used, the process may be known as Deep Q-learning (DQL) wherein deep neural networks represent the state-action value function (or Q-function) Q(s, a; w). For example, a Deep Q-Network (DQN) may be a combination of a convolutional neural network (CNN) for learning feature representations with Q-learning algorithm. The DQN may represent the state-action value function Q(s, a; w) wherein w is the network parameters. Given that the optimal value function $Q^*(s, \alpha; w) = E[r+\gamma \max Q^*(s', \alpha'; w')]$ obeys Bellman Optimality equation, a loss function $L(w)=[r+\gamma \max Q^*(s', \alpha'; w')-Q(s, \alpha; w)]^2$ may be defined. In some embodiments, the processor minimizes the MSE of the loss function L(w) by gradient descent in the DQN to find the optimal state-action value function. In some embodiments, the processor uses a separate target network with parameters w', as above, m in estimating the maximum state-action value function. In some embodiments, the processor balances exploitation of current optimal policy and exploration of potentially better policies by employing a greedy approach that ensures the processor samples a random action some percentage of the time. To avoid suboptimal connections resulting from randomly generated events the processor may terminate some connections and for each terminated connection may redistribute its weight to other intact random connections. In some embodiments, the processor may use experience replay wherein all experiences (s, α, r, s') may be stored in a replay memory and random mini-batches from the replay memory may be used instead of the most recent transition when training the network. This provides stability as RL may be unstable when a nonlinear function, such as a neural network, is used to approximate the value function.

Figure 3:
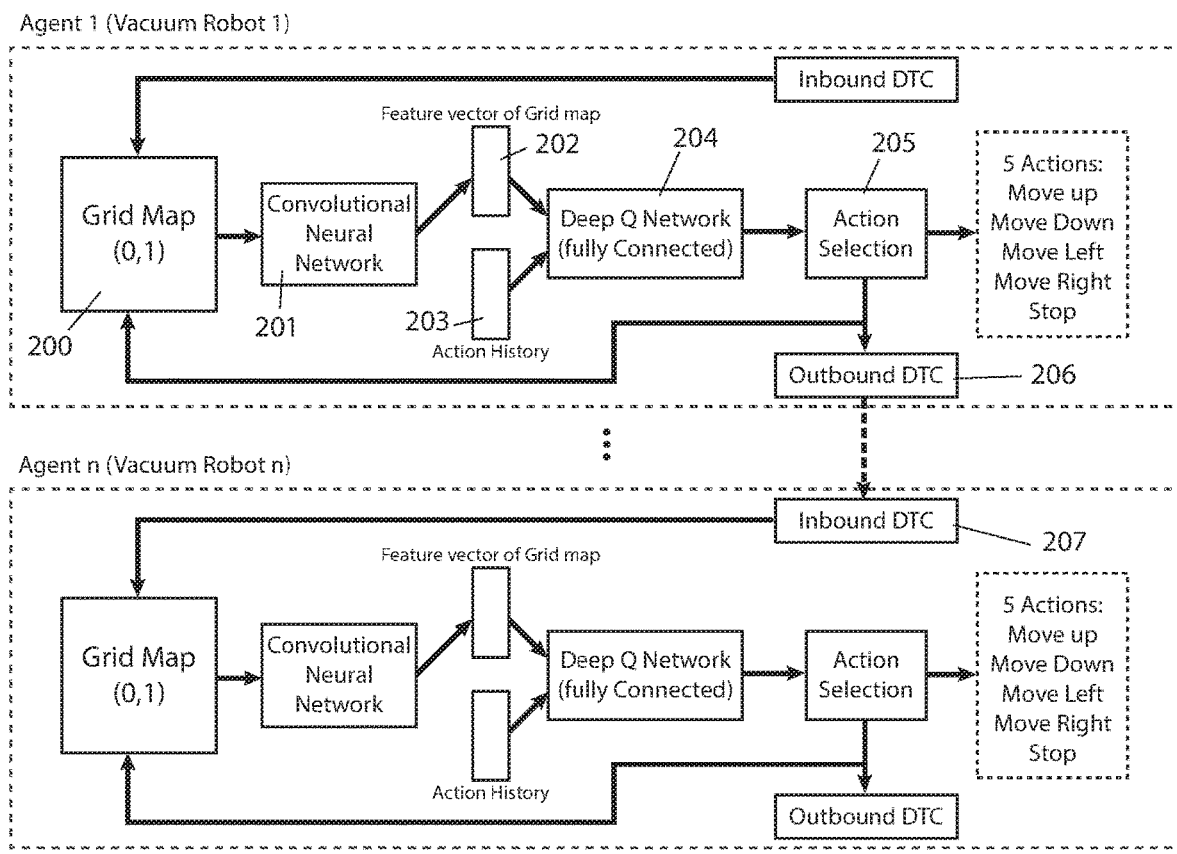
FIG. 3 illustrates an example of a Deep Collaborative Reinforcement Learning framework, according to some embodiments.

In some embodiments, processors of robots use a Deep Collaborative Reinforcement Learning framework for collaborative intelligence, the framework being a combination of a deep convolutional neural network (CNN), a deep Q-network (DQN), and a reward function for action and communication selection. For example, for collaborative robotic vacuums, the input to a CNN by may be a grid map in the form of a two-dimensional array wherein each entry of the array corresponds with a cell of the grid map and an entry having a value of one indicates coverage of the cell while a value of zero indicates no coverage of the cell. The output of the CNN may be merged with a feature of action history and used as input to a DQN. The output of the DQN may be possible actions of the robotic vacuum, such as, move forward, move backward, move right, move left, and stop. Followed by each action, the processor may update the grid map and may share the updated information with processors of at least some cooperative robots. FIG. 3 illustrates an example of a Deep Collaborative Reinforcement Learning framework used by processors of robotic vacuums, as in the example described above, wherein grid map 300 is provided as input into CNN 301. Output feature vector of grid map 302 and action history 303 are provided as input into DQN 304 which outputs action 305. Action 305 is passed to outbound DTC 306 which may then be shared with processors of collaborating robots receiving the information through an inbound DTC, such as inbound DTC 307, to update their grid map accordingly. In some embodiments, the grid map (with values of zero and one for uncovered and covered cells, respectively) provided as input into the CNN is in the form of a 2D input array. In some embodiments, the CNN architecture includes a cascade of convolutions and ReLU functions. For example, the basic architecture used for the CNN may include: a first layer that convolves 32 filters of 8×8 with a stride of 4 and applies a ReLU activation function; a second layer that convolves 64 filters of 4×4 with a stride of 2 and a applies ReLU activation function; and a third layer that convolves 64 filters of 3×3 with a stride of 1 and applies a ReLU activation function. In some embodiments, the DQN architecture includes two fully connected layers which map the input feature map to the output actions, the first layer including a fully-connected layer consisting of 512 rectifier units and the second layer including a fully-connected linear layer with a single output for each valid action (e.g., a total of 5 outputs). In some embodiments, the reward function may be proportional to the whole area that has been covered by the robots. In some instances, a goal of collaboration is to cover an area in the shortest time. For the example of collaborative robotic vacuums described above, the reward function may be based on the total area covered and the total time. To consider both factors in the reward function the processor of a robotic vacuum may assign a reward of one when the robot finishes operation in a cell and negative one when it operates in a cell that has already been cleaned. In some embodiments, the processor incorporates the reward function in a reinforcement learning setting to learn a covering policy, based on the DQN algorithm. In some embodiments, the reward function used by the DQN may be based on various factors depending on the desired goals of the collaborative robots. In some embodiments, different CNN and/or DON configurations may be used. In some embodiments, modifications in the model may be made to fit temporal difference learning and Q-learning, depending on the real-world applications of the collaborative robots.

In some embodiments, the processor of a robot may train the neural network comprised of a CNN and DQN using Q-learning to learn a policy that maximizes future expected reward as described above. For example, for robotic surface cleaning devices, input into the network may be a feature map in the form of a two-dimensional array and the output Q-values for each possible action. The network may then decide the best action to execute based on the Q-value for each possible action. In some embodiments, the network may be trained millions of times (or another number of times) via Q-learning to maximize the future expected reward. In some embodiments, Q-values may be any real values that the processor may optimize with simple squared error loss $L(w)=[r+\gamma m\alpha, Q(s', u'; w')-Q(s, u; w)]^2$ using backpropagation. In some embodiments, given a transition (s, u, r, s'), backpropagation includes providing a feed forward pass for the current state s to get predicted Q-value Q(s, a; w) for all actions, providing a feed forward pass for the next state s' to calculate the maximum overall network output max Q*(s', α'; w'), setting the Q-value target for the corresponding action to r+γ max Q*(s', α'; w'), setting, for all other actions, the Q-value target to the predicted Q-value Q(s, α; w), thereby making the loss zero for those outputs, and updating the weights of the network using back propagation.

Figure 4:
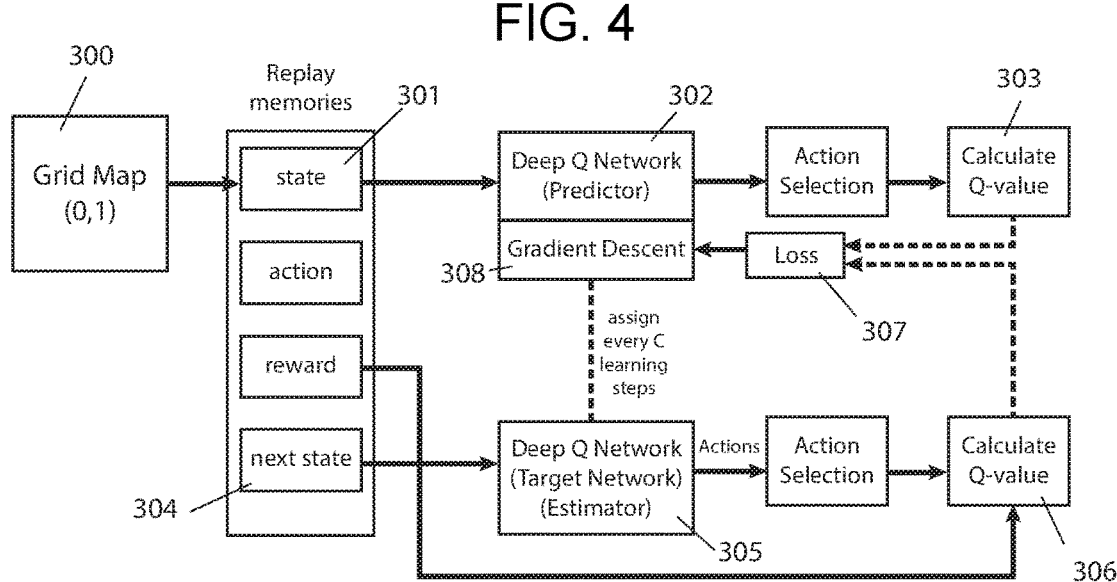
FIG. 4 illustrates an example of a method for training a single DQN of a cleaning robot, according to some embodiments.
Figure 5:
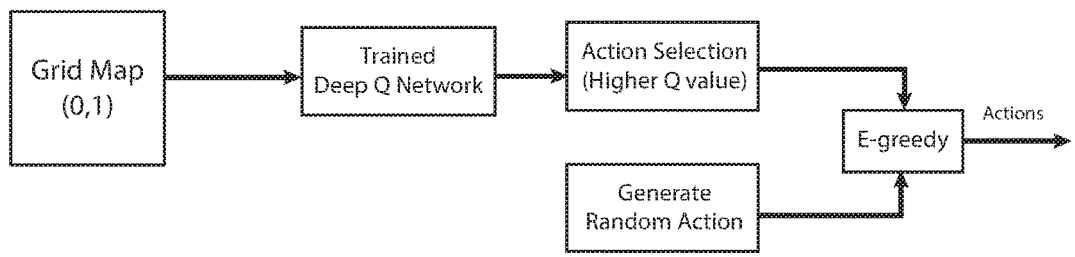
FIG. 5 illustrates a flowchart describing testing of a single cleaning robot, according to some embodiments.

In some embodiments, the processor of a robot employs experience replay wherein all experiences (s, α, r, s') may be stored in a replay memory and random mini-batches from the replay memory may be used by the processor instead of the most recent transition when training the network. This provides stability as RL may be unstable when a nonlinear function, such as a neural network, is used to approximate the value function. FIG. 4 illustrates a schematic of an embodiment of a method used by a processor for training a single surface cleaning robot. Grid map 400 is provided as input to the network. Current state 401 is provided to DQN 402 and predicted Q-value 403 is determined for a selected action. Next state 404 is provided to DON 405 to determine the maximum overall network output max Q*(s', α'; w') and set Q-value target 406 for the corresponding action to r+γ max Q*(s', α'; w'). Based on loss 407 between target Q-value 406 and predicted Q-value 403, the processor uses gradient descent 408 to minimize the loss and hence optimize the actions of the robot over time. FIG. 5 illustrates a flowchart describing testing of a trained network of a single surface cleaning robot, wherein a grid map is provided as input into a trained DQN and an action selection is provided as output from the DQN. A random action generator simultaneously outputs a random action. Both the action selected by the DQN and the random action from the random action generator are provided as input into a greedy algorithm that chooses either the action output from the DQN or the random action. This allows for a balance between exploration and exploitation.

Figure 6:
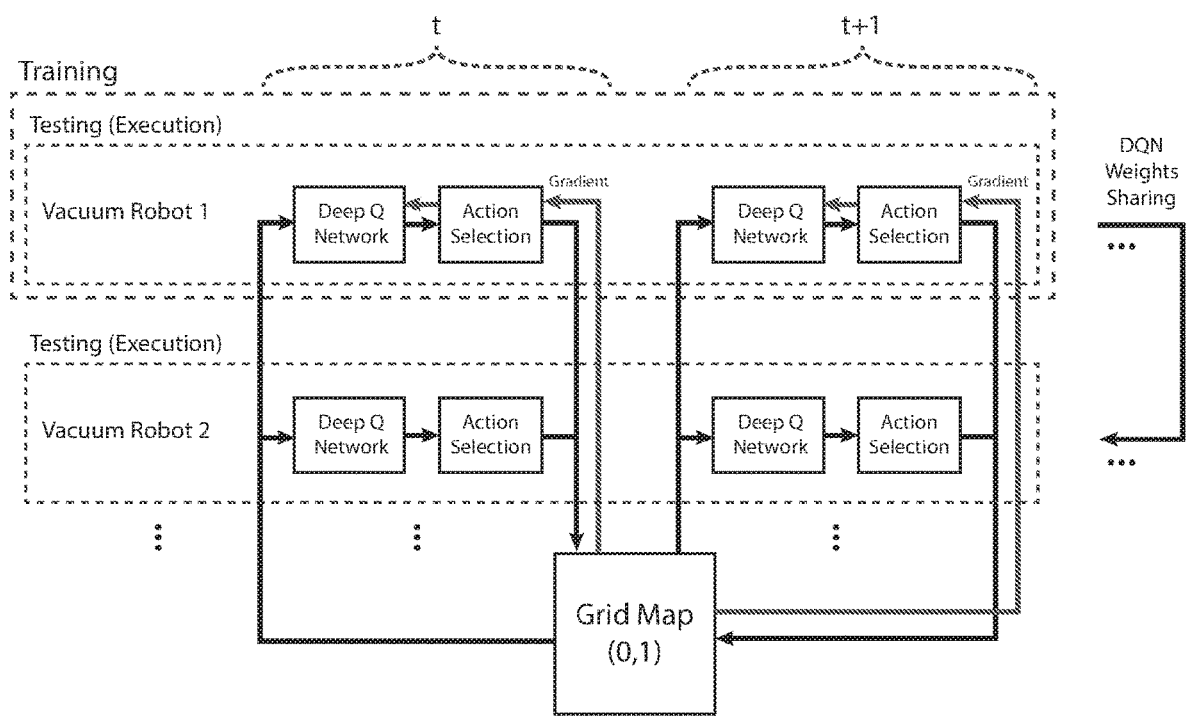
FIG. 6 illustrates an example of decentralized learning for collaborating robots, according to some embodiments.
Figure 7:
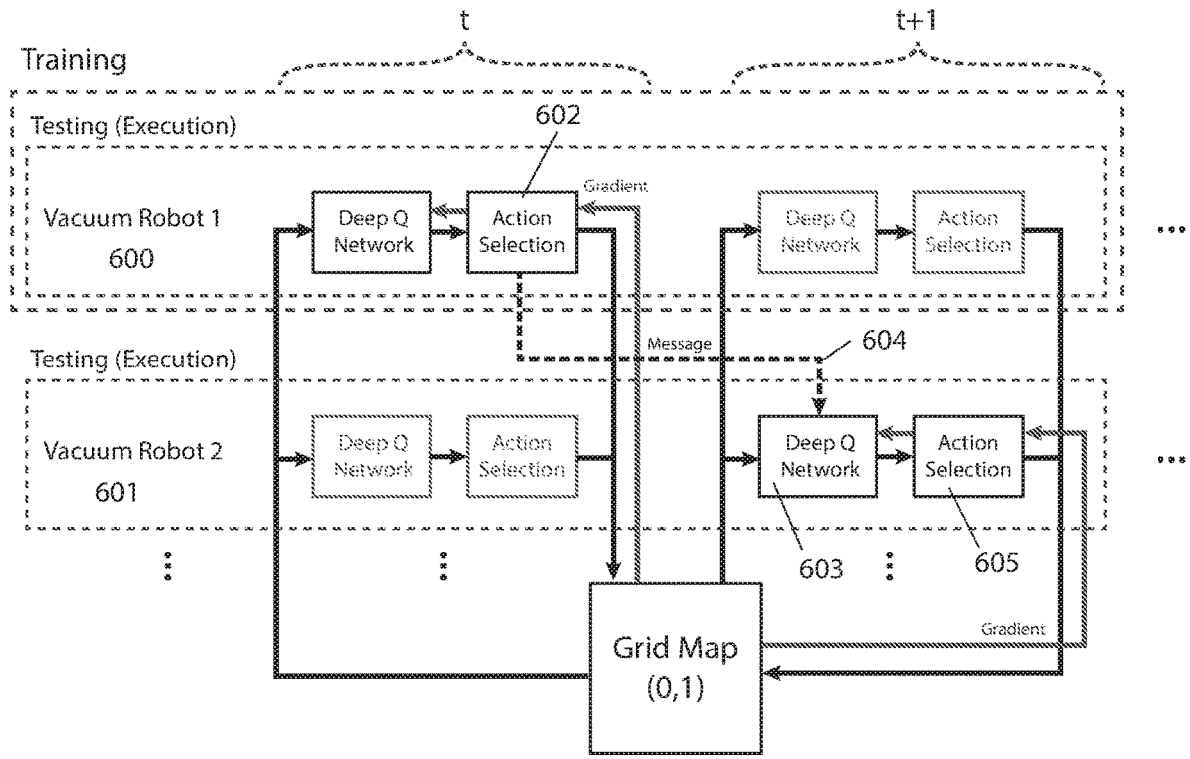
FIG. 7 illustrates an example of decentralized learning for collaborating robots, according to some embodiments.

In some embodiments, decentralized learning may be used wherein the processor of each robot learns its own Q-network parameters, treating the other robots as part of the environment, thereby using the environment as the sole source of interaction between robots. In this case, message passing is accomplished using DTC links to share information. In some embodiments, the processor of a robot trains a single network (e.g., its own network) and shares the parameters with processors of other robots. However, execution remains decentralized, at which point processors of robots receive different observations leading to different behavior. For example, processors of two floor cleaning robots may share grid map information through a DTC link. Followed by each action, the processor of each robot may update their grid map and share their updated grip map with the processor of the collaborating robot. At the same time, only the processor of one robot is training its DQN and sharing the DQN weights with the processor of the other robot while processors of both robots are testing their own DQN. In some embodiments, decentralized learning for covering areas (e.g., operating in areas) within a map may be beneficial as only one DQN needs to be trained for coverage areas within the map which makes the training faster and less complicated, and the number of collaborative robots is not required wherein at execution time any number of robots may be collaborated for coverage of areas within the map. FIG. 6 illustrates an example of decentralized learning of a single DQN of a robotic vacuum, wherein the network of the first robotic vacuum is being trained and its DQN weights are shared with the processor of a second robotic vacuum. Processors of the first and second robotic vacuums update their grid map after each action and share their respective grid map information with each other. In such an approach execution is decentralized, processors of collaborating robots receive different observations leading to different behaviors. FIG. 7 illustrates another example of decentralized learning of a DQN, wherein processors of two collaborating robotic vacuums, 700 and 701, each learn their own network parameters. The processor of robotic vacuum 700 may share its action selection 702 with the processor, and hence DQN 703, of robotic vacuum 701 as indicated by arrow 704. The processor of robotic vacuum 701 may receive the action of robotic vacuum 700 as input into its DQN 703 and consider it in deciding action 704. In this approach, the processor of each robot learns its own Q-network parameters, treating the other robots as part of the environment. In this case, message passing is accomplished using DTC links to share information. Followed by each action, the processor of each robot updates its respective grid map and shares the information with the processors of cooperative robots. In this approach, the execution remains decentralized, at which point the processors of robots receive different observations leading to different behaviors.

Figure 8:
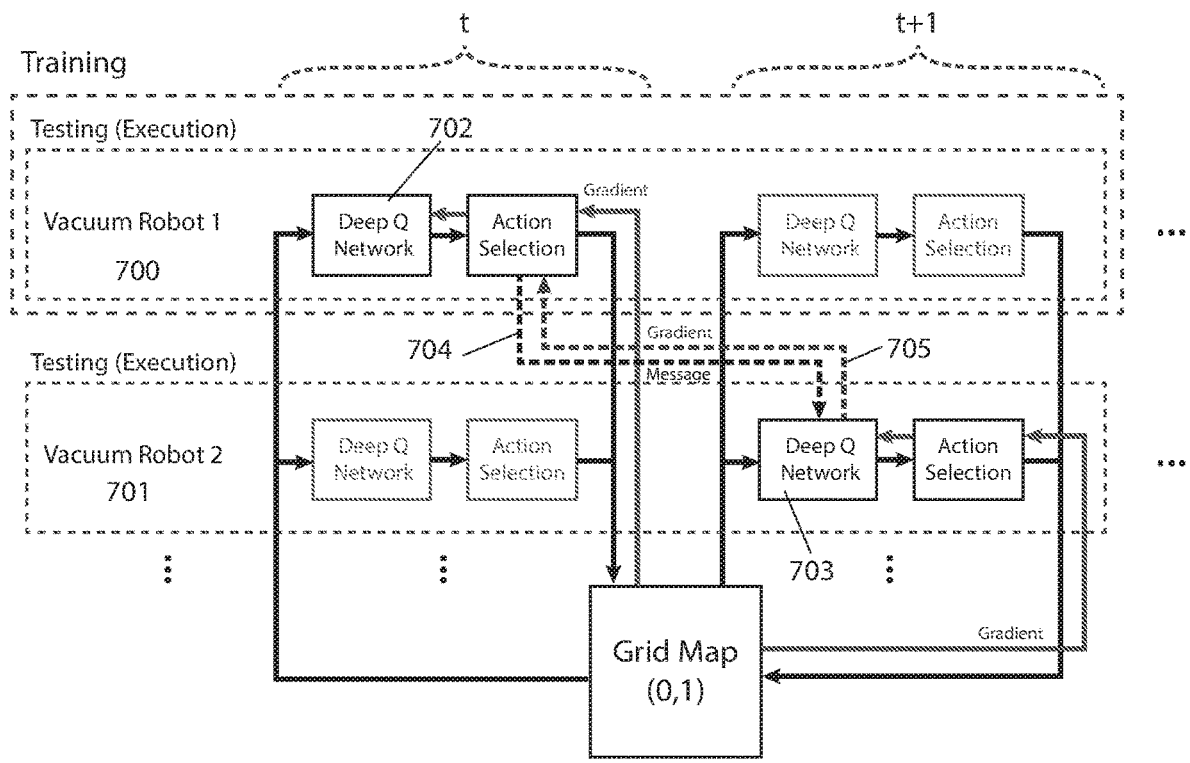
FIG. 8 illustrates an example of centralized learning for collaborating robots, according to some embodiments.

In some embodiments, the processor of a robot may use centralized learning wherein information may be passed between processors of robots. As a result, gradients may be pushed through DTC links, yielding a system that is end-to-end trainable, even across robots. For example, for each robot a, one Q-network $Q(s^\alpha, u^\alpha; w^\alpha)$ is instantiated. In the setting of multi-robot RL, processors of robots may use a Q-function that facilitates inter-robot communication $Q(s^\alpha, u^\alpha im^\alpha om^\alpha; w^\alpha)$ wherein $im^\alpha$ and $om^\alpha$ denote inbound messages and outbound messages for robot α, respectively, through a DTC link. In each time-step, the processors of robots select an environment action $u \in U$ that affects the environment, and a communication action $m \in M$ that is observed by other robots but has no direct impact on the environment or reward. FIG. 8 illustrates an example of centralized learning for multiple collaborative robots. In this approach, processors of robots may pass messages between one another during learning. As such, gradients may be pushed through DTC links, yielding a system that is end-to-end trainable across robots. In some embodiments, real-valued messages are discretized by the processors during execution and mapped to the discrete set of communication actions allowed by the task. FIG. 8 illustrates an example of centralized learning between two collaborating robotic vacuums 800 and 801. DQN 802 of robotic vacuum 800 may pass messages to DQN 803 of robotic vacuum 801 during learning, via their respective processors, through a DTC link as indicated by arrow 804. The gradient may also be passed from DQN 803 of robotic vacuum 801 to DQN 802 of robotic vacuum 800 as indicated by arrow 805, allowing for a system that is trainable across robots.

In one example, a hierarchical approach employing decentralized training may be used by processors of surface cleaning robots to collaboratively clean all areas within the map of the environment. In this approach, a model may be trained (e.g., by an external processor or a processor of one or more robots) for cleaning a map with size of 10×10. At execution time, processors of robots may use the trained model for cleaning a map with size of 100×100. In other embodiments, the model may be used for cleaning a map with any size. In some embodiments, the hierarchical approach employing decentralized training includes: 1) training a DQN on a 10×10 map, which may be efficient in terms of time and complexity, 2) applying the trained DQN to a larger map size such as 100×100, without training for a large map size, and 3) training of the DQN for a single robotic vacuum, while testing of the DQN may be done for multiple collaborative robotic vacuums. In some embodiments, the hierarchical method is composed of two layers. In the first layer, a virtual map (VMap) with size of 10×10 and virtual robotic vacuums are defined. In the second layer, the real large map (LMap) with size of 100×100 and actual robotic vacuums are defined. In some embodiments, the actual robots move in the LMap based on 1) the movement of the robots of the first layer and 2) their own DQN network. In some embodiments, the LMap may be considered as 100 small maps (SMap) with size of 10×10. In some embodiments, each SMap in the LMap may be equivalent to one cell in the VMap of the first layer. In some embodiments, the VMap (with size 10×10) may be considered as a low-resolution version of the LMap (with size 100×100) and each cell in the VMap may be equivalent to a 10×10 block in the LMap. In some embodiments, the DQN for cleaning of the VMap is initially executed for virtual robotic vacuums. In some embodiments, the trained DQN of a single robot on a 10×10 map is used. In some embodiments, the output of the executed DQN for cleaning of the VMap in the first layer are the cleaning paths (and hence cells covered) of all virtual robotic vacuums. In some embodiments, these cleaning paths indicate how the actual robotic vacuums should move in the LMap of the second layer and which SMap should be cleaned by each robot. For example, if a virtual robot 1 cleans locations (2,3), (3,3), (3,4), etc. in the VMap, the actual robot 1 should clean SMaps at locations (2,3), (3,3), (3,4), etc. in the LMap, respectively. In some embodiments, in the second layer, for each SMap, the DQN for each actual robotic vacuum is executed to clean the Lmap. In some embodiments, at the second layer, each SMap is cleaned by only one of the actual robots, while the whole LMap is cleaned by all the actual robots. Therefore, in some embodiments, the first layer indicates which blocks of the second layer should be cleaned by each robot.

In some embodiments, decentralized learning with a single DQN may be used in the training and testing (execution) phases, as described above. In some embodiments, the single DQN may be trained (e.g., by the processor of a robot or an external processor) using a map with size of 10×10, and then in the testing phase, the trained network may be used by processors of collaborative robotic vacuums for cleaning a map with size of 100×100. In other embodiments, other sizes of maps may be used. In the training phase, the processor of a single robotic vacuum may use a single DQN for cleaning of a map with size of 10×10. In some embodiments, 'VacuumRobot' and 'Environment' classes may be used to define a robotic vacuum and a map with size of 10×10, respectively. Followed by the training, the training weights that may be used by processors of robotic vacuums for cleaning of a new map are obtained. In the testing phase, the trained DQN may be used by processors of multiple robotic vacuums for cleaning of a new map. In this approach, the single trained DQN may be used and its parameters shared among processors of all robotic vacuums. In some embodiments, a list of objects may be defined from the 'VacuumRobot' class to represent the collaborative robotic vacuums and the 'Environment' class may be used to define a map with size of 100×100.

Figure 9:
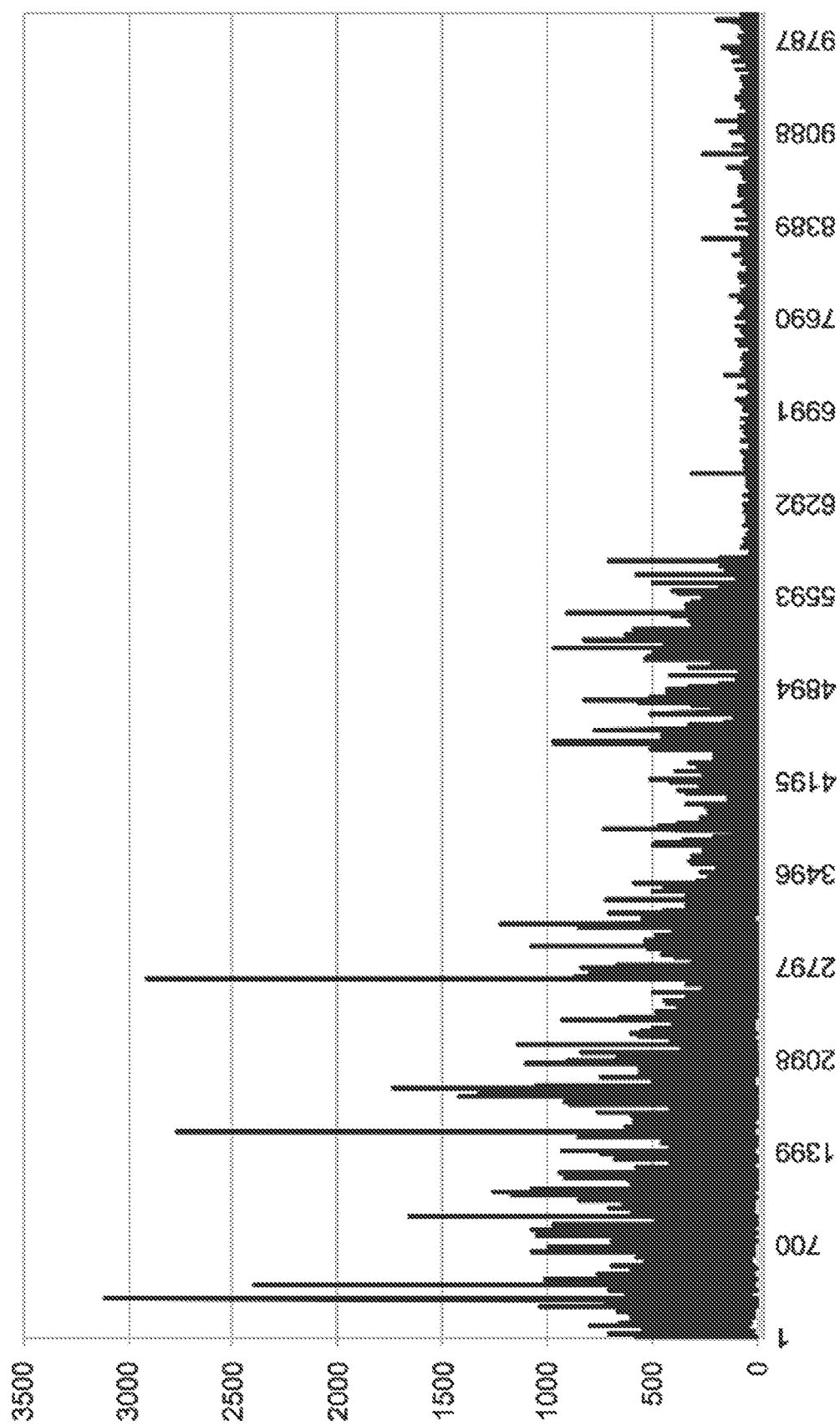
FIG. 9 illustrates the total movements of a robot during cleaning for consecutive episodes while training a DQN.

In one example, a single robotic vacuum and one-dimensional environment are initially defined. In this case, there are two types of movement for the robot: left or right. A class for the robot and a class for the environment are defined. The environment is defined as a one-dimensional vector with three possible values, including 0 (uncleaned cell), 1 (cleaned cell) and 2 (robot location). The DQN is defined with a two layer fully connected network (512 rectifier units and 2 nodes). A target network (i.e., estimator) and predictor network are implemented in the DQN and memory function to remember the previous states, actions, and replay. The environment is expanded from one dimension to two dimensions by extending the DQN from two movements to four movements (left, right, up, down) by adding CNN layers to the DQN. The convolutional layers include convolutional filters and activation functions. The convolutional filters extract features from the input map while the activation functions perform nonlinear mapping. The configuration of the deep network (CNN and DQN) is extended by changing the number of filters and layers. A network with five layers (three convolutional layers and two fully connected layers) is used. The first, second, and third convolutional layers include 32 (size of 8×8), 64 (size of 4×4) and 128 (size of 3×3) filters, respectively. The two fully connected layers include 512 rectifier units and 4 nodes. Modules for saving and loading of the model of the DQN are implemented. A module for graphical visualization of robotic vacuums in the environment is used. FIG. 9 illustrates the results of training the DQN described in this example for a 3×3 map and a single robotic vacuum. However, the DQN uses three layers instead of five and the input filter size is reduced from 8×8 to 3×3. FIG. 9 illustrates the total movements of the robot for cleaning the map (vertical axis) versus episode number (horizontal axis). At the beginning of the training, a large number of movements were needed (on average 300 movements) while after around 6000 episodes of training, on average, 15 movements were needed for cleaning of the map with size 3×3. Therefore, using 6000 episodes, the DQN may be trained.

Figure 10:
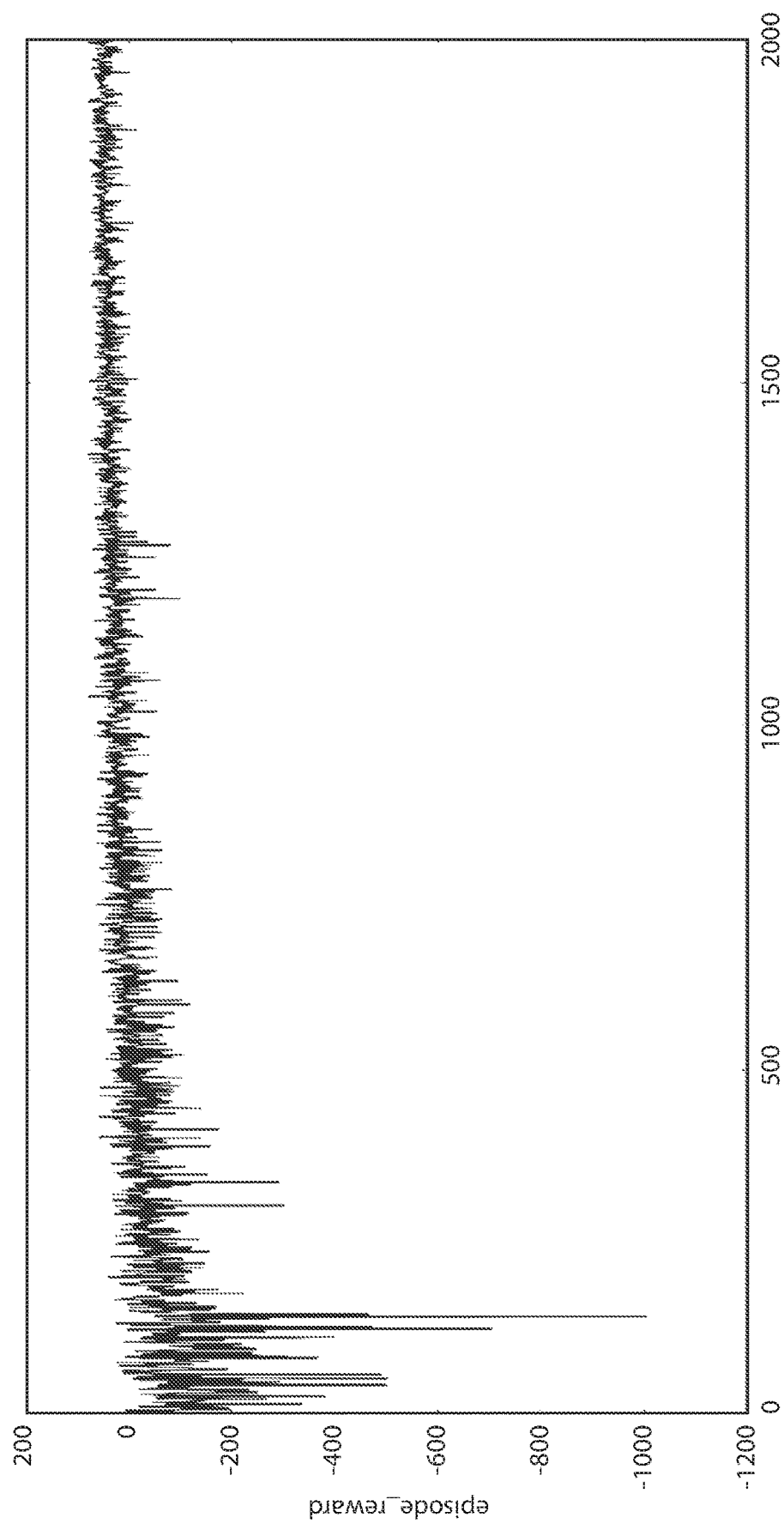
FIG. 10 illustrates a graph of episode reward for consecutive episodes resulting from training of a Kers-rl based DQN.

In another example, a modified Keras-rl library is integrated into the DQN. In the 'Environment' class a map size of 84×84 is used. A reward function assigning a reward of one when the robot cleans an uncleaned cell and negative one when the robot cleans a cleaned cell is implemented. In the Keras-rl library, a main module which has a fit function for training and also network model definition is used and the input channel of the DQN is changed from 3 channels to 1 channel to be the same as the map. The fit function is used for training of the network. Since the map is large, training may be slow, therefore in this example training is treated as complete when 100 cells are cleaned. This means the robot only cleans a part of the whole map (100 cells instead of the 7056 cells) at each episode. The DQN includes 5 layers (three convolutional layers and two fully connected layers). The size of the three convolutional filters are 8×8, 4×4 and 3×3 with 32, 64, and 64 filters, respectively. The fully connected layers include 512 rectifier units and 4 nodes, for four movements. The size of the input to the network is 84×84 (the map size). The Keras-rl based network is trained for one robot to clean a part of a map (100 cells of a 84×84 size map). The DQN was trained for 2000 episodes. FIG. 10 illustrates the graph of episode reward (vertical axis) versus episode number (horizontal axis) while training the Kers-rl based DQN described in this example. In this example, for an episode, the maximum reward that a robot could achieve was 100 since there are 100 cells to clean, while the minimum reward could be any value less than 100. FIG. 10 shows that the DQN network of the robotic vacuum learned to clean the map efficiently. At the beginning of the training, the episode reward was negative (on average−100), meaning that an average of 300 movements were needed to clean 100 cells in one episode. By increasing the training steps, the reward became positive, and at the end of training the episode reward was 50 on average, meaning that 150 movements were needed to clean 100 cells in one episode. At the beginning of the training, the robot cleaned previously cleaned cells multiple times resulting in a reward of negative one each time a cleaned cell was cleaned and a total negative reward for an episode. However, after several training episodes, the robot learned to only clean uncleaned cells.

Figure 11:
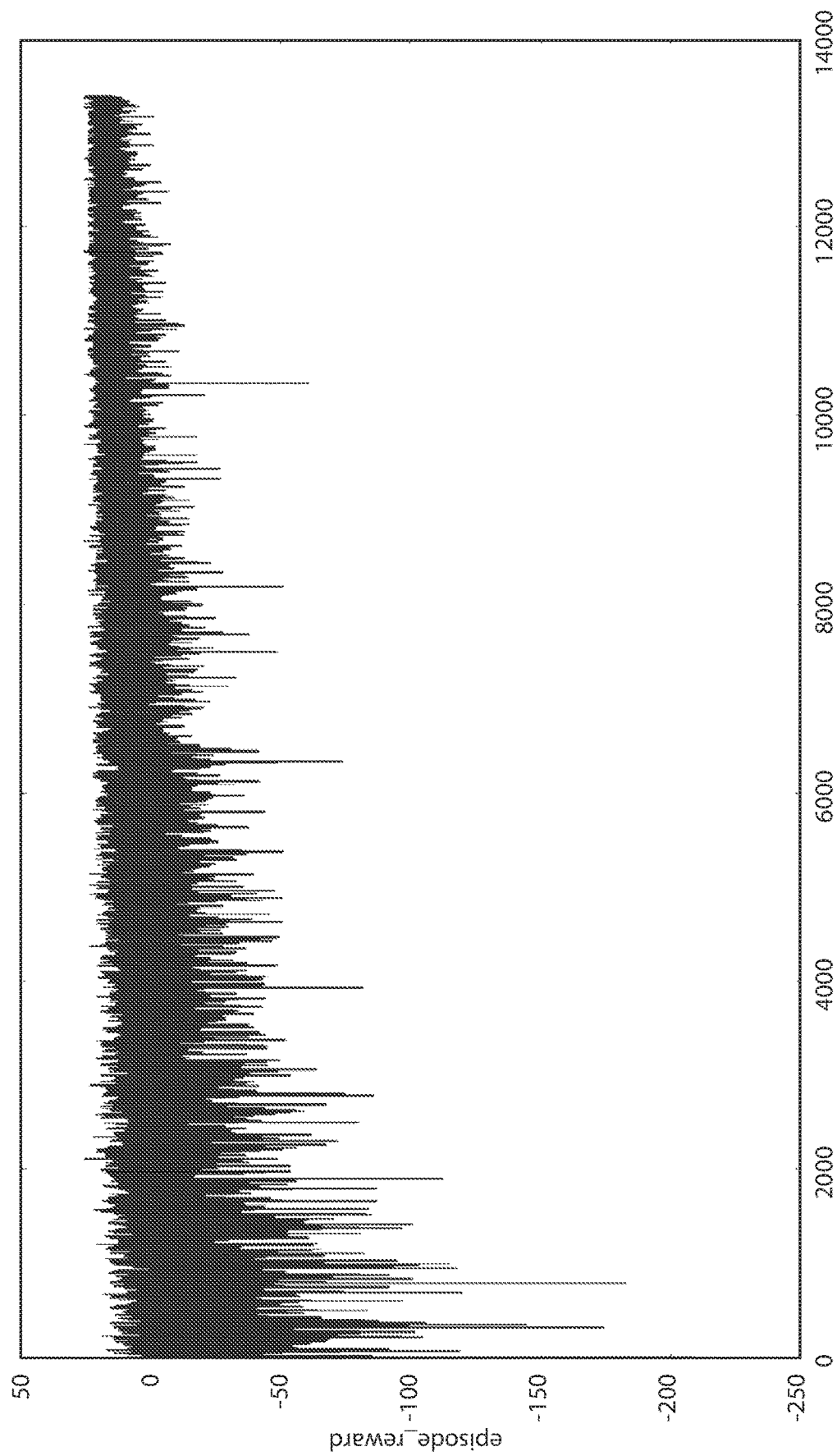
FIG. 11 illustrates a graph of episode reward for consecutive episodes when training a DQN for 1,000,000 steps.

In another example, the DQN is trained for a map with size of 10×10. In this example, the same DQN as described in the example above is used except the size of convolutional filters are reduced to 4×4, 3×3, and 3×3 with 32, 64, and 64 filters, respectively. Also, instead of 4,2,1 pooling used in the above example, 1,1,1 pooling is used and the size of the input to the network is 10×10 (the map size). Instead of cleaning all of the cells of the 10×10 map, the length of an episode is reduced to cleaning 25% of the 10×10 map (25 cells out of 100 cells). FIG. 11 illustrates a graph of episode reward (vertical axis) versus episode number (horizontal axis) while training the DQN for 1,000,000 steps. The results show that the episode reward improved and the DQN converges. At the beginning of the training, the episode reward was approximately −30 while by increasing the number of steps, the episode reward became approximately 10.

Figure 12:
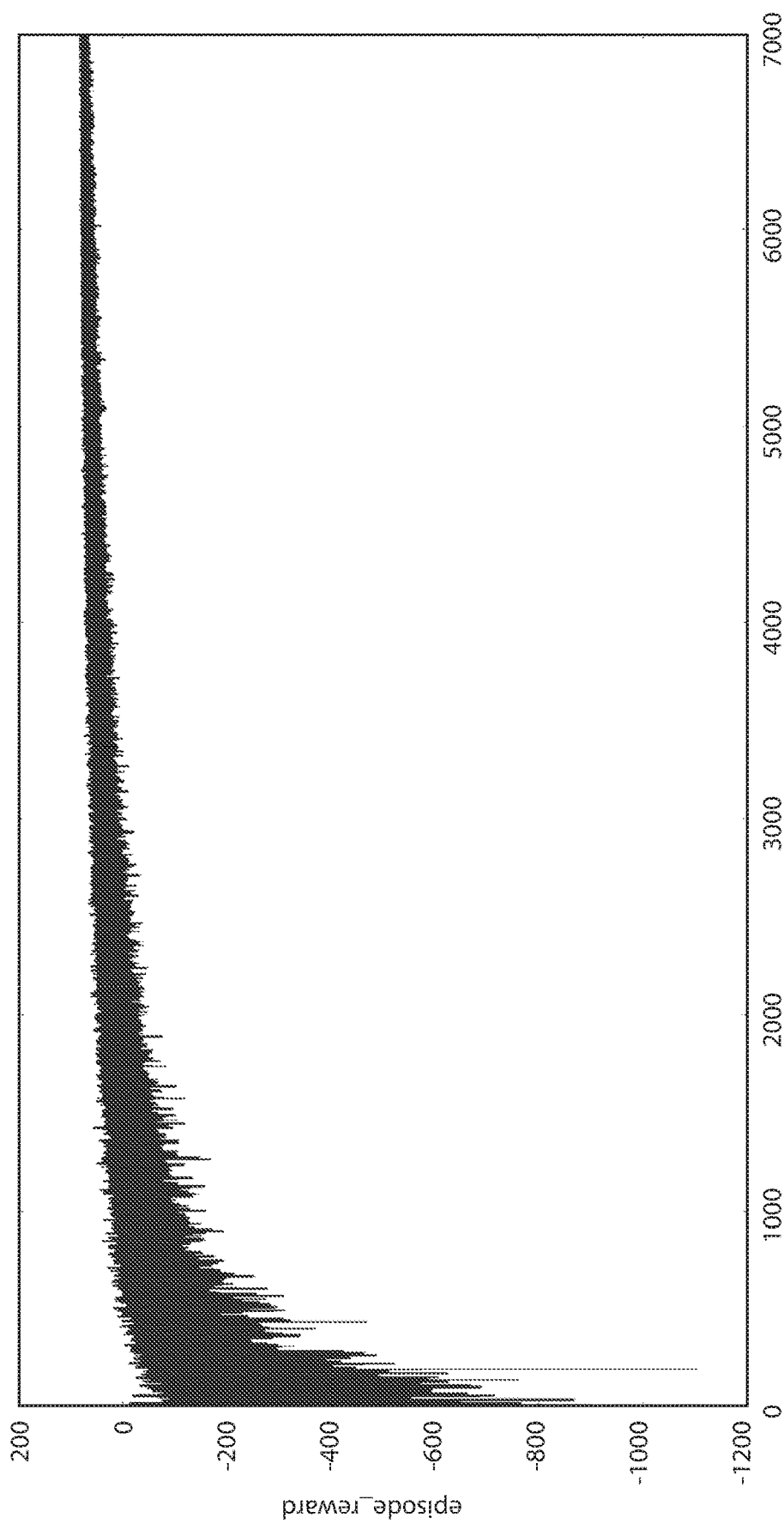
FIG. 12 illustrates a graph of episode reward for consecutive episodes when training a DQN for 10,000,000 steps.

In another example, two scenarios for cleaning of a map with size of 10×10 are considered. In the first scenario, instead of cleaning all cells of the map with size of 10×10, the length of an episode is reduced to cleaning 80% of the map (80 cells out of 100 cells). The reduction is implemented as training the robotic vacuum to clean the whole map may be time consuming. The DQN of a single robot was trained with 10,000,000 steps, including 70500 episodes. FIG. 12 illustrates a graph of episode reward (vertical axis) versus episode number (horizontal axis) when training the DQN for 10,000,000 steps. At the beginning of training, episodes include more steps compared to the end of training. The results show that the robot learned to clean the map. For instance, at episode 7 (at the beginning of training) the robot moved 455 times to clean 80 cells and got a reward of −294. In the middle of training the total movements of the robot required to clean the 80 cells decreased and the reward increased. In the last episode, the robot learned to clean the map efficiently and used 82 movements to clean 80 cells and received a reward of 79, with the maximum possible reward being 80. In the second scenario, a fixed number of steps is set for each episode, 100 steps in this example for cleaning 100 cells of the map. The DQN was trained for a single robot with 10,000,000 steps including 10,000 episodes (each episode including 100 steps). The results show that the robot learned to efficiently clean the map. For instance, at episode 10 (at the beginning of training) the robot cleaned 27 cells with 100 movements and obtained a reward of −46. In the middle of training, the total number of cleaned cells and the reward increased. In the last episode, the robot cleaned 91 cells with 100 movements and obtained a reward of 82.

In the previous example, a DQN of a single robotic vacuum was trained for cleaning of a map with size of 10×10 based on two scenarios: 1) the robotic vacuum cleaning 80% of the map and 2) the robotic vacuum having a fixed number of 100 steps in each episode. Based on these scenarios, there were two trained DQN models. In another example, the Keras-rl library is extended to use these two DQN models for multiple robotic vacuums. In this architecture, multiple robots simultaneously clean cells of the map. Therefore, at each step, the state is affected by multiple DQNs and multiple cells are cleaned. Each robot chooses their next action based on the cells cleaned by all the robots at the previous step. For this example, the two models are tested for cleaning 90% of a 10×10 map by multiple robotic vacuums (1, 2, 3, and 4 robotic vacuums). To calculate the reward, the reward is divided by the time of cleaning. For example, for 2, 3 and 4 robots, the reward is divided by ½, ⅓ and ¼, respectively. The results show that by increasing the number of robotic vacuums, the total number of movements are increased because there is an overlap in the cleaning of the cells by different robots. However, by increasing the number of robots, cleaning time of the map is decreased. For example, by using two robots, cleaning time decreased to half. The results showed that by increasing the number of robots the total reward was increased and the robots collaborated effectively to clean the map.

In some embodiments, objects are added to the map by defining a new variable obstacle in the 'Environment' class. The obstacle variable may be defined as a matrix of the same size as the map, each matrix entry corresponding with a cell (i.e., location) in the map. The values of each entry in matrix may be zero to indicate no object or one to indicate the presence of an object. In some embodiments, the robots clean the cells of the map based on the values of the entries in the matrix defining the obstacle variable. If a cell is occupied by an object, the robot may not move into that location. In some embodiments, the DQN makes decision about the next movement of the robot based on the current state of the robot. In some embodiments, a post-processing check is implemented to make sure the next location of a robot is not occupied by an object. If the next location is occupied by an object, the robot does not move to that location.

In some embodiments, to collaboratively clean a 100×100 map, each robotic vacuum cleans a SMap with size of 10×10 and then moves to the next SMap. In some embodiments, there is a jump from the ending point in the current SMap to the starting point of the next SMap because in each SMap the initial and final locations of the robot are random. In some embodiments, the initial location is selected by a random function and the final location is indicated based on the decision of DQN. Therefore, in some embodiments, movement of the robot between the SMaps may not be continuous. In some embodiments, when a robot finishes cleaning of the current SMap, the initial location of the next SMap is randomly indicated. In some embodiments, the processor of a robot implements a path finder method to find the shortest path from the last location in the current SMap to the initial location in the next SMap and avoid jumps. In some embodiments, the robot moves along the path to the next SMap and starts cleaning of the next SMap. In some embodiments, the path finder method may be based on Dijkstra method to find the shortest path by considering the objects (or otherwise obstacles).

In some embodiments, semi-autonomous or autonomous vehicles may collaborate to travel more efficiently and safely by sharing intelligence. For example, U.S. patent application Ser. No. 14/948,620, hereby incorporated by reference, describes a method for a guiding vehicle to collaborate with semi-autonomous or autonomous follower vehicles by sharing real-time intelligence on destination, route, navigation, obstacles, traffic, etc. using transmitters and receivers of vehicles. In some embodiments, vehicles with at least a portion of the same route of the guiding vehicle may join the driving group wherein the processor of follower vehicles use shared intelligence as well as information gathered by their sensors to control navigation and maneuver the vehicle. In some embodiments, follower vehicles may relay information to one another using transmitters and receivers after establishing a DTC link. In some embodiments, the guiding vehicle may broadcast signals from a transmitter including at least its destination, planned route, and unique identifier. In some embodiments, follower vehicles may receive the signal by a receiver and the processor may determine whether to join the driving group. For example, a follower vehicle may join the driving group when the processor detects that they share at least a portion of the same route as the guiding vehicle. In some embodiments, follower vehicles may be arranged behind the guiding vehicle in lines and maintain a particular distance between themselves and adjacent vehicles using distance sensors or the like. In some embodiments, the guiding vehicle may share information such as, clock or time, velocity, steering position, rate of acceleration, rate deceleration, location, planned route, obstacle data, road condition data, weather data, map, depth data, traffic data, capabilities, virtual lane data, accident reports, or any other useful information using a transmitter. In some embodiments, receipt of driving information from a guiding vehicle may cause the processor of a follower vehicle to activate its actuators. For example, a follower vehicle may be actuated by the processor to accelerate if the guiding vehicle accelerates or adjust its steering position given the steering position of the guiding vehicle. In some embodiments, processors of autonomous vehicles and/or fixed sensing devices monitoring the environment may collaborate and share observations of the environment with one another to be able to observe areas beyond their current field of view. This may be useful when the current field of view of an autonomous vehicle is obstructed by, for example, a sloped road or a stationary object. The ability to observe the environment beyond the current field of view of the sensors of an autonomous vehicle may be beneficial in embodiments wherein the speed of the autonomous vehicle may be limited by their current field of view. In some embodiments, autonomous vehicles driving within the same vicinity may collaborate to determine virtual lanes, driving direction of lanes, driving speed, space between adjacent vehicles, arrangement of vehicles, etc. given observations of the environment such as traffic in both driving directions, size of vehicles, road space, and capabilities of the autonomous vehicles.

In some embodiments, the relationship between collaborating robots may be assigned a loyalty index by the processors of the robots, the value of which indicates the strength of the relationship. For example, U.S. patent application Ser. No. 15/986,670, the entire contents of which is hereby incorporated by reference, describes a loyalty index that may be assigned to collaborating robots by their respective processors. In some embodiments, the loyalty index may be increased or decreased by the processors of the robots depending on the number of times the robots have authenticated one another, the outcomes of their interactions, the length of their relationship, and other factors. For example, if a first robot commands a second robot to vacuum a hallway and the second robot fails to or does a poor job of vacuuming the hallway the processor of the first robot may consider the second robot unreliable and therefore lower its loyalty index. Alternatively, if the second robot succeeds at cleaning the hallway the processor of the first robot may increase its loyalty index. In some embodiments, the value of the loyalty index may determine the type of interaction permitted between the robots. In some embodiments, processors of robots use loyalty index thresholds to determine the type of interactions permitted with other collaborating robots. For example, a low loyalty index between robots may permit authentication and the exchange of information while a high loyalty index may additionally permit robots to collaborate to complete a task together or permit one robot to command the other. In some embodiments, wherein a robot interacts with multiple other robots, the robot with whom the highest loyalty index is established is considered to have the highest level of trust. For example, if a robot interacts with two other robots having conflicting commands, the robot with whom the higher loyalty index is established is trusted by the processor of the robot. In some embodiments, the loyalty index may act a security measure against intruding robots as interactions between robots are limited until different levels of loyalty index thresholds are achieved.

In some embodiments, processors of collaborating robots use a block chain algorithm to protect against authorization over a network device or endpoint device. In some embodiments, the loyalty-based security system may give more weight and confidence to a stream of devices that have not been swapped for longer periods of times. In some embodiments, the loyalty-based security system may establish increased loyalty between a chain of devices such that more traffic is transmitted over the most trusted paths and such that sensitive information is not transmitted over paths that include new devices. In some instances, the decisions follow a machine learned algorithm to identify what happens in each situation. The algorithm may be trained and a deep neural network may be used to follow the same pattern for making the future decisions. In some embodiments, if a network device is swapped due to maintenance needs, the trust of the path including the new device reduces as it is initially unknown if the swap is an attack or legitimate maintenance. However, the trust of the path including the new robot increases with time and as more communication is executed through the path without any report of a security breach. In some embodiments, this allows time for reaction to a possible man in the middle attack. In some embodiments, a graph is defined with various nodes and vertices, wherein each node represents a device in the network and is assigned a mac address, an IP address, and some other network identification parameters. In some embodiments, a block chain may initiate a seed encryption on the first node (or first device) and pass the key onto the next node, continuing to the last node (or last device). In some embodiments, the structure of the nodes form a spanning tree. In some embodiments, in a converged network of devices, the life of the block chain is approximately homogenous. In some embodiments, if a device is inserted, swapped, or taken out of the network, the block chain is re-calculated and is hence a new block chain. In some embodiments, it may be unlikely that a hash is recreated within a timely manner because of the properties of block chain and the decryption time. In some embodiments, a loyalty counter proportional to the time it takes a hash to be brute forced by a powerful computer is implemented. As long as the increase in the loyalty counter is less than the expected time of brute force of a hash with a powerful computer, there is reasonable security. This may act as a barrier against an intruder attempting to achieve control over one or more end point devices. This feature may particularly be important for security robots and autonomous driving cars, where unauthorized control over the robot could endanger lives or jeopardize an operation. In some embodiments, the value of the loyalty index determines the level of control over the robot, where a very high loyalty index allows complete control over the robot system. In some embodiments, the loyalty counter of users may be programmed to decay over time. This may be effective and resistant against manipulation of a time sensitive data accumulation process.

In some embodiments, the map of the environment used by the processor of a robot may be accessed through an application of a communication device and displayed on a screen of the communication device, e.g., on a touchscreen. In some embodiments, the processor of the robot sends the map of the environment to the application at various stages of completion of the map or after completion. In some embodiments, the application of the communication device displays the map on the screen and receives a variety of inputs indicating commands using a user interface of the application (e.g., a native application) displayed on the screen of the communication device. Examples of graphical user interfaces are described in U.S. patent application Ser. Nos. 15/272,752, 15/949,708, and 16/277,991, the entire contents of which are hereby incorporated by reference. Some embodiments present the map to the user in special-purpose software, a web application, or the like, in some cases in a corresponding user interface capable of receiving commands to make adjustments to the map or adjust settings of the robot and any of its structures or components.

In some embodiments, the user interface includes inputs by which the user adjusts or corrects the map boundaries displayed on the screen or applies one or more of various options to the boundary lines using their finger or by providing verbal instructions, or in some embodiments, an input device, such as a cursor, pointer, stylus, mouse, button or buttons, or other input methods may serve as a user-interface element by which input is received. In some embodiments, the user interface presents drawing tools available through the application of the communication device. In some embodiments, boundary lines may be adjusted in a variety of ways such as, for example, adding, deleting, trimming, rotating, elongating, redrawing, moving (e.g., upward, downward, leftward, or rightward), suggesting a correction, and suggesting a completion to all or part of a boundary line. For example, after selecting all or a portion of a boundary line of the map, the user is provided by embodiments with various options, such as deleting, trimming, rotating, elongating, shortening, redrawing, moving (in four or more directions), flipping, or curving, the selected boundary line. In another example, the user deletes all or a portion of a boundary line and redraws all or a portion of the boundary line using drawing tools, e.g., a straight-line drawing tool, a Bezier tool, a freehand drawing tool, and the like. In some embodiments, the application of the communication device sends the updated map to the processor of the robot using a wireless communication channel.

Figure 13A:
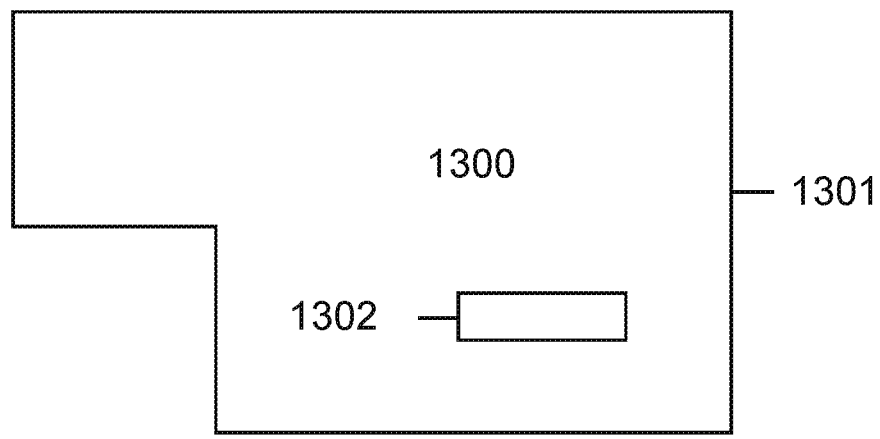
FIGS. 13A and 13B illustrate an example of the process of adjusting perimeter lines of a map in some embodiments.
Figure 13B:
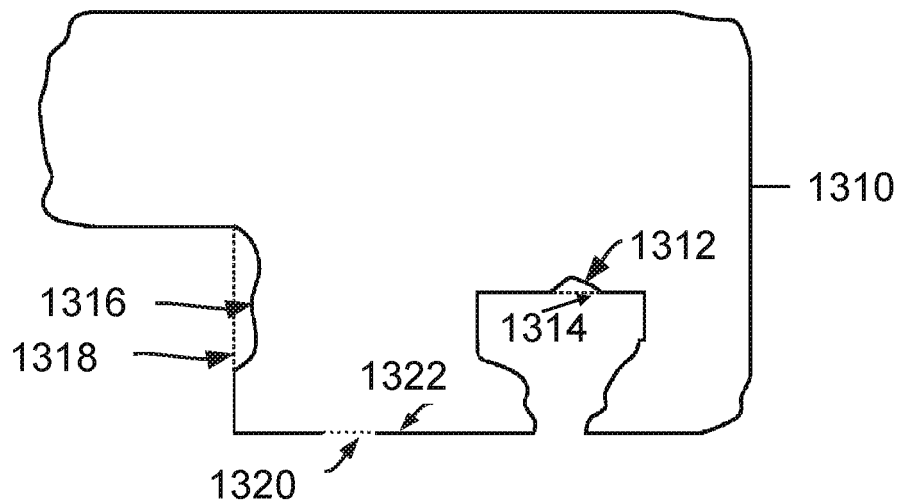

FIGS. 13A and 13B illustrate an example of changing boundary lines of a map based on user inputs of a user interface (e.g., a touchscreen). FIG. 13A depicts an overhead view of an environment 1300, including objects within the environment 1300. The outer line 1301 represents the walls of the environment 1300 and the rectangle 1302 represents a piece of furniture. Commercial use cases are expected to be substantially more complex, e.g., with more than 2, 5, or 10 objects, in some cases that vary in position over time. FIG. 13B illustrates an overhead view of a two-dimensional map 1310 of the environment 1300 created by a processor of a robot using environmental sensor data. Because the methods for generating the map are not completely accurate, the two-dimensional map 1310 may be approximate. In some instances, performance of the robot may suffer as a result of imperfections in the map 1310. In some embodiments, a user corrects the perimeter lines of map 1310 to match the actual objects and boundaries of the environment 1300. In some embodiments, the user is presented with a user interface displaying the map 1310 of the environment 1300 on which the user may add, delete, and/or adjust boundary lines of the map 1310. For example, the processor of the robot may transmit the map 1310 to an application of a communication device wherein user input indicating adjustments to the map are received through a user interface of the application. The input triggers an event handler that launches a routine by which a boundary line of the map is added, deleted, and/or adjusted in response to the user input, and an updated version of the map may be stored in memory before being transmitted back to the processor of the robot. For instance, in map 1310, the user manually corrects boundary line 1316 by drawing line 1318 and deleting boundary line 1316 in the user interface. In some cases, user input to add a line may specify endpoints of the added line or a single point and a slope. Some embodiments may modify the line specified by inputs to "snap" to likely intended locations. For instance, inputs of line endpoints may be adjusted to equal a closest existing line of the map. Or a line specified by a slope and point may have endpoints added by determining a closest intersection relative to the point of the line with the existing map. In some cases, the user may also manually indicate which portions of the map to remove in place of the added line, e.g., separately specifying line 1318 and designating curvilinear segment 1316 for removal. Or some embodiments may programmatically select segment 1316 for removal in response to the user input designating line 1318, e.g., in response to determining that 1316 and 1318 bound areas of less than a threshold size, or by determining that line 1316 is bounded on both sides by areas of the map designated as part of the environment.

In some embodiments, the application suggests correcting a boundary. Some embodiments may determine a best-fit polygon of a boundary of the (as measured) map through a brute force search or some embodiments may suggest correcting a boundary with a Hough Transform, the Ramer-Douglas-Peucker algorithm, the Visvalingam algorithm, or other line-simplification algorithm. For example, the application identifies a deviation in a straight boundary line and suggests correcting the boundary line to a line that best fits with regions of the boundary line on either side of the deviation. Some embodiments may determine candidate suggestions that do not replace an extant line but rather connect extant segments that are currently unconnected, e.g., some embodiments may execute a pairwise comparison of distances between endpoints of extant line segments and suggest connecting those having distances less than a threshold distance apart. For example, the application identifies a gap in a boundary line and suggests correcting the boundary line to a line that best fits with regions of the boundary line on either side of the gap. In some embodiments, the application identifies an end point of a line and the next nearest end point of a line and suggests connecting them to complete a perimeter line. In some embodiments, the application suggests rotating or translating a portion of a boundary line that has been identified as deviating such that the adjusted portion of the boundary line may be adjacent and in line with portions of the boundary on either side of the deviation. For example, a portion of a boundary line may be moved upwards or downwards or rotated such that it is in line with the portions of the boundary line on either side of the deviation. Some embodiments may select, from a set of candidate line simplifications, those with a length above a threshold or those with above a threshold ranking according to line length for presentation. In some embodiments, presented candidates may be associated with event handlers in the user interface that cause the selected candidates to be applied to the map. In some embodiments, the application may automatically implement some or all of the suggested boundary corrections. In some cases, such candidates may be associated in memory with the line segments they simplify, and the associated line segments that are simplified may be automatically removed responsive to the event handler receiving a touch input event corresponding to the candidate. For instance, in map 1310, in some embodiments, the application suggests correcting boundary line 1312 by displaying suggested correction 1314. The user accepts the corrected boundary line 1314 that will replace and delete boundary line 1312 by supplying inputs to the user interface. In some cases, where boundary lines are incomplete or contain gaps, the application suggests their completion. For example, the application suggests closing the gap 1320 in boundary line 1322. Suggestions may be determined by the processor of the robot, the application executing on the communication device, or other services, like a cloud-based service or computing device in a charging station.

In some embodiments, the application identifies unlikely boundaries created (newly added or by modification of previous boundaries) by the user using the user interface. In some embodiments, the application identifies one or more unlikely boundary segments by detecting one or more boundary segments oriented at an unusual angle (e.g., less than 25 degrees relative to a neighboring segment or some other threshold) or one or more boundary segments comprising an unlikely contour of a boundary (e.g., short boundary segments connected in a zig-zag form). In some embodiments, the application identifies an unlikely boundary segment by determining the surface area enclosed by three or more connected boundary segments, one being the newly created boundary segment and identifies the boundary segment as an unlikely boundary segment if the surface area is less than a predetermined (or dynamically determined) threshold. In some embodiments, other methods are used in identifying unlikely boundary segments within the map. In some embodiments, the user interface may present a warning message indicating that a boundary segment is likely incorrect. In some embodiments, the user ignores the warning message or responds by correcting the boundary segment using the user interface.

In some embodiments, the map generated by the processor of a robot (or a remote processor) may contain errors, be incomplete, or may not reflect the areas of the environment that the user wishes the robot to service. By providing an interface by which the user may adjust the map, some embodiments obtain additional or more accurate information about the environment, thereby improving the robot's ability to navigate through the environment or otherwise operate in a way that better accords with the user's intent. For example, via such an interface, the user may extend the boundaries of the map in areas where the actual boundaries are further than those identified by sensors of the robot, trim boundaries where sensor-identified boundaries are further than the actual boundaries, or adjusts the location of doorways and objects. Or the user may create virtual boundaries that segment a room for different treatment or across which the robot will not traverse. In some cases, wherein the processor creates an accurate map of the environment, the user may adjust the map boundaries or create keep-out zones to keep the robot from entering some areas.

In some embodiments, via the user interface (which may be a single screen, or a sequence of displays that unfold over time), the user creates different areas within the environment. In some embodiments, the user selects areas within the map of the environment displayed on the screen using their finger or by providing verbal instructions, or in some embodiments, an input device, such as a cursor, pointer, stylus, mouse, button or buttons, or other input methods. Some embodiments may receive audio input, convert the audio to text with a speech-to-text model, and then map the text to recognized commands. In some embodiments, the user labels different areas of the environment using the user interface of the application. In some embodiments, the user labels the map using the user interface. In some embodiments, the user assigns a floor type to different areas of the map using the user interface. In some embodiments, the user assigns a level of debris accumulation to different areas of the map using the user interface. In some embodiments, the processor of the robot assigns a level of debris accumulation to different areas of the map and the application of the communication device displays the information to the user via the user interface. In some embodiments, the user selects different settings (e.g., tool settings, robot settings, scheduling, etc.), for different areas of the environment using the user interface. In some embodiments, the processor of the robot or the application of the communication device autonomously divides the environment into different areas and in some instances, the user adjusts the areas of the environment created by the processor using the user interface.

In some embodiments, the user adjusts or chooses tool settings of the robot using the user interface of the application of the communication device and designates areas in which the tool is to be applied with the adjustment. For example, tools of a surface cleaning robot may include a suction tool (e.g., a vacuum), a mopping tool (e.g., a mop), a sweeping tool, a steam cleaning tool, a main brush tool, a side brush tool, and an ultraviolet light. Tool settings may include activating or deactivating various tools, impeller motor speed for suction control, fluid release speed for mopping control, brush motor speed for vacuuming control, sweeper motor speed for sweeping control, and heating system temperature for steam cleaning control. In some embodiments, the user chooses different tool settings for different areas within the environment or schedules particular tool settings at specific times using the user interface. For example, the user selects activating the suction tool in only the kitchen and the bathroom on Wednesdays at noon. In another example, the user selects a high suction power for rooms with carpet and medium suction power for rooms with hard flooring using the user interface. In some embodiments, the user adjusts or chooses robot settings using the user interface. In some embodiments, robot settings include, but are not limited to, robot driving speed settings, movement pattern settings, cleaning frequency settings (e.g., daily, weekly, monthly, bi-monthly, etc.), cleaning type settings (e.g., light or deep cleaning), number of passes, cleaning schedule settings, etc. In one example, the user selects a boustrophedon movement pattern followed by a wall follow pattern using the user interface. In some embodiments, the user chooses different robot settings for different areas within the environment or schedules particular robot settings at specific times using the user interface. For example, the user chooses areas A and B of the environment to be cleaned with the robot at high driving speed, in a boustrophedon pattern, on Wednesday at noon every week and areas C and D of the environment to be cleaned with the robot at low driving speed, in a spiral pattern, on Monday and Friday at nine in the morning, every other week. In addition to the robot settings of areas A, B, C, and D of the environment, the user additionally selects tool settings using the user interface. For example, the user may select cleaning the kitchen and living room with high suction power, deep cleaning, and with two passes on Monday and Thursday on a weekly basis using the user interface.

Examples of scheduling methods that may be used are described in U.S. patent application Ser. Nos. 16/051,328 and 15/449,660, the entire contents of which are hereby incorporated by reference. For instance, some embodiments disclose a method for setting a work schedule for a robotic floor-cleaning device including: monitoring use times of a robotic floor-cleaning device over a preset period of time; storing the times and dates the robotic floor-cleaning device was turned on in a database; developing a suggested work schedule based on the stored data; and proposing the suggested work schedule to users through an input/output device. Some embodiments provide a method including: monitoring use times of a robotic floor-cleaning device over a preset period of time; storing the times and dates the robotic floor-cleaning device was turned on in a database; devising a suggested work schedule from the stored data using a machine learning technique; proposing the suggested work schedule to users through an input/output device; accepting user adjustments to the suggested work schedule through the input/output device; and adding the user adjustment data to the database for use in devising future work schedules. One skilled in the art will appreciate that different embodiments of the invention may use different machine learning techniques such as, but not limited to, supervised learning, unsupervised learning, reinforcement learning, semi-supervised learning, etc. In some embodiments, the input/output device may be wireless and may send and receive signals to and from remote devices, such as, for example, remote controls and smartphones. In some embodiments, the floor-cleaning device may be scheduled directly via a user interface positioned thereon. In some embodiments, inputs from a user and outputs from the robotic floor-cleaning device may be provided through a software application installed on an internet-connected device, such as a smartphone, a computer, or a tablet. An example of a process for devising a suggested work schedule includes monitoring activation dates and times, storing the dates and times in a database, developing a suggested work schedule based on the stored data, and proposing the suggested work schedule. In some embodiments, the suggested work schedule is developed based on times the robotic-floor cleaning device was turned on as per user-provided instruction. In some embodiments, the times the robotic-floor cleaning device was turned on is stored in a database. In some embodiments, the suggested work schedule is followed by the robotic floor-cleaning device after approval by the user of the suggested work schedule. In some embodiments, the suggested work schedule is developed based on data stored in the most recently updated database, wherein the database is continuously updated with new times the robotic-floor cleaning device was turned on. In some embodiments, the suggested work schedule is developed based on the times the robotic-floor cleaning device was turned on that are stored in the database and using a start time that is the mean or median of the start times in the database, a start time that is the mean or median of a subset of the start times in the database, and/or using a machine learning algorithm to devise a work schedule based on the times in the database.

In some embodiments, the robot may perform more than one function and the user may select settings for each function using the application of the communication device. In some embodiments, the user selects two or more tools to operate in a working session. In some embodiments, the robot may complete coverage of all areas within which a first tool is to be used and then complete coverage of all areas within which a second tool is to be used. In some embodiments, the robot may simultaneously operate two or more tools in areas within which the two or more tools are to be operated. For example, the robot may include a suction tool and a mopping tool which may or may not be used simultaneously. The user may select the robot to vacuum a bedroom and a kitchen with low suction power, light cleaning, and a single pass and mop the kitchen with a low volume of fluid dispersion and two passes. The robot may first finish vacuuming before mopping or vice versa or may simultaneously operate the suction and mopping tools in overlapping areas, in this particular case the kitchen. In some embodiments, the processor may actuate at least a portion of the mop (e.g., a mopping pad) to move in an upwards direction away from the driving surface when covering or driving over carpeted areas. In some embodiments, the user chooses the order of covering or operating in the areas of the environment using the user interface. In some embodiments, the user chooses areas to be excluded using the user interface. In some embodiments, the user adjusts or creates a movement path of the robot using the user interface. For example, the user adds, deletes, trims, rotates, elongates, redraws, moves (in all four directions), flips, or curves a selected portion of the movement path. In some embodiments, the user adjusts the movement path created by the processor using the user interface. In some embodiments, the user chooses an area of the map using the user interface and applies particular tool settings and/or robot settings to the area. In other embodiments, the user chooses an area of the environment from a drop-down list, check list, or some other method of displaying different areas of the environment. In some embodiments, the user may select the robot start cleaning immediately using the user interface as opposed to choosing individual rooms for cleaning first. In some embodiments, the user may select a sleep mode for the robot using the user interface, wherein the robot does not clean or provide alerts. In some embodiments, the user may select the robot autonomously empty its bin, recharge its power source, or replenish its cleaning fluid using the user interface.

In some embodiments, the user interface of the application of the communication device displays one or more of: a status of the robot (e.g., cleaning or another function, charging, idle, etc.), a power level of the robot, a time remaining to reach full power, a time remaining to complete a task, and an amount of operation time remaining until the power depletes completely. In some embodiments, the user interface displays a history report including information such as, total historical cleaning time, total historical surface area cleaned, areas cleaned within the map for a single session, total cleaning time of a single session, total surface area cleaned of a single session, total historical charging time, total number of sessions completed, total number of times a bin of the robot was emptied, and total number of times a reservoir of the robot was replenished with cleaning fluid. In some embodiments, the user interface may display obstacles, different floor types, and levels of debris accumulation in different areas of the map. In some embodiments, the user interface displays a location of the robot in the map corresponding to a location of the robot when an error occurred. In some embodiments, the application of the communication device provides instructions for solving the error. In some embodiments, operation instructions in the form of a video are displayed using the user interface. In some embodiments, the user interface displays diagnostic information, such as low battery levels, required part replacements, and the like. In some embodiments, the user may select the robot perform a checkup to check functionality of key components such as touch keys, wheels, IR sensors, bumper, etc. In some embodiments, based on notifications, errors and/or warnings reported, the user selects specific diagnostic tests for the checkup to particularly target issues of the robot. In some embodiments, the processor of the robot determines and performs diagnostic tests. In some embodiments, the user interface displays the movement path of the robot and the robot in the map of the environment during operation or charging. In some embodiments, the user may select the robot to drive to a user-identified location, turn in a left or right direction, drive in a forward or backward direction, and stop moving using the user interface.

In some embodiments, the user interface may display information about a current state of the robot or previous states of the robot or its environment. Examples include a heat map of dirt or debris sensed over an area, classifications of floor surfaces in different areas of the map, a path that the robot has taken during a current cleaning session or other type of session, a path that the robot is currently following and has computed to plan further movement in the future, and a path that the robot has taken between two points in the environment, like between a point A and a point B on different sides of a room or a house in a point-to-point traversal mode. In some embodiments, while or after a robot attains these various states, the robot may report information about the states to the application via a wireless network, and the application may update the user interface on the communication device to display the updated information. For example, in some cases, a processor of a robot may report which areas of the environment have been covered during a current session, for instance, in a stream of data to the application executing on the communication device formed via a WebRTC Data connection, or with periodic polling by the application, and the application executing on the communication device may update the user interface to depict which areas of the environment have been covered. In some cases, this may include depicting a line of a path traced by the robot or adjusting a visual attribute of areas or portions of areas that have been covered, like color or shade or areas or boundaries. In some embodiments, the visual attributes may be varied based upon attributes of the environment sensed by the robot, like an amount of dirt or a classification of a flooring type sensed by sensors of the robot. In some embodiments, a visual odometer implemented with a downward facing camera may capture images of the floor, and those images of the floor, or a segment thereof, may be transmitted to the application to apply as a texture in the visual representation of the environment in the map, for instance, with a map depicting the appropriate color of carpet, wood floor texture, tile, or the like to scale in the different areas of the environment.

In some embodiments, the user interface may indicate in the map a movement path the robot is about to take (e.g., according to a path planning algorithm) between two points, to cover an area, or to perform some other task. For example, a movement path may be depicted as a set of line segments or curves overlaid on the map, and some embodiments may indicate a current location of the robot with an icon overlaid on one of the line segments with an animated sequence that depicts the robot moving along the line segments. In some embodiments, the future movements of the robot or other activities of the robot may be depicted in the user interface. For example, the user interface may indicate which room or other area the robot is currently covering and which room or other area the robot is going to cover next in a current work sequence. The state of such areas may be indicated with a distinct visual attribute of the area, its text label, or its boundaries, like color, shade, blinking outlines, and the like. In some embodiments, a sequence with which the robot is currently programmed to cover various areas may be visually indicated with a continuum of such visual attributes, for instance, ranging across the spectrum from red to blue (or dark grey to light) indicating sequence with which subsequent areas are to be covered.

In some embodiments, via the user interface or automatically without user input, a starting and an ending point for a movement path to be traversed by the robot may be indicated on the user interface of the application executing on the communication device. Some embodiments may depict these points and propose various movement path therebetween, for example, with various path planning algorithms like those described in the applications incorporated by reference herein. Examples include A*, Dijkstra's algorithm, and the like. In some embodiments, a plurality of alternate candidate paths may be displayed (and various metrics thereof, like travel time or distance), and the user interface may include inputs (like event handlers mapped to regions of pixels by which a user may select among these candidate paths by touching or otherwise selecting a segment of one of the candidate paths, which may cause the application to send instructions to the robot that cause the robot to traverse the selected candidate path.

In some embodiments, the application of the communication device may be paired with different types of robots (stationary and mobile). In some embodiments, inputs of the user interface of the application of the communication device may be used to instruct the different types of robots. For example, the application of the communication device may be paired with a robotic vacuum and a robotic mop. In some embodiments, the user may select a first robot to execute a first task and/or a second robot to execute a second task using the user interface. In some embodiments, the application of the communication device may transmit a signal to the processor of the first or second robot instructing the first or second robot to execute the first or second task, respectively. In some embodiments, the user may select the second robot to execute the second task before or after the first robot completes the first task using the user interface. In some embodiments, the application of the communication device may transmit a signal to the processor of the first robot instructing the first robot to execute the first task and to transmit a trigger signal to the processor of the second robot upon completing the first task. In some embodiments, the processor of the second robot actuates the second robot to execute the second task upon receiving the trigger signal. In some embodiments, the user may select that the second robot begin the second task before the first robot completes the first task if the first robot is incapable of completing the first task (e.g., if the first robot becomes stuck or its power level is low). In some embodiments, the user may select the first robot and the second robot execute their tasks simultaneously using the user interface. In such cases, the processors of the first and second robots may collaborate to determine for first and second robot an order of coverage of the areas within which the first and second tasks are to be executed within, respectively. For example, the processors of a robotic vacuum and a robotic mop may strategically order coverage of areas such that overlapping areas are first vacuumed then mopped, wherein the robotic mop may first cover areas that are not to be covered by the robotic vacuum and the robotic vacuum may first cover areas that are overlapping with the robotic mop. The first and second tasks may include tool settings and robot settings. For example, the user may select a robotic vacuum to clean a bedroom, a kitchen, and a bathroom with high suction power, medium main brush speed, detailed cleaning, and a single pass and a robotic mop to clean the kitchen and a basement after the robotic vacuum has completed vacuuming using the user interface. In some embodiments, the user may select settings for the second robot using the user interface. For example, the user may select high volume of fluid dispersion and two passes for the robotic mop using the user interface.

In some embodiments, the application of the communication device is paired with a home assistant. In some embodiments, the user may provide a command to the home assistant (e.g., by voice or text) and the home assistant may wirelessly transmit the command to the processor of a robot directly or indirectly through the application of the communication device. For example, a user may provide a voice command to a home assistant that instructs a robotic vacuum to clean a kitchen. The home assistant wirelessly transmits the instruction to a processor of the robotic vacuum and upon receiving the instruction, the processor actuates the robotic vacuum to execute the instruction of cleaning the kitchen. In some embodiments, the command may include a schedule, particular areas to clean, one or more tasks for one or more types of robots, tool settings, and robot settings. In some embodiments, the user may provide a command to the robot and the robot may wirelessly transmit the command to the home assistant. For example, the user may ask the robot for the outside temperate and the processor of the robot may transmit the question to the home assistant. The home assistant may directly reply or may transmit the answer to the robot and the robot may answer. In some embodiments, the robot may include a built-in or detachable home assistant. In some embodiments, the application of the communication device is paired with stationary robotic or electronic devices (e.g., robotic dishwasher, robotic coffee maker, robotic washing machine, etc.) within the environment or a home control unit that may control light settings, fan settings, blind settings, alarm settings, shower settings, bath settings, surface cleaning robot settings, temperature settings, coffee maker settings, laundry machine settings, oven settings, stove settings, refrigerator settings, microwave settings, sprinkler settings, security system settings, and other settings of the home. In some embodiments, user interface of the application of the communication device may be used to operate and select settings of the devices with which it is paired.

In some cases, a user input provided via the user interface of the application of the communication device may be tested for validity before execution. Some embodiments may determine whether the command violates various rules, e.g., a rule that a mop and vacuum are not engaged concurrently. Some embodiments may determine whether adjustments to maps violate rules about well-formed areas, such as a rule specifying that areas are to be fully enclosed, a rule specifying that areas must have some minimum dimension, a rule specifying that an area must have less than some maximum dimension, and the like. Some embodiments may determine not to execute commands that violate such rules and vice versa.

In some embodiments, maps are represented in vector graphic form or with unit tiles, like in a bitmap. In some cases, changes may take the form of designating unit tiles via a user interface to add to the map or remove from the map. In some embodiments, bitmap representations may be modified (or candidate changes may be determined) with, for example, a two-dimensional convolution configured to smooth edges of mapped environment areas (e.g., by applying a Gaussian convolution to a bitmap with tiles having values of one where the environment is present and zero where the environment is absent and suggesting adding unit tiles with a resulting score above a threshold). In some cases, the bitmap may be rotated to align the coordinate system with walls of a generally rectangular room, e.g., to an angle at which a diagonal edge segments are at an aggregate minimum. Some embodiments may then apply a similar one-dimensional convolution and thresholding along the directions of axes of the tiling, but applying a longer stride than the two-dimensional convolution to suggest completing likely remaining wall segments.

Reference to operations performed on "a map" may include operations performed on various representations of the map. For instance, the robot may store in memory a relatively high-resolution representation of a map, and a lower-resolution representation of the map may be sent to a communication device for editing. In this scenario, the edits are still to "the map," notwithstanding changes in format, resolution, or encoding. Similarly, a map stored in memory of the robot, while only a portion of the map may be sent to the communication device, and edits to that portion of the map are still properly understood as being edits to "the map" and obtaining that portion is properly understood as obtaining "the map." Maps may be said to be obtained from a robot regardless of whether the maps are obtained via direct wireless connection between the robot and a communication device or obtained indirectly via a cloud service. Similarly, a modified map may be said to have been sent to the robot even if only a portion of the modified map, like a delta from a previous version currently stored on the robot, is sent.

In some embodiments, the user interface may present a map, e.g., on a touchscreen, and areas of the map (e.g., corresponding to rooms or other sub-divisions of the environment, e.g., collections of contiguous unit tiles in a bitmap representation) in pixel-space of the display may be mapped to event handlers that launch various routines responsive to events like an on-touch event, a touch release event, or the like. In some cases, before or after receiving such a touch event, the user interface may present the user with a set of user-interface elements by which the user may instruct embodiments to apply various commands to the area. Or in some cases, the areas of a environment are depicted in the user interface without also depicting their spatial properties, e.g., as a grid of options without conveying their relative size or position.

In some embodiments, the map formed by the processor of the robot during traversal of the environment may have various artifacts like those described herein. Using techniques like the line simplification algorithms and convolution, smoothing, and filtering, some embodiments may remove clutter from the map, like artifacts from reflections or small objects like chair legs to simplify the map, or a version thereof in lower resolution to be depicted on a user interface of the application executing by the communication device. In some cases, this may include removing duplicate boundaries, for instance, by detecting boundary segments surrounded on two sides by areas of the environment and removing those segments.

Some embodiments may rotate and scale the map for display in the user interface. In some embodiments, the map may be scaled based on a window size such that a largest dimension of the map in a given horizontal or vertical direction is less than a largest dimension in pixel space of the window size of the communication device or a window thereof in which the user interface is displayed. Or in some embodiments, the map may be scaled to a minimum or maximum size, e.g., in terms of a ratio of meters of physical space to pixels in display space. Some embodiments may include zoom and panning inputs in the user interface by which a user may zoom the map in and out, adjusting scaling, and pan to shift which portion of the map is displayed in the user interface.

In some embodiments, rotation of the map or portions thereof (like boundary lines) may be determined with techniques like those described above by which an orientation that minimizes an amount of aliasing, or diagonal lines of pixels on boundaries, is minimized. Or boundaries may be stretched or rotated to connect endpoints determined to be within a threshold distance. In some embodiments, an optimal orientation may be determined over a range of candidate rotations that is constrained to place a longest dimension of the map aligned with a longest dimension of the window of the application in the communication device. Or in some embodiments, the application may query a compass of the communication device to determine an orientation of the communication device relative to magnetic north and orient the map in the user interface such that magnetic north on the map as displayed is aligned with magnetic north as sensed by the communication device. In some embodiments, the robot may include a compass and annotate locations on the map according to which direction is magnetic north.

In some embodiments, applications are executed by a processor of a robot, a processor of a communication device (e.g., mobile device, laptop, tablet, specialized computer), a processor of a charging station of a robot, by processors of other devices, or by cloud services. In some embodiments, applications are executed on the cloud and in other embodiments applications are executed locally on a device. In some embodiments, different applications are executed by different means. In some embodiments, applications are autonomously executed by, for example, a processor and in other embodiments, a user provides instructions to the processor using a user interface of a mobile application, software, or web application of a communication device or user interface of a hardware device that has wireless communication with the processor of the robot.

In some embodiments, map data is encrypted when uploaded to a cloud, with an on-device only encryption key to protect customer privacy. For example, a unique ID embedded in the MCU of the robot is used as a decryption key of the encrypted map data when uploading to the cloud. The unique ID of the MCU is not recorded or tracked at production, which prevents maps from being viewed or decrypted except by the user, thereby protecting user privacy. When the robot requests the map from the cloud, the cloud sends the encrypted map data and the robot or the application of the communication device is able to decrypt the data from the cloud using the unique ID. In some embodiments, users may choose to share their map. In such cases, data will be anonymized.

In some embodiments, data is sent between the processor of the robot and the application of the communication device using Wi-Fi or Bluetooth wireless connections. In some cases, communications are relayed via a remote cloud-hosted application that mediates between the robot and the communication device, e.g., by exposing an application program interface by which the communication device accesses previous maps from the robot. In some embodiments, the processor of the robot and the application of the communication device are paired prior to sending data back and forth between one another. In some cases, pairing may include exchanging a private key in a symmetric encryption protocol, and exchanges may be encrypted with the key.

In some embodiments, the processor of the robot autonomously determines or adjusts settings (e.g., tools settings, robot settings, schedule settings, etc.) and actions or activates and deactivates functions of the robot based on environmental characteristics observed using one or more environmental sensors (e.g., local or remote sensors that sense attributes of a driving surface, a wall, or a surface of an object in an environment). For example, the processor may adjust the speed or torque of a main brush motor, an impeller motor, a peripheral brush motor or a wheel motor, activate or deactivate (or change luminosity or frequency of) ultraviolet (UV) treatment from a UV light configured to emit below a robot, steam and/or liquid mopping (e.g., modulating flow rate of soap or water), sweeping, or vacuuming (e.g., modulating pressure drop or flow rate), set a cleaning schedule, adjust a movement path, etc. in response to real-time or aggregated sensor data (or environmental characteristics inferred therefrom).

Examples of methods for a processor to autonomously adjust settings (e.g., speed) of components of a robot (e.g., impeller motor, wheel motor, etc.) based on environmental characteristics (e.g., floor type, room type, debris accumulation, etc.) are described in U.S. patent application Ser. Nos. 16/163,530 and 16/239,410, the entire contents of which are hereby incorporated by reference. For example, the processor may deactivate a mopping tool and activate a suction tool upon detecting carpeted flooring from sensor data (e.g., in response to detecting an increase in current drawn by a motor driving wheels of the robot, or in response to a visual odometry sensor indicating a different flooring type). In a further example, the processor may activate a suction tool or increase a suction power of the suction tool upon detecting a high level of debris accumulation from sensor data. In one example, the processor of a robot may set a cleaning schedule for the kitchen, the schedule including vacuuming and mopping the kitchen daily at 9:00 AM with detailed cleaning and two passes based on continuous observation of high debris accumulation in the kitchen. In another example, the processor of a robot may increase the power provided to the wheels when driving over carpet as compared to hardwood flooring such that a particular speed may be maintained despite the added friction from the carpet. In one example, the processor of the robot may determine a movement path such that the movement path first cleans all areas having a first type of flooring before cleaning all areas having a second type of flooring. In another instance, the processor of the robot may determine the speed of an impeller motor based on debris size or floor type such that higher speeds are used in areas with large sized debris or carpet and lower speeds are used in areas with small sized debris or hard flooring. In another example, the processor of the robot determines when to use UV treatment based on data indicating debris type such that areas having debris that can cause sanitary issues, such as food, receive UV or other type of specialized treatment. In one example, the processor deactivates one or more peripheral brushes passing over locations with high object density to avoid entanglement with objects or activates the one or more peripheral brushes passing over locations with high level of debris accumulation or adjusts the speed of the one or more peripheral brushes according to the level of debris accumulation. In some embodiments, the peripheral brush of the robotic cleaner includes one or more arms (three are shown) to which bristles are securely attached such that bristles remain in place when pulled and/or at risk of being plucked from the one or more arms of the peripheral brush. In some embodiments, the arms are hollowed tubes. In some embodiments, the bristles are secured to the one or more arms of the peripheral brush using stitching. In some embodiments, the bristles are bundled together and securely stitched to the one or more arms, forming one or more compact and firm brushes that result in more effective sweeping of debris as bristles are not lost over time and the brush maintains its fullness. In some embodiments, the secure stitching of bristles to the one or more arms of the peripheral brush avoid the bristles from being forcibly plucked during operation when, for example, the bristles become entangled with or caught up with an obstruction (e.g. cable, hair, or carpet) or make contact with a sticky substance or become lodged between objects and the robotic cleaner or when the peripheral brush continues or attempts to continue to rotate when entangled with an obstruction. In some embodiments, the stitching technique used to stitch the bristles together and/or to the one or more arms of the peripheral brush can vary. For example, stitching the bristles together can include stitching across the bundle of bristles in a straight line in a direction perpendicular to the length of the bristles. In another example, stitching the bristles together can include stitching diagonally across the bristles in two directions. In other instances, other stitching techniques can be used, such as stitching in a crisscross pattern. In some embodiments only one type of stitching technique is used while in other embodiments more than one type of stitching technique is used. In some embodiments, a stitching technique is repeated multiple times. For example, multiple parallel stitching lines along an end of the bundle directed perpendicular to the length of the bristles can be used to increase the fastening strength of the bristles to one another. Examples of stitching techniques including across a bundle of bristles using straight line technique, diagonal technique, crisscross technique or combined straight line and crisscross techniques. In some embodiments, the bristles are stitched together and then stitched to the one or more arms of the peripheral brush. In some embodiments, the one or more arms of the peripheral brush include small openings through which the stitching material can be weaved in order to stitch the bristles to the one or more arms.

In some embodiments, the environmental sensor is communicatively coupled to the processor of the robot and the processor of the robot processes the sensor data (a term which is used broadly to refer to information based on sensed information at various stages of a processing pipeline). In some embodiments, the sensor includes its own processor for processing the sensor data. Examples of sensors include, but are not limited to (which is not to suggest that any other described component of the robot is required in all embodiments), floor sensors, debris sensors, obstacle or object sensors, edge detection sensors, acoustic sensors, cameras, optical sensors, distance sensors, motion sensors, tactile sensors, electrical current sensors, and the like. The sensor may sense various attributes of an environment, e.g., particulate density, rolling resistance experienced by robot wheels, location, carpet depth, sliding friction experienced by robot brushes, hardness, color, acoustic reflectivity, optical reflectivity, planarity, acoustic response of a surface to a brush, and the like. In some embodiments, the sensor takes readings of the environment (e.g., periodically, like more often than once every 5 seconds, every second, every 500 ms, every 100 ms, or the like) and the processor obtains the sensor data. In some embodiments, the sensed data is associated with location data of the robot indicating the location of the robot at the time the sensor data was obtained. In some embodiments, the processor infers environmental characteristics from the sensory data (e.g., classifying the local environment of the sensed location within some threshold distance or over some polygon like a rectangle as being with a type of environment within an ontology, like a hierarchical ontology). In some embodiments, the processor infers characteristics of the environment in real-time (e.g., during a cleaning or mapping session, with 10 seconds of sensing, within 1 second of sensing, or faster) from real-time sensory data. In some embodiments, the processor adjusts various operating parameters of actuators, like speed, torque, duty cycle, frequency, slew rate, flow rate, pressure drop, temperature, brush height above the floor, or second or third order time derivatives of the same. For instance, some embodiments adjust the speed of components (e.g., main brush, peripheral brush, wheel, impeller, lawn mower blade, etc.) based on the environmental characteristics inferred (in some cases in real-time according to the preceding sliding windows of time). In some embodiments, the processor activates or deactivates (or modulates intensity of) functions (e.g., vacuuming, mopping, UV sterilization, digging, mowing, salt distribution, etc.) based on the environmental characteristics inferred (a term used broadly and that includes classification and scoring). In other instances, the processor adjusts a movement path, operational schedule (e.g., time when various designated areas are operated on or operations are executed), and the like based on sensory data. Examples of environmental characteristics include driving surface type, object density, room type, level of debris accumulation, level of user activity, time of user activity, etc.

In some embodiments, an electrical current sensor may be used to measure the amount of current drawn by a motor of a main brush in real-time. The processor may infer the type of driving surface based on the amount current drawn and in response adjusts the speed of components such that they are ideal for the particular driving surface type. For instance, if the current drawn by the motor of the main brush is high, the processor may infer that a robotic vacuum is on carpet, as more power is required to rotate the main brush at a particular speed on carpet as compared to hard flooring (e.g., wood or tile). In response to inferring carpet, the processor may increase the speed of the main brush and impeller (or increase applied torque without changing speed, or increase speed and torque) and reduce the speed of the wheels for a deeper cleaning. Some embodiments may raise or lower a brush in response to a similar inference, e.g., lowering a brush to achieve a deeper clean. In a similar manner, an electrical current sensor that measures the current drawn by a motor of a wheel may be used to predict the type of driving surface, as carpet, for example, requires more current to be drawn by the motor to maintain a particular speed as compared to hard driving surface. In some embodiments, a distance sensor takes distance measurements and the processor infers the type of driving surface using the distance measurements. For instance, the processor infers the type of driving surface from distance measurements of a TOF sensor positioned on the bottom surface of the robot as a hard driving surface when consistent distance measurements are observed over time (to within a threshold) and soft driving surface when irregularity in readings are observed due to the texture of, for example, carpet. In some embodiments, the processor uses sensor readings of an image sensor with at least one IR illuminator or any other structured light positioned on the bottom side of the robot to infer type of driving surface. The processor observes the signals to infer type of driving surface. For example, driving surfaces such as carpet produce more distorted and scattered signals as compared with hard driving surfaces due to their texture. In some embodiments, the processor infers presence of users from sensory data of a motion sensor (e.g., while the robot is static, or with a sensor configured to reject signals from motion of the robot itself). In response to inferring the presence of users, the processor may reduce motor speed of components (e.g., impeller motor speed) to decrease noise disturbance. In some embodiments, the processor infers a level of debris accumulation from sensory data of an audio sensor. For example, the processor infers a particular level of debris accumulation and/or type of debris based on the level of noise recorded. For example, the processor differentiates between the acoustic signal of large solid particles, small solid particles or air to determine the type of debris and based on the duration of different acoustic signals identifies areas with greater amount of debris accumulation. In response to observing high level of debris accumulation, the processor of a surface cleaning robot, for example, increases the impeller speed for stronger suction and reduces the wheel speeds to provide more time to collect the debris. In some embodiments, the processor infers level of debris accumulation using an IR transmitter and receiver positioned along the debris flow path, with a reduced density of signals indicating increased debris accumulation. In some embodiments, the processor infers level of debris accumulation using data captured by an imaging device positioned along the debris flow path. In other cases, the processor uses data from an IR proximity sensor aimed at the surface as different surfaces (e.g. clean hardwood floor, dirty hardwood floor with thick layer of dust, etc.) have different reflectance thereby producing different signal output. In some instances, the processor uses data from a weight sensor of a dustbin to detect debris and estimate the amount of debris collected. In some instances, a piezoelectric sensor is placed within a debris intake area of the robotic device such that debris may make contact with the sensor. The processor uses the piezoelectric sensor data to detect the amount of debris collected and type of debris based on the magnitude and duration of force measured by the sensor. In some embodiments, a camera captures images of a debris intake area and the processor analyzes the images to detect debris, approximate the amount of debris collected (e.g. over time or over an area) and determine the type of debris collected. In some embodiments, an IR illuminator projects a pattern of dots or lines onto an object within the field of view of the camera. The camera captures images of the projected pattern, the pattern being distorted in different ways depending the amount and type of debris collected. The processor analyzes the images to detect when debris is collected and to estimate the amount and type of debris collected. In some embodiments, the processor infers a level of object density from sensory data of an object sensor. For example, in response to inferring high level of object density, the processor reduces the wheel speeds to avoid collisions. In some instances, the processor adjusts a frame rate (or speed) of an imaging device and/or a rate (or speed) of data collection of a sensor based on sensory data.

In some embodiments, the processor of the robot marks inferred environmental characteristics of different locations of the environment within a map of the environment based on observations from all or a portion of current and/or historical sensory data. In some embodiments, the processor modifies the environmental characteristics of different locations within the map of the environment as new sensory data is collected and aggregated with sensory data previously collected or based on actions of the robot (e.g., operation history). For example, in some embodiments, the processor of a surface cleaning robot determines the probability of a location having different levels of debris accumulation (e.g., the probability of a particular location having low, medium, and high debris accumulation) based on the sensory data. If the location has a high probability of having a high level of debris accumulation and was just cleaned, the processor reduces the probability of the location having a high level of debris accumulation and increases the probability of having a low level of debris accumulation. Based on sensed data, some embodiments may classify or score different areas of an environment according to various dimensions, e.g., classifying by driving surface type in a hierarchical driving surface type ontology or according to a dirt-accumulation score by debris density or rate of accumulation.

In some embodiments, the map of the environment is a grid map wherein the map is divided into cells (e.g., unit tiles in a regular or irregular tiling), each cell representing a different location within the environment. In some embodiments, the processor divides the map to form a grid map. In some embodiments, the map is a Cartesian coordinate map while in other embodiments the map is of another type, such as a polar, homogenous, or spherical coordinate map. In some embodiments, the environmental sensor collects data as the robot navigates throughout the environment or operates within the environment as the processor maps the environment. In some embodiments, the processor associates each or a portion of the environmental sensor readings with the particular cell of the grid map within which the robot was located when the particular sensor readings were taken. In some embodiments, the processor associates environmental characteristics directly measured or inferred from sensor readings with the particular cell within which the robot was located when the particular sensor readings were taken. In some embodiments, the processor associates environmental sensor data obtained from a fixed sensing device and/or another robot with cells of the grid map. In some embodiments, the robot continues to operate within the environment until data from the environmental sensor is collected for each or a select number of cells of the grid map. In some embodiments, the environmental characteristics (predicted or measured or inferred) associated with cells of the grid map include, but are not limited to (which is not to suggest that any other described characteristic is required in all embodiments), a driving surface type, a room or area type, a type of driving surface transition, a level of debris accumulation, a type of debris, a size of debris, a frequency of encountering debris accumulation, day and time of encountering debris accumulation, a level of user activity, a time of user activity, an object density, an object type, an object size, a frequency of encountering a particular object, a day and time of encountering a particular object, a level of traffic, a driving surface quality, a hazard, etc. In some embodiments, the environmental characteristics associated with cells of the grid map are based on sensor data collected during multiple working sessions wherein characteristics are assigned a probability of being true based on observations of the environment over time.

In some embodiments, the processor associates (e.g., in memory of the robot) information such as date, time, and location with each sensor reading or other environmental characteristic based thereon. In some embodiments, the processor associates information to only a portion of the sensor readings. In some embodiments, the processor stores all or a portion of the environmental sensor data and all or a portion of any other data associated with the environmental sensor data in a memory of the robot. In some embodiments, the processor uses the aggregated stored data for optimizing (a term which is used herein to refer to improving relative to previous configurations and does not require a global optimum) operations within the environment by adjusting settings of components such that they are ideal (or otherwise improved) for the particular environmental characteristics of the location being serviced or to be serviced.

In some embodiments, the processor generates a new grid map with new characteristics associated with each or a portion of the cells of the grid map at each work session. For instance, each unit tile may have associated therewith a plurality of environmental characteristics, like classifications in an ontology or scores in various dimensions like those discussed above. In some embodiments, the processor compiles the map generated at the end of a work session with an aggregate map based on a combination of maps generated during each or a portion of prior work sessions. In some embodiments, the processor directly integrates data collected during a work session into the aggregate map either after the work session or in real-time as data is collected. In some embodiments, the processor aggregates (e.g., consolidates a plurality of values into a single value based on the plurality of values) current sensor data collected with all or a portion of sensor data previously collected during prior working sessions of the robot. In some embodiments, the processor also aggregates all or a portion of sensor data collected by sensors of other robots or fixed sensing devices monitoring the environment.

In some embodiments, the processor (e.g., of a robot or a remote server system, either one of which (or a combination of which) may implement the various logical operations described herein) determines probabilities of environmental characteristics (e.g., an object, a driving surface type, a type of driving surface transition, a room or area type, a level of debris accumulation, a type or size of debris, object density, a type of size of an object, level of traffic, driving surface quality, etc.) existing in a particular location of the environment based on current sensor data and sensor data collected during prior work sessions. For example, in some embodiments, the processor updates probabilities of different driving surface types existing in a particular location of the environment based on the currently inferred driving surface type of the particular location and the previously inferred driving surface types of the particular location during prior working sessions of the robot and/or of other robots or fixed sensing devices monitoring the environment. In some embodiments, the processor updates the aggregate map after each work session. In some embodiments, the processor adjusts speed of components and/or activates/deactivates functions based on environmental characteristics with highest probability of existing in the particular location of the robot such that they are ideal for the environmental characteristics predicted. For example, based on aggregate sensory data there is an 85% probability that the type of driving surface in a particular location is hardwood, a 5% probability it is carpet, and a 10% probability it is tile. The processor adjusts the speed of components to ideal speed for hardwood flooring given the high probability of the location having hardwood flooring. Some embodiments may classify unit tiles into a flooring ontology, and entries in that ontology may be mapped in memory to various operational characteristics of actuators of the robot that are to be applied.

In some embodiments, the processor uses the aggregate map to predict areas with high risk of stalling, colliding with objects, and/or becoming entangled with an obstruction. In some embodiments, the processor records the location of each such occurrence and marks the corresponding grid cell(s) in which the occurrence took place. For example, the processor uses aggregated object sensor data collected over multiple work sessions to determine areas with high probability of collisions with objects or aggregated electrical current sensor of a peripheral brush motor or motor of another device to determine areas with high probability of increased electrical current due to entanglement with an obstruction. In some embodiments, the processor causes the robot to avoid or reduce visitation to such areas.

In some embodiments, the processor uses the aggregate map to determine a movement path within the environment, which in some cases, may include a movement path within various areas (e.g., areas including collections of adjacent unit tiles, like rooms in a multi-room environment). Various movement paths may be implemented based on the environmental characteristics of different locations within the aggregate map. For example, the processor may generate a movement path that covers areas only requiring low impeller motor speed (e.g., areas with low debris accumulation, areas with hardwood floor, etc.) when individuals are detected as being or predicted to be present within the environment to reduce noise disturbances. In another example, the processor generates (e.g., forms a new instance or selects an extant instance) a movement path that covers areas with high probability of having high levels of debris accumulation, e.g., a movement path may be selected that covers a first area with a high probability of having high levels of debris accumulation and does not cover a second area with a high probability of having low levels of debris accumulation.

In some embodiments, a memory of the robot includes an internal database of types of debris likely to be encountered within the environment. In some embodiments, the processor identifies the type of debris collected in the environment by using the data of various sensors capturing the features of the debris (e.g., camera, pressure sensor, acoustic sensor, etc.) and comparing those features with features of different types of debris stored in the internal database. In some embodiments, the processor determines the likelihood of collecting a particular type of debris in different areas of the environment based on, for example, current and historical data (e.g., local and remote). For example, a robot encounters accumulated dog hair on the surface. Image sensors of the robot capture images of the debris and the processor analyzes the images to determine features of the debris. The processor compares the features to those of different types of debris within the internal database and matches them to dog hair. The processor marks the region in which the dog hair was encountered within a map of the environment as a region with increased likelihood of encountering dog hair. The processor increases the likelihood of encountering dog hair in that particular region with increasing number of occurrences. In some embodiments, the processor further determines if the type of debris encountered may be cleaned by a cleaning function of the robot. For example, a processor of a robotic vacuum determines that the debris encountered is a liquid and that the robot does not have the capabilities of cleaning the debris. In some embodiments, the processor of the robot incapable of cleaning the particular type of debris identified communicates with, for example, a processor of another robot capable of cleaning the debris from the environment. In some embodiments, the processor of the robot avoids navigation in areas with particular type of debris detected.

In some embodiments, the processor may use machine learning techniques to predict environmental characteristics using sensor data such that adjustments to settings of components of the robot, settings of the robot, actions of the robot, and activation and deactivation of functions may be made autonomously and in real-time to accommodate the current environment. Examples can include, but are not limited to, adjustments to the speed of components (e.g., a cleaning tool such a main brush or side brush, wheels, impeller, cutting blade, digger, salt or fertilizer distributor, or other component depending on the type of robot), activating/deactivating functions (e.g., UV treatment, sweeping, steam or liquid mopping, vacuuming, mowing, ploughing, salt distribution, fertilizer distribution, digging, and other functions depending on the type of robot), adjustments to movement path, adjustments to the division of the environment, and operation schedule, etc. In some embodiments, the processor may use a classifier such as a convolutional neural network to classify real-time sensor data of a location within the environment into different environmental characteristic classes such as driving surface types, room or area types, levels of debris accumulation, debris types, debris sizes, traffic level, obstacle density, human activity level, driving surface quality, and the like. In some embodiments, the processor dynamically and in real-time may adjust the speed of components of the robot based on the current environmental characteristics. Initially, the processor may train the classifier such that it can properly classify sensor data to different environmental characteristic classes. In some embodiments, training may be executed remotely and trained model parameters may be downloaded to the robot, which is not to suggest that any other operation herein must be performed on-robot. The processor may train the classifier by, for example, providing the classifier with training and target data that contains the correct environmental characteristic classifications of the sensor readings within the training data. For example, the processor may train the classifier to classify electric current sensor data of a wheel motor into different driving surface types. For instance, if the magnitude of the current drawn by the wheel motor is greater than a particular threshold for a predetermined amount of time, the classifier may classify the current sensor data to a carpet driving surface type class (or other soft driving surface depending on the environment of the robot) with some certainty. In other embodiments, the processor may classify sensor data based on the change in value of the sensor data over a predetermined amount of time or using entropy. For example, the processor may classify current sensor data of a wheel motor into a driving surface type class based on the change in electrical current over a predetermined amount of time or entropy value. In response to predicting an environmental characteristic, such as a driving type, the processor adjusts the speed of components such that they are optimal for operating in an environment with the particular characteristics predicted, such as a predicted driving surface type. In some embodiments, adjusting the speed of components includes adjusting the speed of the motors driving the components. In some embodiments, the processor also chooses actions and/or settings of the robot in response to predicted (or measured or inferred) environmental characteristics of a location. In other examples, the processor inputs distance sensor data, audio sensor data, or optical sensor data into the classifier to classify the sensor data into different environmental characteristic classes (e.g., different driving surface types, room or area types, levels of debris accumulation, debris types, debris sizes, traffic level, obstacle density, human activity level, driving surface quality, etc.). In some embodiments, the processor may use environmental sensor data from more than one type of sensor to improve predictions of environmental characteristics. Different types of sensors may include, but are not limited to, object sensors, audio sensors, image sensors, TOF sensors, and/or electrical current sensors. In some embodiments, the processor may provide the classifier with different types of sensor data and over time the weight of each type of sensor data in determining the predicted output is optimized by the classifier. For example, a processor of a robot may use both electrical current sensor data of a wheel motor and distance sensor data to predict driving type, thereby increasing the confidence in the predicted type of driving surface.

In some embodiments, the processor may use thresholds, change in sensor data over time, distortion of sensor data, and/or entropy to predict environmental characteristics. In other instances, the processor uses other approaches for predicting (or measuring or inferring) environmental characteristics of locations within the environment. In some embodiments, to increase confidence in predictions (or measurements or inferences) of environmental characteristics in different locations of the environment, the processor uses a first set of environmental sensor data collected by a first environmental sensor to predict (or measure or infer) an environmental characteristic of a particular location a priori to using a second set of environmental sensor data collected by a second environmental sensor to predict an environmental characteristic of the particular location. In some embodiments, the processor assigns certain environmental characteristics a higher weight (e.g., importance or confidence) when determining settings of components and the robot, actions of the robot, and activation and deactivation of functions. In some embodiments, a user may specify or adjust environmental characteristics of different locations within the map using the user interface of the application of the communication device. For example, driving surface type of locations, locations likely to have high and low levels of debris accumulation, locations likely to have a specific type or size of debris, locations with large objects, etc. may be specified or adjusted using the user interface.

In some embodiments, the robot may initially operate with default settings for various components. For example, the wheels may initially operate at a predetermined speed, resulting in a predetermined speed of the robot. In another example, the main brush, peripheral brush, and impeller of the robot may initially operate at a predetermined speed and the suctioning tool may initially be activated while the mopping toll is deactivated; however, if activated at a later time, the UV light may be activated by default. In some embodiments, default settings may be chosen during manufacturing based on what is suitable for most environments and/or users, or may be chosen by a user to suit a particular environment or their preferences. For example, setting a default slow speed for a main brush conserves energy and a low suction power for a suctioning tool reduces sound, etc. In some instances, the user sets different default settings for different areas of the environment using the user interface of the application or an interface of the robot. For example, a user may prefer low suction power in bedrooms to reduce noise or high suction power in areas with soft floor types (e.g., carpet) or with high levels of dust and debris.

In some embodiments, the processor records all or a portion of the real-time decisions corresponding to a particular location within the environment in a memory of the robot. In some embodiments, the processor marks all or a portion of the real-time decisions corresponding to a particular location within the grid map of the environment. For example, a processor marks the particular cell within the grid map corresponding with the location of the robot when increasing the speed of wheel motors because of predicting a particular driving surface type. In some embodiments, data may be saved in ASCII or other formats to occupy minimal memory space.

In some embodiments, the processor represents and distinguishes environmental characteristics using ordinal, cardinal, or nominal values, like numerical scores in various dimensions or descriptive categories that serve as nominal values. For example, the processor may denote different driving surface types, such as carpet, grass, rubber, hardwood, cement, and tile by numerical categories, such as 1, 2, 3, 4, 5 and 6, respectively. In some embodiments, numerical or descriptive categories may be a range of values. For example, the processor may denote different levels of debris accumulation by categorical ranges such as 1-2, 2-3, and 3-4, wherein 1-2 denotes no debris accumulation to a low level of debris accumulation, 2-3 denotes a low to medium level of debris accumulation, and 3-4 denotes a medium to high level of debris accumulation. In some embodiments, the processor combines the numerical values with a 2D coordinate map of the environment forming a multi-dimensional coordinate map describing environmental characteristics of different locations within the environment, e.g., in a multi-channel bitmap. In some embodiments, the processor updates the grid map with new sensor data collected and/or information inferred from the new sensor data in real-time or after a work session. In some embodiments, the processor generates an aggregate map of all or a portion of the maps generated during each work session wherein the processor uses the environmental characteristics of the same cell predicted in each map to determine probabilities of each environmental characteristic existing in the particular cell.

In some embodiments, the processor uses environmental characteristics of the environment to infer additional information such as boundaries between rooms or areas, transitions between different types of driving surfaces, and types of areas. For example, the processor may infer that a transition between different types of driving surfaces exists in a location of the environment where two adjacent cells have different predicted type of driving surface. In another example, the processor may infer with some degree of certainty that a collection of adjacent cells of the grid map with combined surface area below some threshold and all having hard driving surface are associated with a particular environment, such as a bathroom as bathrooms are generally smaller than all other rooms in an environment and generally have hard flooring. In some embodiments, the processor labels areas or rooms of the environment based on such inferred information.

In some embodiments, the processor may adjust the speed of components of the robot continuously. For example, the processor continuously increases the power provided to the main brush motor as the robot transitions from operating on hardwood floor to carpeted floor. In other embodiments, the processor adjusts speed of components using discrete increments and decrements. For example, the processor may choose from 2, 3, or 4 different levels of speed during operation. In some embodiments, different discrete increments and decrements are used for different components.

In some embodiments, the processor commands the robot to complete operation on one type of driving surface before moving on to another type of driving surface. In some embodiments, the processor commands the robot to prioritize operating on cells with a particular environmental characteristic first (e.g., cell with high level of debris accumulation, cells with carpet or grass, cells with minimal obstacles, etc.). In some embodiments, the processor generates a movement path that connects cells with a same particular environmental characteristic and the processor commands the robot to operate along the path. In some embodiments, the processor may command the robot to drive over cells with a particular environmental characteristic more slowly or quickly for a predetermined amount of time and/or at a predetermined frequency over a period of time. For example, a processor may command a robot to operate on cells with a particular driving surface type, such as hardwood flooring, five times per week. In some embodiments, a user provides the above-mentioned commands and/or other commands to the robot using the user interface of the application of the communication device or an interface of the robot.

In some embodiments, the processor of a robot changes settings such that resources required for cleaning are not depleted during the cleaning session. In some instances, the processor uses a bin packing algorithm or an equivalent algorithm to maximize the area cleaned given the limited amount of resources remaining. In some embodiments, the processor analyzes sensor data of the environment before executing a task to confirm environmental conditions are acceptable for the task to be executed. For example, the processor analyzes floor sensor data to confirm floor type prior to executing a particular task. In some instances, wherein the processor detects an issue in the settings chosen by the user, the processor transmits a message that the user may retrieve using the application. In other instances, the processor may transmit messages to the application for reasons related to, for example, cleaning or the map. For example, the message may indicate that an area has high (e.g., measured as being above a predetermined or dynamically determined threshold) debris accumulation and should therefore be cleaned or that mopping was not performed in area due to carpet detected in the area. In some embodiments, the user overrides a warning message prior to the robot executing an action. In some embodiments, a user may select conditional settings using the user interface of the application of the communication device. Upon detecting a condition being met, the processor implements particular settings (e.g., increasing impeller motor speed upon detecting dust accumulation beyond a specified threshold or activating mopping upon detecting a lack of motion). In some embodiments, conditional settings are preset or chosen autonomously by the processor of the robot.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described or illustrated in figures with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching.

The invention claimed is:

1. A system for collaboration between a first robot and a second robot, comprising:
   an application of a smartphone wirelessly connected with the first robot and the second robot that receives each of: a first user input designating a first instruction for the first robot to execute a first task and a second user input, separate from the first user input, designating a second instruction for the second robot to execute a second task after the first robot completes the first task;
   the first robot, comprising:
      a first plurality of sensors; and
      a first tangible, non-transitory, machine readable medium storing first executable instructions that when executed by a processor of the first robot effectuates first operations comprising:
         actuating, with the processor of the first robot, the first robot to execute the first task; and
         actuating, with the processor of the first robot, the first robot to dock at a charging station upon completion of the first task; and
   the second robot, comprising:
      a second plurality of sensors; and
      a second tangible, non-transitory, machine readable medium storing second executable instructions that when executed by a processor of the second robot effectuates second operations comprising:

actuating, with the processor of the second robot, the second robot to execute the second task upon receiving a signal indicating that the first task has been completed by the first robot.

2. The system of claim 1, wherein:
the first robot comprises a robotic vacuum;
the first task comprises vacuuming a first area;
the second robot comprises a robotic mop; and
the second task comprises mopping a second area.

3. The system of claim 2, wherein the first area and the second area are determined based on an input received by the application of the smartphone, the input designating the first area within which the first robot is to execute the first task and the second area within which the second robot is to execute the second task received.

4. The system of claim 1, wherein the processor of the first robot or a processor of another device transmits the signal to the processor of the second robot upon completion of the first task by the first robot.

5. The system of claim 1, wherein the processor of the first robot actuates the first robot to execute the first task or another task upon receiving a signal transmitted from an artificial intelligence home assistant device or the application.

6. The system of claim 1, wherein the application of the smartphone further:
receives further user inputs designating each of: a schedule for performing work by the first robot or the second robot; an area within which to execute a third task by the first robot or the second robot; cleaning preferences comprising a deep clean or regular clean option, a suctioning power, and a number of cleaning passes to execute within the area; an addition of, modification to, or deletion of a boundary; an addition of, modification to, or deletion of a no-entry zone; and an addition of, modification to, or deletion of a zone name; and
displays a map of an environment; a status of the first robot or the second robot; a battery level of the first robot or the second robot; and a cleaning history of the first robot or the second robot.

7. The system of claim 1, wherein the operations executed by the processor of the first robot further comprise:
capturing, with at least one image sensor of the first robot, images of objects within an environment of the first robot;
determining, with the processor of the first robot, an object type of an object of the objects in an image of the captured images based on a comparison between the object and a database of possible objects encountered within the environment; and
actuating, with the processor of the first robot, the robot to execute an object-specific behaviour based on the object type, wherein the object-specific behaviour comprises avoiding the object or driving around the object and resuming a movement path.

8. The system of claim 1, wherein the processor of the first robot effectuates the first operations further comprising:
generating, with the processor of the first robot, a first movement path of the first robot covering at least part of an environment of the first robot;
actuating, with the processor of the first robot, the first robot to move along the first movement path;
wherein actuating the first robot to move along at least a portion of the first movement path comprises a repetitive iteration of:
actuating, with the processor of the robot, the first robot to traverse a first linear segment;
actuating, with the processor of the first robot, the first robot to rotate 180 degrees in a first rotation, wherein the first rotation comprises traversing a first distance in a direction perpendicular to the first linear segment after starting the first rotation and before finishing the first rotation;
actuating, with the processor of the first robot, the first robot to traverse a second linear segment; and
actuating, with the processor of the first robot, the first robot to rotate 180 degrees in a second rotation, wherein the second rotation comprises traversing a second distance in a direction perpendicular to the second linear segment after starting the second rotation and before finishing the second rotation.

9. The system of claim 8, wherein the first distance and the second distance are of less than a coverage width of the first robot.

10. The system of claim 1, wherein the processor of the first robot effectuates the first operations further comprising:
determining, with the processor of the first robot, a first movement path of the first robot through an environment of the first robot, wherein:
the first movement path is devised within a bounded area in an area smaller than a total area discovered and mapped by the processor of the first robot; and
the first movement path is adjusted in real-time in response to detecting an obstacle positioned on the first movement path.

11. The system of claim 1, wherein at least one action of the first robot is determined based on a season of a year.

12. The system of claim 1, wherein the processor of the first robot effectuates the first operations further comprising:
collecting, with a sensor of the first plurality of sensors disposed on the first robot, a plurality of debris data of an environment of the first robot;
associating, with the processor of the first robot, each debris data of the plurality of debris data with a location of the environment from which the respective debris data of the plurality of debris data was collected;
determining, with processor of the first robot, locations of the environment with debris accumulation based on the plurality of debris data; and
marking, with the processor of the first robot, the locations of the environment with the debris accumulation in a map of the environment;
actuating, with the processor of the first robot, the first robot to either one of: clean and avoid the debris based on an object of which the debris comprises, wherein the first robot is actuated to avoid the debris when the object of which the debris comprises is feces;
wherein the processor of the first robot determines at least a portion of a movement path of the first robot or adjusts a cleaning strategy of the first robot based on the locations of the environment with the debris accumulation.

13. The system of claim 1, wherein the processor of the first robot effectuates the first operations further comprising:
determining, with the processor of the first robot, a suggested future operational schedule of the first robot based on learning user preferences for operating the first robot, wherein:
the processor of the first robot learns the user preferences for operating the first robot based on at least previous times a user of the first robot operated the first robot; and
the user is presented the suggested future operational schedule; and actuating, with the processor of the first robot, the first robot to operate according to the suggested future operational schedule.

14. The system of claim 13, wherein the processor of the first robot actuates the first robot to operate according to the future suggested operational schedule upon user approval of the suggested future operational schedule from the user.

15. The system of claim 1, wherein the processor of the first robot effectuates the first operations further comprising:
inferring, with the processor of the first robot, presence or absence of a user within an environment of the first robot based on sensor data, wherein the environment comprises a home of the user; and
actuating, with the processor of the first robot, the first robot to perform an action based on the presence or the absence of the user within the environment.

16. The system of claim 1, wherein the processor of the first robot effectuates the first operations further comprising:
capturing, with a sensor of the first plurality of sensors disposed on the first robot, data indicative of an environmental characteristic of a first location of the first robot; and
adjusting, with the processor of the first robot, a first operational parameter of a first actuator of the first robot based on the sensed data, wherein the adjusting causes the first operational parameter to be in a first adjusted state while the first robot is at the first location.

17. The system of claim 16, wherein:
the first actuator or another actuator of the first robot is configured to drive a main brush or a peripheral brush of the first robot;
the peripheral brush comprises a plurality of arms; and
at least one arm of the plurality of arms of the peripheral brush comprises bristles extending from the respective arm, the bristles being secured to the at least one arm with stitching to prevent the bristles from being forcibly plucked during operation of the robot.

18. The system of claim 17, wherein the bristles are secured to the at least one arm using one or more of the following techniques: stitching at least one line across the bristles, stitching two lines in opposite directions diagonally across the width of the bristles, or stitching a crisscross pattern across the bristles.

19. The system of claim 18, wherein:
the at least one stitched line across the bristles is in a direction perpendicular to the length of the bristles; and
the stitched crisscross pattern crosses the bristles in a direction perpendicular to the length of the bristles.

20. A method for collaboration between a first robot and a second robot, comprising:
receiving, with an application of a smartphone wirelessly connected with the first robot and the second robot, each of: a first user input designating a first instruction for the first robot to execute a first task and a second user input, designating a second instruction for the second robot to execute a second task after the first robot completes the first task;
actuating, with a processor of the first robot, the first robot to execute the first task;
actuating, with the processor of the first robot, the first robot to dock at a charging station upon completion of the first task; and
actuating, with a processor of the second robot, the second robot to execute the second task upon receiving a signal indicating that the first task has been completed by the first robot.

* * * * *